(12) United States Patent
Magi et al.

(10) Patent No.: US 11,809,535 B2
(45) Date of Patent: Nov. 7, 2023

(54) SYSTEMS AND METHODS FOR MULTI-MODAL USER DEVICE AUTHENTICATION

(71) Applicant: Intel Corporation, Santa Clara, CA (US)

(72) Inventors: Aleksander Magi, Portland, OR (US); Barnes Cooper, Hillsboro, OR (US); Arvind Kumar, Beaverton, OR (US); Julio Zamora Esquivel, Zapopan (MX); Vivek Paranjape, Hillsboro, OR (US); William Lewis, North Plains, OR (US); Marko Bartscherer, Chula Vista, CA (US); Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 16/725,467

(22) Filed: Dec. 23, 2019

(65) Prior Publication Data

US 2020/0134151 A1 Apr. 30, 2020

(51) Int. Cl.
*G06F 21/00* (2013.01)
*G06F 21/32* (2013.01)
(Continued)

(52) U.S. Cl.
CPC ............ *G06F 21/32* (2013.01); *G06V 40/168* (2022.01); *G06V 40/172* (2022.01); *G10L 17/00* (2013.01); *G10L 17/06* (2013.01)

(58) Field of Classification Search
CPC .......... G06F 21/32; G06F 21/35; G06F 21/31; G06V 40/168; G06V 40/172;
(Continued)

(56) References Cited

U.S. PATENT DOCUMENTS

D324,036 S 2/1992 Wakasa
5,173,940 A 12/1992 Lantz et al.
(Continued)

FOREIGN PATENT DOCUMENTS

CN 102197349 9/2011
CN 102231255 A 11/2011
(Continued)

OTHER PUBLICATIONS

Reads, "Microsoft Windows Vista SideShow—In-Depth (pics)", Notebook Review, Jan. 11, 2006, available at www.notebookreview.com/news/microsoft-windows-vista-sideshow-in-depth-pics/ (retrieved May 6, 2019), 7 pages.
(Continued)

*Primary Examiner* — Jeffrey C Pwu
*Assistant Examiner* — William A Corum, Jr.
(74) *Attorney, Agent, or Firm* — Hanley, Flight & Zimmerman, LLC

(57) ABSTRACT

Systems and methods for multi-modal user device authentication are disclosed. An example electronic device includes a first sensor, a microphone, a first camera, and a confidence analyzer to authenticate a subject as the authorized user in response to a user presence detection analyzer detecting a presence of the subject and one or more of (a) an audio data analyzer detecting a voice of an authorized user or (b) an image data analyzer detecting a feature of the authorized user. The example electronic device includes a processor to cause the electronic device to move from a first power state to a second power state in response to the confidence analyzer authenticating the user as the authorized user. The electronic device is to consume a greater amount of power in the second power state than the first power state.

21 Claims, 16 Drawing Sheets

(51) Int. Cl.
*G10L 17/06* (2013.01)
*G10L 17/00* (2013.01)
*G06V 40/16* (2022.01)

(58) Field of Classification Search
CPC ...... G06V 40/166; G06V 40/70; G10L 17/00;
G10L 17/06; H04W 12/06; H04L 63/083;
H04L 63/0853; H04L 63/0861
See application file for complete search history.

(56) References Cited

U.S. PATENT DOCUMENTS

| | | |
|---|---|---|
| D359,275 S | 6/1995 | Yamazaki |
| D376,791 S | 12/1996 | Schreiner |
| D388,774 S | 1/1998 | Giuntoli |
| D389,129 S | 1/1998 | Guintoli |
| 5,835,083 A | 11/1998 | Nielsen |
| D433,024 S | 10/2000 | Oross |
| D434,773 S | 12/2000 | Suzuki |
| D444,462 S | 7/2001 | Tsuji |
| D449,307 S | 10/2001 | Amano et al. |
| D453,508 S | 2/2002 | Shibata |
| D454,126 S | 3/2002 | Bliven et al. |
| D462,967 S | 9/2002 | Suzuki |
| D478,089 S | 8/2003 | Yokota |
| D480,089 S | 9/2003 | Skinner et al. |
| 6,657,647 B1 | 12/2003 | Bright |
| 6,760,649 B2 | 7/2004 | Cohen |
| D494,161 S | 8/2004 | Sawaquchi |
| D504,129 S | 4/2005 | Loew et al. |
| D517,542 S | 3/2006 | Lee et al. |
| D518,042 S | 3/2006 | Kanayama |
| D534,531 S | 1/2007 | Ogasawara |
| 7,386,799 B1 | 6/2008 | Clanton et al. |
| D577,013 S | 9/2008 | Harris et al. |
| D591,737 S | 5/2009 | Morooka et al. |
| 7,559,034 B1 | 7/2009 | Papemy et al. |
| D607,449 S | 1/2010 | Morisawa |
| D608,380 S | 1/2010 | Nagase et al. |
| D611,043 S | 3/2010 | Andre et al. |
| D611,045 S | 3/2010 | Andre et al. |
| D612,830 S | 3/2010 | Kim et al. |
| D614,180 S | 4/2010 | Gou |
| D616,433 S | 5/2010 | Morishita et al. |
| 7,725,547 B2 | 5/2010 | Albertson et al. |
| D616,882 S | 6/2010 | Denhez et al. |
| D631,039 S | 1/2011 | Sakai et al. |
| 7,971,156 B2 | 6/2011 | Albertson et al. |
| D645,857 S | 9/2011 | Cho et al. |
| 8,139,032 B2 | 3/2012 | Su et al. |
| D659,134 S | 5/2012 | Ahn et al. |
| D672,765 S | 12/2012 | Masui et al. |
| D673,558 S | 1/2013 | Cruz et al. |
| D674,382 S | 1/2013 | Andre et al. |
| D684,570 S | 6/2013 | Akana et al. |
| D687,831 S | 8/2013 | Kim |
| 8,566,696 B1 | 10/2013 | Hamon et al. |
| D692,875 S | 11/2013 | Lawrence |
| 8,581,974 B2 | 11/2013 | Lin et al. |
| D698,348 S | 1/2014 | Ilchan et al. |
| D704,185 S | 5/2014 | Bowers et al. |
| 8,717,318 B2 | 5/2014 | Anderson et al. |
| D706,767 S | 6/2014 | Kawai et al. |
| D706,768 S | 6/2014 | Kawai |
| D706,769 S | 6/2014 | Kawai et al. |
| D706,772 S | 6/2014 | Koyama et al. |
| D708,178 S | 7/2014 | Honda et al. |
| D708,179 S | 7/2014 | Andre et al. |
| D709,491 S | 7/2014 | Kurimoto et al. |
| 8,812,831 B2 | 8/2014 | Cheng et al. |
| D712,971 S | 9/2014 | Huang |
| D715,793 S | 10/2014 | Tsao et al. |
| D716,795 S | 11/2014 | Huang et al. |
| D718,818 S | 12/2014 | Sumii et al. |
| D720,712 S | 1/2015 | Park et al. |
| 8,954,884 B1 | 2/2015 | Barger |
| D724,576 S | 3/2015 | Wolff et al. |
| 8,994,847 B2 | 3/2015 | Chen et al. |
| D727,314 S | 4/2015 | Fukuoka |
| D729,227 S | 5/2015 | Fukuoka |
| D729,228 S | 5/2015 | Kawai |
| D729,229 S | 5/2015 | Kurimoto et al. |
| D729,791 S | 5/2015 | Adamson et al. |
| D729,792 S | 5/2015 | Kurimoto et al. |
| D731,475 S | 6/2015 | Mehandjiysky et al. |
| D739,398 S | 9/2015 | Adamson et al. |
| D739,399 S | 9/2015 | Adamson et al. |
| D739,400 S | 9/2015 | Adamson et al. |
| D740,278 S | 10/2015 | Bowers et al. |
| D741,318 S | 10/2015 | Oakley |
| D746,809 S | 1/2016 | Takada et al. |
| 9,268,434 B2 | 2/2016 | Sultenfuss et al. |
| D751,062 S | 3/2016 | Chang |
| 9,311,909 B2 | 4/2016 | Giaimo, III et al. |
| 9,436,241 B2 | 9/2016 | Tang et al. |
| D769,251 S | 10/2016 | Chen |
| D771,684 S | 11/2016 | Kim |
| D780,173 S | 2/2017 | Matsuoka |
| 9,575,559 B2 | 2/2017 | Andrysco |
| D780,760 S | 3/2017 | Ironmonger et al. |
| D788,767 S | 6/2017 | Magi |
| D794,027 S | 8/2017 | Ironmonger et al. |
| 9,721,383 B1 | 8/2017 | Horowitz et al. |
| 9,740,290 B2 | 8/2017 | Rosenberg et al. |
| 9,766,700 B2 | 9/2017 | Lyons et al. |
| 9,785,234 B2 | 10/2017 | Horesh |
| D801,945 S | 11/2017 | Cho et al. |
| D803,946 S | 11/2017 | Matsuda |
| 9,846,471 B1 | 12/2017 | Arora |
| D810,069 S | 2/2018 | Hishiki |
| D810,071 S | 2/2018 | Hishiki |
| D813,235 S | 3/2018 | Rosenberg et al. |
| D814,469 S | 4/2018 | Rundberg |
| D816,083 S | 4/2018 | Wu |
| 9,936,195 B2 | 4/2018 | Horesh |
| 9,996,638 B1 | 6/2018 | Holz et al. |
| D823,850 S | 7/2018 | Lim et al. |
| 10,027,662 B1 | 7/2018 | Mutagi et al. |
| D825,435 S | 8/2018 | Yu |
| 10,101,817 B2 | 10/2018 | Hsin et al. |
| 10,234,928 B2 | 3/2019 | Chen |
| 10,254,178 B2 | 4/2019 | Carbone et al. |
| 10,262,599 B2 | 4/2019 | Lang et al. |
| 10,304,209 B2 | 5/2019 | Alonso |
| 10,415,286 B1 | 9/2019 | Porcella et al. |
| D867,460 S | 11/2019 | Yan et al. |
| D873,835 S | 1/2020 | Chan |
| 10,551,888 B1 | 2/2020 | North et al. |
| D878,475 S | 3/2020 | Letter |
| D879,777 S | 3/2020 | Cho |
| 10,620,457 B2 | 4/2020 | Ain-Kedem |
| 10,620,786 B2 | 4/2020 | Veeramani et al. |
| D886,112 S | 6/2020 | Yeh et al. |
| 10,725,510 B2 | 7/2020 | Ho et al. |
| 10,740,912 B2 | 8/2020 | Ren et al. |
| 10,768,724 B1 | 9/2020 | Han |
| 10,819,920 B1 | 10/2020 | Hamlin et al. |
| 10,884,479 B2 | 1/2021 | Chen |
| D914,021 S | 3/2021 | Magi et al. |
| 11,153,472 B2 | 10/2021 | Konicek |
| 11,194,398 B2 | 12/2021 | Bernhart |
| 11,360,528 B2 | 6/2022 | Mishra et al. |
| 11,379,016 B2 | 7/2022 | Cooper et al. |
| 11,543,873 B2 | 1/2023 | Sengupta et al. |
| 2002/0089190 A1 | 7/2002 | Wang et al. |
| 2002/0091738 A1 | 7/2002 | Rohrabaugh et al. |
| 2003/0043174 A1 | 3/2003 | Hinckley et al. |
| 2003/0174149 A1 | 9/2003 | Fujisaki et al. |
| 2004/0158739 A1 | 8/2004 | Wakai et al. |
| 2004/0175020 A1 | 9/2004 | Bradski et al. |
| 2004/0252101 A1 | 12/2004 | Wilk |
| 2005/0071698 A1 | 3/2005 | Kangas |
| 2006/0146030 A1 | 7/2006 | Kim |
| 2006/0192775 A1 | 8/2006 | Nicholson et al. |

(56) References Cited

U.S. PATENT DOCUMENTS

| | | |
|---|---|---|
| 2007/0228138 A1 | 10/2007 | Huang et al. |
| 2008/0046425 A1 | 2/2008 | Perski |
| 2008/0112571 A1 | 5/2008 | Bradicich et al. |
| 2008/0158144 A1 | 7/2008 | Schobben et al. |
| 2008/0301300 A1 | 12/2008 | Toub |
| 2009/0092293 A1 | 4/2009 | Lin |
| 2009/0165125 A1* | 6/2009 | Brown ............... G06F 21/31 726/21 |
| 2010/0039376 A1 | 2/2010 | Wang |
| 2010/0079508 A1 | 4/2010 | Hodge et al. |
| 2010/0100716 A1 | 4/2010 | Scott |
| 2010/0281432 A1 | 11/2010 | Geisner et al. |
| 2010/0295839 A1 | 11/2010 | Nagaya |
| 2011/0055752 A1 | 3/2011 | Rubinstein et al. |
| 2011/0154266 A1 | 6/2011 | Friend et al. |
| 2011/0175932 A1 | 7/2011 | Yu et al. |
| 2011/0248918 A1 | 10/2011 | Yoo et al. |
| 2011/0251733 A1 | 10/2011 | Atkinson |
| 2011/0252339 A1 | 10/2011 | Lemonik et al. |
| 2011/0273546 A1 | 11/2011 | Lin et al. |
| 2011/0296163 A1 | 12/2011 | Abernethy et al. |
| 2011/0298702 A1 | 12/2011 | Sakata et al. |
| 2011/0298967 A1 | 12/2011 | Clavin et al. |
| 2012/0032894 A1 | 2/2012 | Parivar et al. |
| 2012/0054670 A1 | 3/2012 | Rainisto |
| 2012/0062470 A1 | 3/2012 | Chang |
| 2012/0123680 A1 | 5/2012 | Wipplinger et al. |
| 2012/0171656 A1 | 7/2012 | Shen |
| 2012/0172085 A1 | 7/2012 | Vuppu et al. |
| 2012/0249429 A1 | 10/2012 | Anderson et al. |
| 2012/0268893 A1 | 10/2012 | Yin |
| 2012/0300061 A1 | 11/2012 | Osman et al. |
| 2012/0319997 A1 | 12/2012 | Majumder |
| 2013/0007096 A1 | 1/2013 | Pahlavan et al. |
| 2013/0007590 A1 | 1/2013 | Rivera et al. |
| 2013/0021265 A1 | 1/2013 | Selim |
| 2013/0021750 A1 | 1/2013 | Senatori |
| 2013/0120460 A1 | 5/2013 | Adams et al. |
| 2013/0158999 A1 | 6/2013 | Maruta et al. |
| 2013/0173946 A1 | 7/2013 | Rotem et al. |
| 2013/0174016 A1 | 7/2013 | Glazer et al. |
| 2013/0185633 A1 | 7/2013 | Bunker et al. |
| 2013/0207895 A1 | 8/2013 | Lee et al. |
| 2013/0212462 A1 | 8/2013 | Athas et al. |
| 2013/0222329 A1 | 8/2013 | Larsby et al. |
| 2013/0283213 A1 | 10/2013 | Guendelman et al. |
| 2013/0289792 A1 | 10/2013 | Cheng et al. |
| 2013/0321265 A1 | 12/2013 | Bychkov et al. |
| 2013/0321271 A1 | 12/2013 | Bychkov et al. |
| 2013/0332760 A1 | 12/2013 | Reece et al. |
| 2014/0006830 A1 | 1/2014 | Kamhi et al. |
| 2014/0028548 A1 | 1/2014 | Bychkov et al. |
| 2014/0050360 A1 | 2/2014 | Lin et al. |
| 2014/0085451 A1 | 3/2014 | Kamimura et al. |
| 2014/0089865 A1 | 3/2014 | Gay et al. |
| 2014/0129937 A1 | 5/2014 | Jarvinen et al. |
| 2014/0132508 A1 | 5/2014 | Hodge et al. |
| 2014/0132514 A1 | 5/2014 | Kuzara et al. |
| 2014/0139456 A1 | 5/2014 | Wigdor et al. |
| 2014/0149935 A1 | 5/2014 | Johnson et al. |
| 2014/0189579 A1 | 7/2014 | Rimon et al. |
| 2014/0191995 A1 | 7/2014 | Karpin et al. |
| 2014/0201690 A1 | 7/2014 | Holz |
| 2014/0208260 A1 | 7/2014 | Kawahara et al. |
| 2014/0258942 A1 | 9/2014 | Kutliroff et al. |
| 2014/0267021 A1 | 9/2014 | Lee et al. |
| 2014/0267034 A1 | 9/2014 | Krulce |
| 2014/0281918 A1 | 9/2014 | Wei et al. |
| 2014/0313120 A1 | 10/2014 | Kamhi |
| 2014/0344599 A1 | 11/2014 | Branover |
| 2014/0361977 A1 | 12/2014 | Stafford et al. |
| 2014/0372511 A1 | 12/2014 | Kapadia et al. |
| 2014/0379340 A1 | 12/2014 | Timem |
| 2014/0380075 A1 | 12/2014 | Pulapaka et al. |
| 2015/0009238 A1 | 1/2015 | Kudalkar |
| 2015/0015688 A1 | 1/2015 | Yang |
| 2015/0042572 A1 | 2/2015 | Lombardi et al. |
| 2015/0058649 A1 | 2/2015 | Song et al. |
| 2015/0100884 A1 | 4/2015 | Ryu et al. |
| 2015/0121193 A1 | 4/2015 | Beveridge et al. |
| 2015/0121287 A1 | 4/2015 | Fermon |
| 2015/0177843 A1 | 6/2015 | Kwon |
| 2015/0185909 A1 | 7/2015 | Gecnuk |
| 2015/0193395 A1 | 7/2015 | Nicolaou et al. |
| 2015/0220149 A1 | 8/2015 | Plagemann et al. |
| 2015/0220150 A1 | 8/2015 | Plagemann et al. |
| 2015/0248167 A1 | 9/2015 | Turbell et al. |
| 2015/0264572 A1 | 9/2015 | Turgeman |
| 2015/0360567 A1 | 12/2015 | Sannomiya et al. |
| 2015/0363070 A1 | 12/2015 | Katz |
| 2015/0378443 A1 | 12/2015 | Luo |
| 2015/0378748 A1 | 12/2015 | Cheng |
| 2016/0034019 A1 | 2/2016 | Seo et al. |
| 2016/0062584 A1 | 3/2016 | Cohen et al. |
| 2016/0087981 A1* | 3/2016 | Dorresteijn ............ H04L 63/18 726/7 |
| 2016/0091938 A1 | 3/2016 | Edwards et al. |
| 2016/0109961 A1 | 4/2016 | Parshionikar |
| 2016/0116960 A1 | 4/2016 | Kwak et al. |
| 2016/0132099 A1 | 5/2016 | Grabau et al. |
| 2016/0170617 A1 | 6/2016 | Shi et al. |
| 2016/0179767 A1 | 6/2016 | Mavinakuli et al. |
| 2016/0180762 A1 | 6/2016 | Bathiche et al. |
| 2016/0187994 A1 | 6/2016 | La et al. |
| 2016/0202750 A1 | 7/2016 | Pulapaka et al. |
| 2016/0212317 A1 | 7/2016 | Alameh et al. |
| 2016/0232701 A1 | 8/2016 | Drozdyuk |
| 2016/0259467 A1 | 9/2016 | Nayyar et al. |
| 2016/0297362 A1 | 10/2016 | Tijerina et al. |
| 2016/0370860 A1 | 12/2016 | Bychkov et al. |
| 2017/0010654 A1 | 1/2017 | Chen |
| 2017/0018234 A1 | 1/2017 | Na et al. |
| 2017/0034146 A1* | 2/2017 | Sugaya ................ H04W 12/06 |
| 2017/0039170 A1 | 2/2017 | Tunali et al. |
| 2017/0075479 A1 | 3/2017 | Tsukamoto |
| 2017/0085790 A1 | 3/2017 | Bohn |
| 2017/0090585 A1 | 3/2017 | Bernhart |
| 2017/0147879 A1 | 5/2017 | Alameh et al. |
| 2017/0201254 A1 | 7/2017 | Hanssen et al. |
| 2017/0219240 A1 | 8/2017 | Cassini et al. |
| 2017/0269725 A1 | 9/2017 | Kang |
| 2017/0321856 A1 | 11/2017 | Keates |
| 2018/0039410 A1 | 2/2018 | Kim et al. |
| 2018/0039990 A1 | 2/2018 | Lindemann |
| 2018/0136719 A1 | 5/2018 | Chen |
| 2018/0157815 A1 | 6/2018 | Salama et al. |
| 2018/0164942 A1 | 6/2018 | Huffman et al. |
| 2018/0166076 A1 | 6/2018 | Higuchi et al. |
| 2018/0188774 A1 | 7/2018 | Ent et al. |
| 2018/0188803 A1 | 7/2018 | Sharma et al. |
| 2018/0189547 A1 | 7/2018 | Daniels et al. |
| 2018/0224871 A1 | 8/2018 | Sahu et al. |
| 2018/0321731 A1 | 11/2018 | Alfano et al. |
| 2018/0373292 A1 | 12/2018 | Perelli |
| 2019/0004764 A1 | 1/2019 | Son et al. |
| 2019/0034609 A1 | 1/2019 | Yang et al. |
| 2019/0079572 A1 | 3/2019 | Yamamoto |
| 2019/0129473 A1 | 5/2019 | Hu et al. |
| 2019/0147875 A1 | 5/2019 | Stemmer et al. |
| 2019/0155364 A1 | 5/2019 | Chen |
| 2019/0155368 A1 | 5/2019 | Branover |
| 2019/0174419 A1 | 6/2019 | Schillings et al. |
| 2019/0236390 A1 | 8/2019 | Guo et al. |
| 2019/0239384 A1 | 8/2019 | North et al. |
| 2019/0250691 A1 | 8/2019 | Lee et al. |
| 2019/0258785 A1* | 8/2019 | Alameh ................ G06F 1/3265 |
| 2019/0265831 A1 | 8/2019 | Sinnott et al. |
| 2019/0278339 A1 | 9/2019 | Cooper et al. |
| 2019/0361501 A1 | 11/2019 | Park et al. |
| 2019/0371326 A1 | 12/2019 | Booklet et al. |
| 2019/0371342 A1 | 12/2019 | Tukka et al. |
| 2020/0012331 A1 | 1/2020 | de Cesare et al. |
| 2020/0026342 A1 | 1/2020 | Sengupta et al. |
| 2020/0033920 A1 | 1/2020 | Nielsen et al. |

(56) References Cited

U.S. PATENT DOCUMENTS

| | | | |
|---|---|---|---|
| 2020/0092817 A1 | 3/2020 | Bai | |
| 2020/0125158 A1 | 4/2020 | Giusti et al. | |
| 2020/0125179 A1 | 4/2020 | Okuley | |
| 2020/0133358 A1 | 4/2020 | Mishra et al. | |
| 2020/0133374 A1 | 4/2020 | Sinha et al. | |
| 2020/0142471 A1 | 5/2020 | Azam et al. | |
| 2020/0175944 A1 | 6/2020 | Sun et al. | |
| 2020/0213501 A1 | 7/2020 | Sohn | |
| 2020/0259638 A1* | 8/2020 | Carmignani | H04L 9/0869 |
| 2020/0348745 A1 | 11/2020 | Hamlin et al. | |
| 2021/0025976 A1 | 1/2021 | Chandel et al. | |
| 2021/0096237 A1 | 4/2021 | Patole et al. | |
| 2021/0109585 A1 | 4/2021 | Fleming et al. | |
| 2021/0240254 A1 | 8/2021 | Hamlin et al. | |
| 2021/0318743 A1* | 10/2021 | Partiwala | G06N 20/00 |
| 2022/0147142 A1 | 5/2022 | Bui et al. | |

FOREIGN PATENT DOCUMENTS

| | | |
|---|---|---|
| CN | 102197349 B | 6/2014 |
| CN | 107077184 | 8/2017 |
| CN | 112558056 A | 3/2021 |
| EP | 2518586 | 10/2012 |
| EP | 3285133 A1 | 2/2018 |
| EP | 3285133 B1 | 1/2019 |
| JP | H0651901 A | 2/1994 |
| JP | 10-240389 A | 9/1998 |
| JP | 2001255854 A | 9/2001 |
| JP | 2002071833 A | 3/2002 |
| JP | 2005221907 A | 8/2005 |
| JP | 2010060746 A | 3/2010 |
| JP | 2010271339 A | 12/2010 |
| JP | 2011137874 A | 7/2011 |
| JP | 2016517087 A | 6/2016 |
| KR | 20150022673 | 3/2015 |
| KR | 20180029370 A | 3/2018 |
| KR | 20190027930 A | 3/2019 |
| WO | 2010071631 | 6/2010 |
| WO | 2014131188 | 9/2014 |
| WO | 2014186294 | 11/2014 |
| WO | 2014205227 A2 | 12/2014 |
| WO | 20150026203 | 2/2015 |
| WO | 2020191643 A1 | 10/2020 |
| WO | 2021258395 | 12/2021 |

OTHER PUBLICATIONS

NVIDIA, "NVIDIA® Preface™ Platform Enables Windows Vista On The Go," Jan. 8, 2007, available at https://www.nvidia.com/object/IO_38775.html (retrieved May 6, 2019), 5 pages.

NVIDIA, "NVIDIA and ASUS Deliver World's First Notebook with Windows Sideshow Secondary Display," Jan. 8, 2007, available at https://www.nvidia.com/object/IO_38772.html (retrieved May 6, 2019), 5 pages.

"CES 2007: Vista SideShow in HP, Fujitsu, LG and Asus Notebooks," Notebook Review, Jan. 8, 2007, available at www.notebookreview.com/news/ces-2007-vista-sideshow-in-hp-fujitsu-lg-and-asus-notebooks/ (retrieved May 6, 2019), 8 pages.

NVIDIA, "PDK User's Guide: Preface Personal Media Device," Sep. 4, 2007, 39 pages.

"Open Sesame! Gesture-Controlled Motorized Laptop Lid", Gajitz, available at https://gajitz.com/open-sesame-gesture-controlled-motorized-laptop-lid/ (last accessed May 6, 2019), 3 pages.

Purcher, ""Google Patents a Motorized Pixelbook Lid that Opens and Closes with a Simple Touch & Auto-Aligns the Display to the user's Face"", Patently Mobile, Nov. 25, 2017, available at https://www.patentlymobile.com/2017/11/google-patents-a-motorized-pixelbook-lid-that-opens-and-closes-with-a-simple-touch-auto-aligns-the-display-to-the-users-fa.html (retrieved May 5, 2019), 6 pages.

"Cosmo Communicator", Indiegogo, available at https://www.indiegogo.com/projects/cosmo-communicator#/ (last accessed May 6, 2019), 18 pages.

Cutress, "Asus ZenBook Pro 15(UX580): A 5.5-inch Screen in the Touchpad", AnandTech, Jun. 5, 2018, available at https://www.anandtech.com/show/12880/asus-zenbook-pro-15-ux580-a-55inch-screen-in-the-touchpad (retrieved Dec. 18, 2018), 5 pages.

Chin, "Alexa on Windows 10 Hands-On: Useful, with 1 Big Catch", Laptop Magazine, Nov. 14, 2018, available at https://www.laptopmag.com/articles/alexa-windows-10-hands-on (retrieved May 6, 2019), 6 pages.

Bushan, "CES 2019: Dell's new laptop can sense your presence and wake itself," Hindustan Times, Jan. 5, 2019, available at https://www.hindustantimes.com/tech/ces-2019-dell-latitude-7400-2-in-1-laptop-launched-price-specifications-features/story-CiRoU1GoHHsHq3K3qtPZWJ.html (retrieved May 6, 2019), 8 pages.

International Searching Authority, "Written Opinion," issued in connection with International Patent Application No. PCT/CN2019/079790, dated Jan. 3, 2020, 4 pages.

International Searching Authority, "Search Report," issued in connection with International Patent Application No. PCT/CN2019/079790, dated Jan. 3, 2020, 5 pages.

European Patent Office, "Extended European Search Report," issued in connection with European Patent Application No. 20164273.3, dated Oct. 19, 2020, 14 pages.

United States Patent and Trademark Office, "Notice of Allowance," issued in connection with U.S. Appl. No. 29/673,785, dated Nov. 16, 2020, 8 pages.

European Patent Office,"Extended Search Report," issued in connection with European Patent Application No. 20181123.9, dated Dec. 4, 2020, 11 pages.

"Dell's New Latitude 7400 2-in-1 Can Detect Your Presence and Automatically Wake the System," MSPowerUser, Jan. 4, 2019, available at https://mspoweruser.com/dells-new-latitude-7400-2-in-1-can-detect-your-presence-and-automatically-wake-the-system/ (20 pages).

United States Patent and Trademark Office, "Advisory Action" issued in connection with U.S. Appl. No. 14/866,894, dated Nov. 5, 2019, 3 pages.

United States Patent and Trademark Office, "Final Office Action" issued in connection with U.S. Appl. No. 14/866,894, dated Jul. 29, 2019, 18 pages.

United States Patent and Trademark Office, "Final Office Action" issued in connection with U.S. Appl. No. 14/866,894, dated Jun. 23, 2020, 17 pages.

United States Patent and Trademark Office, "Non Final Office Action" issued in connection with U.S. Appl. No. 14/866,894, dated Feb. 21, 2020, 17 pages.

United States Patent and Trademark Office, "Non Final Office Action" issued in connection with U.S. Appl. No. 14/866,894, dated Oct. 8, 2020, 18 pages.

United States Patent and Trademark Office, "Non-Final Office Action" issued in connection with U.S. Appl. No. 14/866,894, dated Dec. 14, 2018, 12 pages.

European Patent Office, "Extended European Search Report," issued in connection with European Patent Application No. 20197337.7, dated Mar. 9, 2021, 11 pages.

European Patent Office, "Rule 62a(1) Communication," issued in connection with European Patent Application No. 20197335.1, dated Mar. 17, 2021, 2 pages.

United States Patent and Trademark Office, "Final Office Action," issued in connection with U.S. Appl. No. 14/866,894, dated May 11, 2021, 17 pages.

European Patent Office, "Extended European Search Report" issued in connection with European Patent Application No. 20194494.9, dated Feb. 17, 2021, 7 pages.

International Searching Authority, "International Search Report," issued in connection with PCT Application No. PCT/US2016/048953, dated Nov. 23, 2016, 3 pages.

International Searching Authority, "Written Opinion of the International Searching Authority," issued in connection with PCT Application No. PCT/US2016/048953, dated Nov. 23, 2016, 9 pages.

United States Patent and Trademark Office, "Non-Final Office Action," issued in connection with U.S. Appl. No. 16/728,774, dated May 3, 2021, 12 pages.

(56) References Cited

OTHER PUBLICATIONS

European Patent Office, "Extended European Search Report," issued in connection with European Patent Application No. 20197335.1, dated Jul. 16, 2021, 11 pages.
International Searching Authority, "International Preliminary Report on Patentability," issued in connection with PCT/US2016/048953, dated Mar. 27, 2018, 10 pages.
International Searching Authority, "Search Report and Written Opinion," issued in connection with PCT Application No. PCT/CN2020/098326, dated Mar. 29, 2021, 9 pages.
United States Patent and Trademark Office, "Notice of Allowance and Fee(s) Due," issued in connection with U.S. Appl. No. 14/866,894, dated Jul. 30, 2021, 8 pages.
United States Patent and Trademark Office, "Final Office Action," issued in connection with U.S. Appl. No. 16/728,774, dated Sep. 22, 2021, 20 pages.
United States Patent and Trademark Office, "Non Final Office Action," issued in connection with U.S. Appl. No. 16/421,217, dated Oct. 27, 2021, 29 pages.
European Patent Office, "Communication pursuant to Article 94(3) EPC," issued in connection with European Patent Application No. 20164273.3, dated Sep. 28, 2021, 9 pages.
United States Patent and Trademark Office, "Non-Final Office Action," issued in connection with U.S. Appl. No. 16/586,225, dated Jun. 15, 2021, 14 pages.
United States Patent and Trademark Office, "Notice of Allowance," issued in connection with U.S. Appl. No. 16/586,225, dated Dec. 8, 2021, 6 pages.
United States Patent and Trademark Office, "Corrected Notice of Allowability," issued in connection with U.S. Appl. No. 16/586,225, dated Dec. 16, 2021, 3 pages.
United States Patent and Trademark Office, "Requirement for Restriction," issued in connection with U.S. Appl. No. 29/673,785, dated Aug. 27, 2020, 4 pages.
International Searching Authority, "International Preliminary Report on Patentability," issued in connection with application No. PCT/CN2019/079790, dated Sep. 28, 2021, 5 pages.
United States Patent and Trademark Office, "Non-Final Office Action" issued in connection with U.S. Appl. No. 16/728,899, dated Dec. 8, 2021, 9 pages.
United States Patent and Trademark Office, "Notice of Allowance and Fee(s) Due," issued in connection with U.S. Appl. No. 16/586,225, dated Apr. 29, 2022, 6 pages.
United States Patent and Trademark Office, "Corrected Notice of Allowability," issued in connection with U.S. Appl. No. 16/586,225, dated May 18, 2022, 3 pages.
United States Patent and Trademark Office, "Non-Final Office Action," issued in connection with U.S. Appl. No. 17/434,603, dated Jul. 5, 2022, 15 pages.
International Searching Authority, "International Search Report", issued in connection with PCT. Application No. PCT/US2021/049649, dated Jan. 14, 2022, 5 pages.
International Searching Authority, "Written Opinion", issued in connection with PCT. Application No. PCT/US2021/049649, dated Jan. 14, 2022, 9 pages.
United States Patent and Trademark Office, "Final Office Action," issued in connection with U.S. Appl. No. 16/728,899, dated Jun. 24, 2022, 10 pages.
United States Patent and Trademark Office, "Advisory Action" issued in connection with U.S. Appl. No. 14/866,894, dated Aug. 17, 2020, 3 pages.
United States Patent and Trademark Office, "Notice of Allowance and Fee(s) Due," issued in connection with U.S. Appl. No. 16/728,774, dated Feb. 2, 2022, 9 pages.
United States Patent and Trademark Office, "Notice of Allowance and Fee(s) Due" issued in connection with U.S. Appl. No. 16/421,217, dated Mar. 9, 2022, 6 pages.
United States Patent and Trademark Office, "Corrected Notice of Allowability" issued in connection with U.S. Appl. No. 16/586,225, dated Mar. 16, 2022, 3 pages.

Cravotta, Nicholas, "Optimizing Proximity Sensing for Consumer Electronics Applications," Digi-Key Electronics, Apr. 26, 2012, 9 pages.
Chethan, "Proximity Sensing with CapSense," Cypress AN92239, 2016, 62 pages.
International Searching Authority, "International Search Report," issued in connection with PCT Application No. PCT/CN2022/084726, dated Jan. 4, 2023, 4 pages.
International Searching Authority, "Written Opinion," issued in connection with PCT Application No. PCT/CN2022/084726, dated Jan. 4, 2023, 4 pages.
United States Patent and Trademark Office, "Non-Final Office Action," issued in connection with U.S. Appl. No. 17/129,465, dated Jan. 5, 2023, 12 pages.
United States Patent and Trademark Office, "Notice of Allowance and Fee(s) Due," issued in connection with U.S. Appl. No. 16/586,225, dated Aug. 31, 2022, 5 pages.
United States Patent and Trademark Office, "Corrected Notice of Allowability," issued in connection with U.S. Appl. No. 16/586,225, dated Sep. 19, 2022, 2 pages.
United States Patent and Trademark Office, "Non-Final Office Action" issued in connection with U.S. Appl. No. 16/728,899, dated Oct. 20, 2022, 9 pages.
European Patent Office, "Extended European Search Report," issued in connection with European Patent Application No. 19921860.3, dated Oct. 10, 2022, 8 pages.
European Patent Office, "Communication pursuant to Article 71(3) EPC," issued in connection with European Patent Application No. 20164273.3, dated Dec. 23, 2022, 78 pages.
European Patent Office, "Communication pursuant to Article 94(3) EPC," issued in connection with European Patent Application No. 20194494.9, dated Jan. 24, 2023, 6 pages.
United States Patent and Trademark Office, "Final Office Action," issued in connection with U.S. Appl. No. 17/434,603, dated Feb. 8, 2023, 17 pages.
Intellectual Property India, "Examination Report," issued in connection with Indian Patent Application No. 202147037534, dated Feb. 2, 2023, 6 pages.
Japanese Patent Office, "Notice of Reasons for Rejection," issued in connection with Japanese Patent Application No. 2021-538701, dated Feb. 21, 2023, 7 pages (English translation included).
United States Patent and Trademark Office, "Non-Final Office action," issued in connection with U.S. Appl. No. 17/732,173, dated May 30, 2023, 28 pages.
Samsung, "Samsung Galaxy Fold Now Available," Samsung Global Newsroom, dated Sep. 5, 2019, retrieved from https://news.samsung.com/global/samsung-galaxy-fold-now-available) on Jun. 8, 2023, 7 pages.
GSMArena team, "Samsung Galaxy Fold long-term review," GSMARENA, dated Nov. 9, 2019, retrieved from https://www.gsmarena.com/samsung_galaxy_fold_long_term-review-1996p7.php on Jun. 8, 2023, 8 pages.
GSMArena team, "Samsung Galaxy Fold review," GSMARENA, dated Apr. 26, 2019, retrieved from https://www. gsmarena.com/samsung_galaxy_fold-review-1926p4.php on Jun. 8, 2023, 8 pages.
United States Patent and Trademark Office, "Notice of Allowance and Fee(s) Due," issued in connection with U.S. Appl. No. 16/728,899, dated Apr. 3, 2023, 10 pages.
Japanese Patent Office, "Decision of Refusal," in connection with Japanese Patent Application No. 2021-538701, dated Jun. 6, 2023, 6 pages. [English Translation Included].
United States Patent and Trademark Office, "Final Office Action," issued in connection with U.S. Appl. No. 17/129,465, dated Jul. 7, 2023, 15 pages.
United States Patent and Trademark Office, "Notice of Allowance and Fee(s) Due," issued in connection with U.S. Appl. No. 18/160,419, dated Aug. 23, 2023, 11 pages.
European Patent Office, "Communication pursuant to Article 94(3) EPC," issued in connection with European Patent Application No. 20197337.7-1218, dated Aug. 10, 2023, 10 pages.

(56) References Cited

OTHER PUBLICATIONS

United States Patent and Trademark Office, "Non-Final Office Action," issued in connection with U.S. Appl. No. 17/434,603, dated Sep. 7, 2023, 17 pages.

* cited by examiner

SYSTEMS AND METHODS FOR MULTI-MODAL USER DEVICE AUTHENTICATION

FIELD OF THE DISCLOSURE

This disclosure relates generally to authentication of a user of an electronic user device and, more particularly, to systems and methods for multi-modal user device authentication.

BACKGROUND

An electronic user device, such as a laptop or a tablet, can provide for secure access to data (e.g., application(s), media) stored in a memory of the device by authenticating a user before allowing the user to access the data. User authentication modes can include recognition of a user as an authorized user of the device via image analysis (e.g., facial recognition) or speech analysis.

BRIEF DESCRIPTION OF THE DRAWINGS

The figures are not to scale. In general, the same reference numbers will be used throughout the drawing(s) and accompanying written description to refer to the same or like parts.

Figure 1:
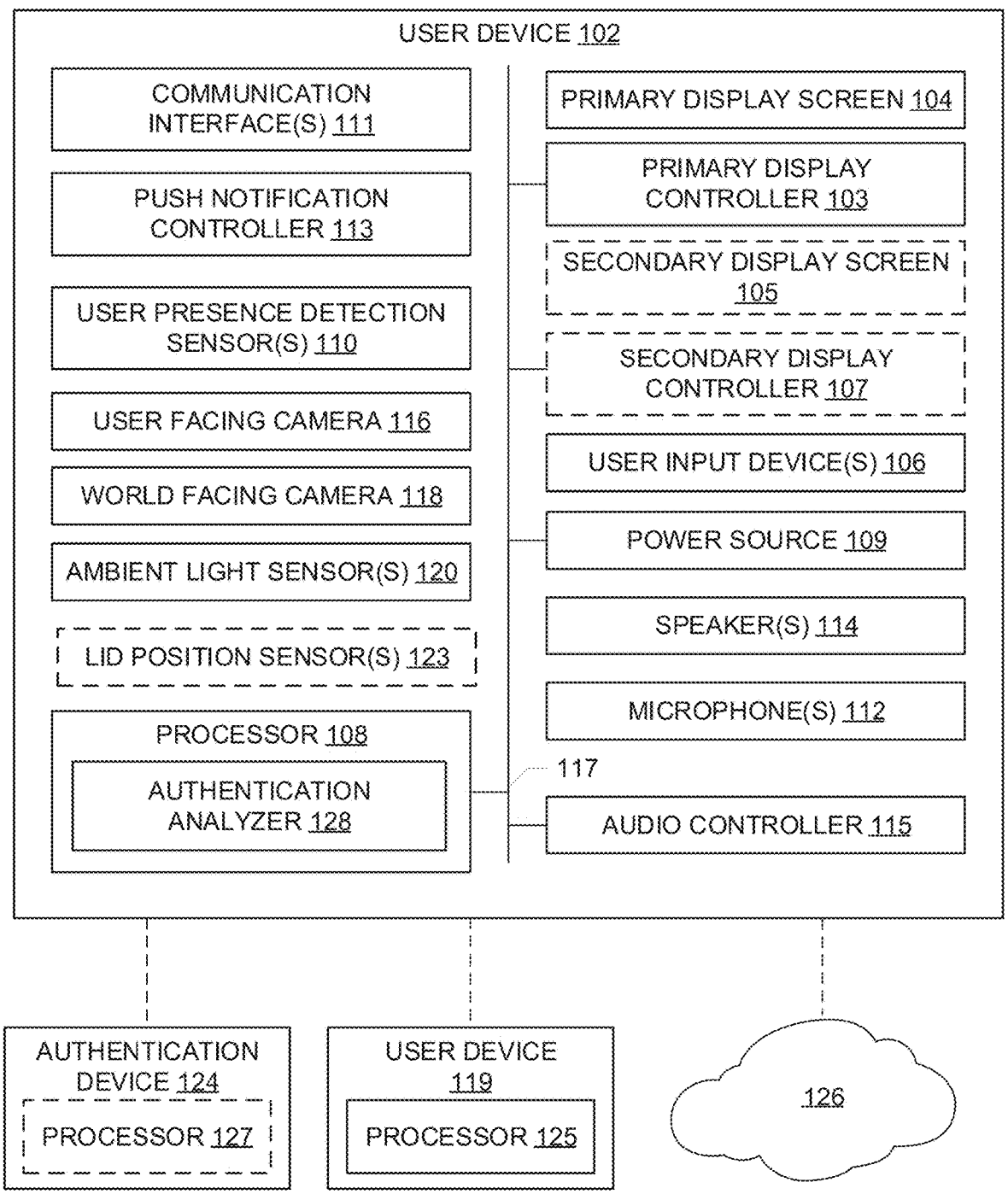
FIG. 1 illustrates an example system constructed in accordance with teachings of this disclosure and including an example user device and an example authentication analyzer for controlling user access to data stored on the user device.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An electronic device, such as a laptop or a tablet, can provide for secure access to data (e.g., media file(s), application(s)) stored in a memory of the device by authenticating the user before allowing the user to interact with the data stored on the device. In some instances, when the user is finished using the device, the user may log out of the device such that the user or another user cannot access the data stored on the device until the identity of the user or the new user is verified. In other instances, processor(s) of the device may automatically log the user out of the device when the device is turned on but has not received a user input for an extended period time based on user security setting(s). In addition to logging the user out of the device for security purposes, the device can enter a low power state in an effort to reduce power consumption when the device is not being actively used by the user. In some examples, the device enters a connected standby mode, or a low power standby state in which the device remains connected to the Internet such that processor(s) of the device can respond quickly to hardware and/or network events.

To provide access to data on the device after a user has been logged out, some known devices require the user to enter a password or provide another identification input such as a fingerprint. The identification input(s) are used to verify that the user is an authorized user of the device. Some known devices attempt to automatically authenticate the user via image recognition to avoid the need for the user to provide manual identification input(s). A camera of the known device can generate an image of the user when the user is within the field of view of the camera (e.g., in front of a display screen of the device). Such known devices attempt to authenticate the user based on, for instance, facial recognition analysis. However, to effectively authenticate the user using image data in known devices, the user should be oriented relative to the device such that his or her face is facing the display screen. If the image generated by the camera does not completely capture the user's face, the known device may not be able to authenticate the user via facial recognition. In such cases, the known device requests that the user manually provide identification data (e.g., a password, a fingerprint). Also, such known devices may not recognize the user if the user is wearing an accessory such as glasses or a hat when the image is obtained because the device was not trained to recognize the user with that accessory. Also, such known devices may not recognize the user if the ambient lighting in the environment in which the device is located is low (e.g., a dark room) because the low light environment can affect a quality of the image data. In such instances, the known devices produce an error and the user is required to manually provide identification information to access data on the device. Thus, known devices require particular conditions for the authentication of the user via image analysis. If such conditions are not present and authentication fails, the user is required to manually provide an input to gain access to data on the device.

Further, for known devices such as laptops that have a clamshell form factor, the camera may be located proximate to the display screen of the device such that the lid of the device must be open to enable the camera to capture an image of the user. Thus, in instances where the lid is closed when the user wishes to use the device, the user must open the lid to enable the authentication process via image data to be performed.

In some known devices, authenticating the user via image analysis involves waking the device from a low power state to a working system power state to activate the camera, process the image data, and/or perform the image analysis. In the working system power state, the device is fully operational in that the display screen is turned on, applications are being executed by processor(s) of the device, etc. The device consumes the highest amount of power in the working system power state. Thus, in some known devices, the authentication process involves high power consumption by the device. Further, some known devices require the device to be in the working system power state to receive Internet-based alerts such as incoming Skype® calls and/or to communicate with other devices to enable, for instance, screen sharing between two devices.

Some known devices attempt to maintain the device in the low power state until a subject is detected in the vicinity of the device based on data generated by presence detection sensors. However, the subject detected by the presence detection sensors may be a person who is walking by the device but does not intend to use the device. Also, the subject detected could be a non-human subject such as a pet. As a result, power is unnecessarily consumed by the device when the device moves to the working system power state in anticipation of performing authentication of the subject based only on detection of a subject near the device.

Disclosed herein are example user devices that provide for low power authentication of a user as an authorized user of the user device using one or more authentication modes while the device remains in a connected standby mode. Examples disclosed herein use a multi-level process to authenticate the user as an authorized user based on a determination of user intent to use the device, environmental factors such as an amount of lighting in an environment in which the device is located, and a degree of confidence with which the user is predicted to be an authorized user. Example user devices disclosed herein include proximity sensor(s) to detect when a user is present relative to the user device. Based on the sensor data indicating user presence proximate to the user device, examples disclosed herein selectively activate microphone(s) or camera(s) of the user device to generate audio data or image data, respectively. The audio data or image data is used to perform an initial authentication attempt of the user using voice recognition or image recognition. Some examples disclosed herein choose to activate the microphone(s) or the camera(s) to perform the initial authentication analysis based on, for instance, ambient lighting conditions in the environment in which the device is located. For instance, if the device is located in a low-light environment, examples disclosed herein can select to activate the microphone(s) over the camera(s) to authenticate the user based on voice recognition rather than attempting to authenticate the user using image data that may be poor quality due to the low light setting.

Examples disclosed herein evaluate a confidence level with which the user is predicted to be authorized user via the initial authentication mode (i.e., voice recognition analysis or image recognition analysis). Based on the confidence level analysis, examples disclosed herein determine if the user can be successfully authenticated as an authorized user of the user device based on the initial authentication mode alone (e.g., based on audio recognition alone or image recognition alone) or if supplemental authentication should be performed to increase a confidence level with which the user is identified as an authorized user of the device.

For example, if image recognition analysis is the initial authentication mode, image data generated by the camera(s) of the device is analyzed to predict whether the user identified in the image data is a known authorized user of the device (e.g., based on facial feature analysis). The prediction is assigned a confidence level with respect to the recognition of the authorized user in the image data. If the confidence level for authenticating the user as an authorized user based on the image data generated by the camera(s) of the device does not meet a predefined confidence threshold, examples disclosed herein determine whether audio data should be collected from the user to perform voice analysis. In such examples, the confidence levels associated with the image recognition analysis and the voice recognition analysis are evaluated to determine if the results of the combined analysis meet a threshold for authenticating the user based on image data and audio data. In other instances, example disclosed herein may check for the presences of a trusted authentication device (e.g., another user device, a key fob) and authenticate the user based on the combination of the image recognition and the presence of the trusted authentication device. Examples disclosed herein maintain the user device in the low power, connected standby mode until the user is authenticated as an authorized user. When the user is verified as an authorized user of the device, examples disclosed herein instruct the device to move to the fully powered state and automatically log the user into the device to enable the user to access data (e.g., application(s), media) stored in the memory of the device. Thus, examples disclosed herein provide for automatic, multi-modal authentication of a user to confirm that the user attempting to access data stored on the device is an authorized user of the device that optimizes power consumption by the device.

Example user devices disclosed herein can receive requests or push notification(s) from remote user device(s) while the device is in the connected standby mode, such as requests to share screens between devices, to transfer a file, and/or to share power or wireless charging capabilities. If a user of an example user device disclosed herein accepts a request received from a remote device, examples disclosed herein attempt to automatically authenticate the user as an authorized user of the example user device via multi-modal authentication (e.g., image recognition, voice recognition, a combination of image recognition and voice recognition) while the user device is in the connected standby mode. If the user is verified as an authorized user, examples disclosed herein direct the device to take one or more actions in response to the request, such as displaying shared content via a display screen of the device. In some examples disclosed herein, actions such as displaying a shared screen received from a remote device can be performed while the device remains in the low power, connected standby mode.

Although examples disclosed herein are discussed in connection with a connected standby mode of a user device, examples disclosed herein can be implemented in connection with other known standby/sleep power states or future standby/sleep power states providing for always-on internet protocol functionality.

FIG. 1 illustrates an example system 100 constructed in accordance with teachings of this disclosure for controlling authentication of a user of a personal computing (PC) device or user device 102 to allow the user (the terms "user" and "subject" are used interchangeably herein and both refer to a biological creature such as a human being) to access data stored in a memory of the device 102. The user device 102 can be, for example, a laptop, a desktop, a hybrid or convertible PC, an electronic tablet, etc.

The example user device 102 includes a primary display screen 104. In examples where the user device 102 is a laptop or other clamshell device, the primary display screen 104 is carried by a lid of the laptop, where the lid is moveable between an open position in which the primary display screen 104 is visible and a closed position in which the primary display screen 104 faces a keyboard of the device 102. In examples where the user device 102 is an electronic tablet, the primary display screen 104 is carried by a housing of the tablet.

A primary display controller 103 of the example user device 102 of FIG. 1 controls operation of the primary display screen 104 and facilitates rendering of content (e.g., user interfaces) via the primary display screen 104. In some examples, the primary display screen 104 is a touch screen that enables the user to interact with data presented on the primary display screen 104 by touching the screen with a stylus and/or one or more fingers of a hand of the user. Additionally or alternatively, the user can interact with data presented on the primary display screen 104 via one or more user input devices 106 of the user device 102, such as a keyboard, a mouse, a trackpad, etc. The example user device 102 includes a processor 108 that executes software to interpret and output response(s) based on the user input event(s) (e.g., touch event(s), keyboard input(s), etc.). The user device 102 of FIG. 1 includes a power source 109 such as a battery to provide power to the processor 108 and/or other components of the user device 102 communicatively coupled via a bus 117.

In some examples, the user device 102 of FIG. 1 includes a secondary display screen 105. The secondary display screen 105 can be smaller in size than the primary display screen 104 and can be positioned on the user device 102 to enable the user to view data even when the primary display screen 104 is turned off and/or is not visible to the user (e.g., because a lid of the user device 102 is closed). For example, the secondary display screen 105 can extend along an edge of a base of a laptop such that the secondary display screen 105 is visible to a user when the lid of the laptop is closed. In some examples, the secondary display screen 105 is a touch sensitive screen to enable the user to interact with content displayed via the secondary display screen 105. The example user device 102 includes a secondary display controller 107 to control operation of the secondary display screen 105 and to facilitate rendering of content (e.g., user interfaces) via the secondary display screen 105.

The example user device 102 includes one or more speakers 114 to provide audible outputs to a user. In some examples, the speakers 114 are positioned on an exterior surface of the user device 102 (e.g., a front edge of a base of the device so that sound produced by the speakers can be heard by users regardless of whether a lid of the device is opened or closed). The example user device 102 includes an audio controller 115 to control operation of the speaker(s) 114 and faciliate rendering of audio content via the speaker(s) 114.

In the example of FIG. 1, when the user is interacting with the user device 102 and the processor 108 receives user input(s) via touch event(s) at the primary display screen 104 and/or via the user input device(s) 106 such as a keyboard or a mouse, the user device 102 is in the working system power state (e.g., a fully powered state). In the example of FIG. 1, the processor 108 can instruct the user device 102 to move from the working system power state to a low power state after a threshold period of time without receiving any user inputs at the user device 102 (e.g., after five minutes, after ten minutes). In the example of FIG. 1, the low power state is a connected standby mode. In the connected standby mode, the primary display screen 104 of the user device 102 is turned off, certain components of the user device 102 may be partly or completely powered down, and/or certain applications may not be executed by processor(s) of the device 102. However, the user device 102 remains connected to the Internet via one or more wired or wireless connection(s) such that processor(s) 108 of the device 102 can respond quickly to hardware and/or network events.

For instance, in the connected standby mode, an email application downloads emails, rather than waiting to refresh emails when the device 102 returns to the working system power state. In some examples, the secondary display screen 105 is turned off when the device 102 enters the connected standby mode but turns on to display notifications (e.g., new emails, incoming Internet phone calls) generated while the device 102 is in the connected standby mode. In other examples, the secondary display screen 105 remains turned on for the duration in which the user device 102 is in the connected standby mode. The display state of the secondary display screen 105 when the device 102 is in the connected standby mode can be controlled by the processor 108.

The example user device 102 includes one or more communication interfaces 111 that enable the user device 102 to communicate with other (e.g., remote) user device(s) 119 in a wired or wireless manner, including when the user device 102 is in the connected standby mode. In some examples, the communication interface(s) 111 receive push notifications from the other devices 119 that are subsequently processed and/or initiate particular actions. For example, push notifications may correspond to the receipt of new email messages, incoming conference calls, receipt of a request from a nearby device 119 to connect with the computer to share a file or other document, receipt of a file shared by the nearby device 119, etc. The other user device(s) 119 can include, for instance, laptop(s), tablet(s), smartphone(s), etc. The communication interface(s) 111 can detect and/or establish communication with the other user device(s) 119 via one or more communication protocols such as Wi-Fi Direct, Bluetooth®, ultrasound beaconing, and/or other communication protocols that provide for peer-to-peer access between devices.

The example user device 102 of FIG. 1 includes a push notification controller 113 that analyzes and/or controls responses to push notification(s) received from the remote device(s) 119 via the communication interface(s) 111. In the example of FIG. 1, the push notification controller 113 remains operative when the device is in the connected standby mode to enable the device to receive incoming push notification(s).

In the example of FIG. 1, when the user device 102 enters the connected standby mode, the processor 108 logs the user out of the user device 102 such that the user or another user cannot access data (e.g., media files, application(s)) stored in the memory of the device 102 without first being authenticated or identified as an authorized user of the device 102. In the example of the FIG. 1, the user can be authenticated as an authorized user of the device 102 without providing manual identification input(s) (e.g., a password, a fingerprint) and while the device 102 is in the connected standby mode via one or more authentication modes.

The example user device 102 of FIG. 1 includes one or more user presence detection sensors 110. The user presence detection sensor(s) 110 provide means for detecting a presence of a user relative to the user device 102 in an environment in which the user device 102 is located, such as a user who is approaching the user device 102. In the example of FIG. 1, the user presence detection sensor(s) 110 can include motion sensor(s) and/or proximity sensor(s) that emit, for instance, electromagnetic radiation (e.g., light pulses) and detect changes in the signal due to the presence of a person or object (e.g., based on reflection of the electromagnetic radiation). In some examples, the user presence detection sensor(s) 110 include time-of-flight sensor(s) that measure a length of time for light to return to the sensor after being reflected off a person or object, which can be used to determine depth. The example user presence detection sensor(s) 110 can include other types of sensors, such as sensors that detect changes based on radar or sonar data.

The user presence detection sensor(s) 110 are carried by the example user device 102 such that the user presence detection sensor(s) 110 can detect changes in an environment in which the user device 102 is located that occur with a range (e.g., a distance range) of the user presence detection sensor(s) 110 (e.g., within 10 feet of the user presence detection sensor(s) 110, within 5 feet, etc.). For example, the user presence detection sensor(s) 110 can be mounted on a bezel of the primary display screen 104 and oriented such that the user presence detection sensor(s) 110 can detect a user approaching the user device 102. The user presence detection sensor(s) 110 can additionally or alternatively be at any other locations on the user device 102 where the sensor(s) 110 face an environment in which the user device 102 is located, such as on a base of the laptop (e.g., on an edge of the base in front of a keyboard carried by base), a lid of the laptop, on a base supporting the primary display screen 104 in examples where the display screen 104 is a monitor of a desktop or all-in-one PC, etc.

As disclosed herein, the user device 102 includes communication interface(s) 111 to communicate with remote devices. In some examples, the communication interface(s) 111 establish communication with one or more authentication device(s) 124 via wired or wireless communication protocols. The authentication device(s) 124 include trusted device(s) for the purposes of authenticating a user of the user device 102. The authentication device(s) 124 can include hardware token(s) (e.g., a key fob), a smartphone, a wearable device such as a smartwatch, etc. In some examples the authentication device 124 is the same as the remote user device 119. In other examples, the authentication device 124 is different than the remote user device 119.

The example user device 102 includes one or more microphones 112 to detect sounds in the environment surrounding the user device 102. The microphone(s) 112 can be carried by the user device 102 on, for example, one or more sides of a lid of the device (e.g., to enable audio monitoring when the lid is opened or closed), at an edge of a base of the user device 102 (e.g., to capture sound independent of the position of the lid of the device), etc.

The example user device 102 includes one or more cameras. In the example of FIG. 1, the user device 102 includes a user facing camera 116 positioned proximate to the primary display screen 104 such that when a user faces the primary display screen 104, the user is within a field of view of the user facing camera 116. The example user device 102 of FIG. 1 includes a world facing camera 118. In some examples, the world facing camera 118 is positioned on the user device 102 to face in the opposite direction to the primary display screen 104. For instance, when the user device 102 is a laptop, the user facing camera 116 can be positioned on an inside surface of the lid and the world facing camera 118 can be positioned on an outside surface of the lid. In some examples, the world facing camera 118 is located on a base of the device 102 to enable image data to be generated when the lid is closed. In some examples, one or more of the user facing camera 116 and/or the world facing camera 118 includes a depth-sensing camera.

The example user device 102 includes one or more ambient light sensors 120. The ambient light sensor(s) 120 are carried by the user device 102 such that the ambient light sensor(s) 120 (e.g., photodetector(s)) detect an amount of light in the environment in which the user device 102 is located. For example, the ambient light sensor(s) 120 can be disposed on the lid and/or edge of a base of the user device 102 when the user device 102 is a laptop so as to be exposed to the environment in which the device 102 is located.

In examples in which the user device 102 includes a cover or a lid (e.g., a laptop lid), the example user device 102 include lid position sensor(s) 123 to determine whether the user device 102 is in an open position (e.g., with the lid spaced apart from a base of the device 102) or a closed position (e.g., with the lid at least partially resting on the base of the device 102). The lid position sensor(s) 123 can include, for instance, magnetic sensors that detect when respective pairs of magnetic sensors are in proximity to one another. The lid position sensor(s) 123 can include other types sensor(s) and/or switches to detect a position of the device 102.

The example system 100 of FIG. 1 includes one or more semiconductor-based processors to process data generated by the user presence detection sensor(s) 110, the communication interface(s) 111, the microphone(s) 112, the user facing camera 116, the world facing camera 118, the ambient light sensor(s) 120, and/or the lid position sensor(s) 123. For example, the user presence detection sensor(s) 110, the communication interface(s) 111, the microphone(s) 112, the user facing camera 116, the world facing camera 118, the ambient light sensor(s) 120, and/or the lid position sensor(s) 123 can transmit data to the on-board processor 108 of the user device 102. In other examples, the user presence detection sensor(s) 110, the communication interface(s) 111, the microphone(s) 112, the user facing camera 116, the world facing camera 118, the ambient light sensor(s) 120, and/or the lid position sensor(s) 123 can transmit data to a processor 125 of the remote user device 119 or, in some examples, a processor 127 of the authentication device 124 (e.g., when the authentication device is a user device such a smartphone). In other examples, the user presence detection sensor(s) 110, the communication interface(s) 111, the microphone(s) 112, the user facing camera 116, the world facing camera 118, the ambient light sensor(s) 120, and/or the lid position sensor(s) 123 can transmit data to a cloud-based device 126 (e.g., one or more server(s), processor(s), and/or virtual machine(s)).

In some examples, the processor 108 of the user device 102 is communicatively coupled to one or more other processors. In such an examples, the user presence detection sensor(s) 110, the communication interface(s) 111, the microphone(s) 112, the user facing camera 116, the world facing camera 118, the ambient light sensor(s) 120, and/or the lid position sensor(s) 123 can transmit data to the on-board processor 108 of the user device 102. The on-board processor 108 of the user device 102 can then transmit the data to the processor 125 of the user device 119, the processor 127 of the authentication device 124, and/or the cloud-based device(s) 126. In some such examples, the user device 102 (e.g., the user presence detection sensor(s) 110, the communication interface(s) 111, the microphone(s) 112, the user facing camera 116, the world facing camera 118, the ambient light sensor(s) 120, the lid position sensor(s) 123 and/or the on-board processor 108) and the processor(s) 125, 126, 127 are communicatively coupled via one or more wired connections (e.g., a cable) or wireless connections (e.g., cellular, Wi-Fi, or Bluetooth connections). In other examples, the data generated by the user presence detection sensor(s) 110, the communication interface(s) 111, the microphone(s) 112, the user facing camera 116, the world facing camera 118, the ambient light sensor(s) 120, and/or the lid position sensor(s) 123 may only be processed by the on-board processor 108 (i.e., not sent off the device).

In the example of FIG. 1, the data generated by the user presence detection sensor(s) 110, the communication interface(s) 111, the microphone(s) 112, the user facing camera 116, the world facing camera 118, the ambient light sensor(s) 120, and/or the lid position sensor(s) 123 is processed by an authentication analyzer 128 to authenticate a user as an authorized user of the user device 102 while the device 102 is in the connected standby mode and to control the transition of the user device 102 from the connected standby mode to the working system power state (i.e., the fully powered state). In the example of FIG. 1, the authentication analyzer 128 is implemented by instructions executed on the processor 108 of the user device 102. However, in other examples, the authentication analyzer 128 is implemented by instructions executed on the processor 125 of the user device 119, the processor 127 of the authentication device 124, and/or on the cloud-based device(s) 126. In other examples, the authentication analyzer 128 is implemented by dedicated circuitry located on one or more of the user device 102, the user device 119, and/or the authentication device 124. In some examples, one or more components of the example authentication analyzer 128 are implemented by the on-board processor 108 of the user device 102 and one or more other components are implemented by the processor 125 of the user device 119, the processor 127 of the authentication device 124, and/or the cloud-based device(s) 126. These components may be implemented in software, firmware, hardware, or in combination of two or more of software, firmware, and hardware.

In some examples, the authentication analyzer 128 is implemented by a system-on-chip (SOC) that is separate from a (e.g., main) processing platform that implements, for example, an operating system of the device 102. In some examples, the processing platform (e.g., a processor) can enter a low power state (e.g., a sleep state) while the SOC subsystem that implements the example authentication analyzer 128 remains operative to detect, for example, user presence proximate to the device 102. The SOC subsystem can consume less power than if the authentication analyzer 128 were implemented by the same processor that implements the operating system of the device.

In the example system 100 of FIG. 1, the authentication analyzer 128 serves to process the data generated by the user presence detection sensor(s) 110, the communication interface(s) 111, the microphone(s) 112, the user facing camera 116, the world facing camera 118, the ambient light sensor(s) 120, and/or the lid position sensor(s) 123 to authenticate a user of the user device 102 after the device 102 has entered the connected standby mode and to instruct the user device 102 to transition to the working system power state and allow the user to access data (e.g., applications) stored on the device 102. In the example of FIG. 1, the authentication analyzer 128 can use multiple modes of authentication to verify the user including image analysis, voice analysis, and/or detection of the authentication device 124. For example, the authentication analyzer 128 can analyze image data from the user facing camera 116 and audio data from the microphone(s) 112 to authenticate the user based on the analysis of both types of data. In the example of FIG. 1, the authentication analyzer 128 selectively activates the camera(s) 116, 118 and/or the microphone(s) 112 to generate sensor data that is analyzed relative to confidence thresholds to verify that the user is an authorized user of the device 102. When the authentication analyzer 128 verifies the identity of the user within the confidence thresholds, the authentication analyzer 128 instructs the device 102 to move to the working system power state and provide the user access to data stored on the device 102 (e.g., by automatically logging the user into the device 102).

In the example of FIG. 1, when the user device 102 is in the connected standby mode, the user presence detection sensor(s) 110 are active to detect changes in signal(s) emitted by the sensor(s) 110 due to the presence of a subject within the range of the sensor(s) 110. The example authentication analyzer 128 receives and processes the sensor data from the user presence detection sensor(s) 110. In some examples, the authentication analyzer 128 receives the sensor data from the user presence detection sensor(s) 110 in substantially real-time (e.g., near the time the data is collected). In other examples, the authentication analyzer 128 receives the sensor data at a later time (e.g., periodically and/or aperiodically based on one or more settings but sometime after the activity that caused the sensor data to be generated, such as a user walking in front of the user device 102, has occurred (e.g., seconds later)). The authentication analyzer 128 can perform one or more operations on the sensor data generated by the user presence detection sensor(s) 110 such as filtering the raw signal data, removing noise from the signal data, converting the signal data from analog data to digital data, and/or analyzing the data.

In some examples, user-defined security settings for the user device 102 may request the detection of an authentication device 124 (e.g., a secondary user device) to enable the user to access data stored on the device 102. In such examples, the communication interface(s) 111 can detect the presence of the authentication device via one or more communication protocol(s) (e.g., via Wi-Fi, Bluetooth, etc.). The authentication analyzer 128 analyzes data received from the communication interface(s) 111 indicative of detection of the authentication device 124 to confirm that the authentication device 124 is a trusted device.

Based on the sensor data generated by the user presence detection sensor(s) 110 and/or the detection of the authentication device 124, the authentication analyzer 128 determines that a subject is sufficiently proximate to the user device 102 to begin an authentication process. In particular, in the example of FIG. 1, the authentication analyzer 128 attempts to authenticate the user using an initial authentication mode (e.g., image data or audio data). If a confidence threshold for authenticating the user as an authorized user is not satisfied for the initial authentication mode, the authentication analyzer 128 determines whether supplemental authentication should be performed (e.g., using the other of image data or audio data), to increase a confidence with which the user is determined to be an authorized user of the device 102. In some examples, the authentication modes(s) used by the authentication analyzer 128 are selected based on contextual knowledge obtained by the authentication analyzer 128 such as, for instance, ambient lighting conditions in the environment in which the user device 102 is located, which can affect quality of the image data.

In the example of FIG. 1, after the authentication analyzer 128 detects the presence of the user based on the sensor data generated by the user presence detection sensor(s) 110 and/or detects the authentication device 124, the authentication analyzer 128 performs an initial authentication attempt using voice recognition or image analysis. In some examples, the initial authentication mode is defined based on user settings for the device 102. For instance, the authentication analyzer 128 can be instructed to use voice recognition as an initial authentication mode based on user input(s). In such examples, the authentication analyzer 128 instructs the microphone(s) 112 to generate audio data when the user is detected proximate to the device 102.

In other examples, the microphone(s) 112 remain activated when the device 102 enters the connected standby mode. In such examples, the authentication analyzer 128 may proceed with using audio data as the initial authentication mode if the authentication analyzer 128 detects that the user has spoken predefined word(s) and/or phrase(s) (generally referred to as wake word(s)) that serve as triggers to inform the authentication analyzer 128 that the user wishes to use the device. For instance, the wake word(s) can include the word "on" and/or phrases such as "wake up." If the wake word(s) are detected by the authentication analyzer 128 within a threshold period of time of the detection of the presence of the user, the authentication analyzer 128 may automatically use voice recognition as the initial authentication mode.

In other examples, the authentication analyzer 128 selects to use voice recognition or image recognition as the initial authentication mode based on ambient lighting conditions in the environment in which the device 102 is located. For instance, the authentication analyzer 128 can instruct the ambient light sensor(s) 120 to generate sensor data that indicates whether the device 102 is in a low light environment or a bright light environment. Based on data from the ambient light sensor(s) 120, the authentication analyzer 128 determines whether the lighting in the environment is conducive to image analysis. If the data from the ambient light sensor(s) 120 indicates that the light in the environment is bright, the authentication analyzer 128 can select to activate one or more of the user-facing camera 116 or the world-facing camera 118 to authenticate the user based on image data. If the data from the ambient light sensor(s) 120 indicates that the light in the environment is low, the authentication analyzer 128 can activate the microphone(s) 112 to detect a voice input from the user. In such examples, the authentication analyzer 128 attempts to authenticate the user based on voice recognition to obtain a higher confidence in the authentication of the user than would be obtained based on analysis of image(s) captured in a low light environment.

In the example of FIG. 1, if the results of the prediction(s) obtained via the initial authentication mode, such as voice recognition, do not satisfy the confidence threshold to authenticate the user as an authorized user based on the initial authentication mode alone, the authentication analyzer 128 attempts to supplement the initial authentication mode with one or more other authentication modes, such as detection of the authentication device 124 or image analysis. If the authentication analyzer 128 is not able to authenticate the user using the supplemental authentication modes, the authentication analyzer 128 can request a manual identification input from the user, such a password or fingerprint. The authentication analyzer 128 maintains the device 102 in the connected standby mode until authentication of the user is successful to avoid consuming unnecessary power during the authentication attempts.

For illustrative purposes, a first example of an authentication process performed by the authentication analyzer 128 will be discussed in connection with voice recognition as the initial authentication mode for authenticating the user of the user device 102 (e.g., based on a user setting). In this example, the authentication analyzer 128 activates the microphone(s) 112 (i.e., if the microphone(s) 112 not already activated) in response to the detection of the user proximate to the user device 102 based on sensor data generated by the user presence detection sensor(s) 110 and/or the detection of the trusted authentication device 124. In this example, the camera(s) 116, 118 remain in the deactivated state.

The authentication analyzer 128 analyzes audio data collected by the microphone(s) 112 to determine if the user has spoken the wake word(s)) that inform the authentication analyzer 128 that the user wishes to use the device. In the example of FIG. 1, the authentication analyzer 128 determines if the wake word(s) are detected in the audio data within a first time interval of, for instance, the detection of the user by the user presence detection sensor(s) 110. The authentication analyzer 128 performs speech recognition analysis based on machine learning to identify the wake word(s) in the audio data.

If the authentication analyzer 128 detects the wake word(s) in the audio data generated by the microphone(s) 112, the authentication analyzer 128 performs voice recognition analysis to determine whether the user's voice is the voice of an authorized user. The authentication analyzer 128 generates audio data prediction(s) as to whether the voice detected in the audio data is the voice of the authorized user. The authentication analyzer 128 analyzes the user's voice based on machine learning to recognize the voice as the voice of a known authorized user.

The authentication analyzer 128 determines a confidence score for the audio data prediction(s) that represent a degree to which the voice identified in the audio data by the authentication analyzer 128 matches the voice of an authorized user of the user device 102. Factors that can affect the confidence score for the audio data prediction(s) can include, for instance, a level of noise in the audio data. Noise can affect the ability of the authentication analyzer 128 to accurately identify the user's voice.

The example authentication analyzer 128 of FIG. 1 compares the confidence score for the audio data prediction(s) to a first confidence threshold that defines a minimum confidence level for authenticating the user based on the audio data alone. If the authentication analyzer 128 determines that the audio data prediction(s) satisfies the first confidence threshold for authenticating the user based on audio data, the authentication analyzer 128 instructs the user device 102 to move to the working system power state (e.g., the fully powered state) and to log to the user into the device 102 to enable the user to access data stored on the device. If the authentication analyzer 128 determines that the first confidence score of the audio data prediction(s) does not satisfy the confidence threshold and, thus, there is uncertainty as to whether the user attempting to access the device 102 is the authorized user, the authentication analyzer 128 attempts to authenticate the user using the other authentication mode(s) to supplement the audio data analysis and improve the confidence with which the identity of the user is verified.

In examples in which the confidence score for the audio data prediction(s) does not satisfy the confidence threshold for authenticating the user based on audio data alone, but the authentication analyzer 128 has detected the presence of the authentication device 124, the authentication analyzer 128 attempts to authenticate the user based on the combination of the audio data prediction(s) and the detection of the trusted authentication device 124. In such examples, the authentication analyzer 128 compares the confidence score for the audio data prediction(s) to a second confidence threshold that defines a minimum threshold value for authenticating the user based on a combination of audio data and the authentication device 124. The second confidence threshold can be defined to avoid instances where an unauthorized user has possession of the authentication device 124 and tries to gain access by speaking the wake word(s).

If the authentication analyzer 128 is not able to verify the user based on the audio data prediction(s) in connection with the authentication device 124 because the audio data prediction(s) do not satisfy the second confidence threshold, the authentication analyzer 128 can attempt to authenticate the user using image recognition. The authentication analyzer 128 can also attempt to authenticate the user using image recognition if the audio data prediction(s) does not satisfy the first confidence threshold for authenticating the user based on the audio data alone and no authentication device 124 has been detected (e.g., either because the authentication device 124 is not present or the device 102 is not configured to identify an authentication device).

To obtain image data, the authentication analyzer 128 activates the lid position sensor(s) 123 to access data about the form factor of the device 102 and to determine whether to activate the user facing camera 116 and/or the world facing camera 118. If data generated by the lid position sensor(s) 123 indicates that the device 102 is in an open position, the authentication analyzer 128 activates the user facing camera 116 to generate image data capturing the user, where the user is positioned in front of the primary display screen 104 of the device 102. If the data generated by the lid position sensor(s) 123 indicates that the device is in a closed position, the authentication analyzer 128 activates the world facing camera 118. The world facing camera 118 generates image data of the environment in which the user device 102 is located to capture the face of the user while the device 102 is in the closed position.

In some examples, if the authentication analyzer 128 determines that the audio data prediction(s) does not satisfy the confidence threshold(s), the authentication analyzer 128 automatically instructs the camera(s) 116, 118 to generate image data in an attempt to recognize the user in the environment via image recognition. In other examples, the authentication analyzer 128 generates notification(s) to be displayed via the primary display screen 104 and/or the second display screen 105 (e.g., depending on the position of the device 102 as detected by the lid position sensor(s) 123) prior to collecting the image data via the camera(s) 116, 118. The notification can include image(s) and/or text indicating that additional information is needed for authentication and requesting that the user position himself or herself relative to the camera(s) 116, 118. Additionally or alternatively, the authentication analyzer 128 can generate an audio notification requesting image data to be output by the speaker(s) 114.

The authentication analyzer 128 analyzes the image data generated by the user facing camera 116 and/or the world facing camera 118 to identify feature(s) of an authorized user in the image data based on image recognition techniques (e.g., facial recognition) learned via machine learning. The authentication analyzer 128 generates image data prediction(s), or prediction(s) as to whether the user identified in the image data generated by the user facing camera 116 and/or the world facing camera 118 is the authorized user.

The authentication analyzer 128 evaluates the image data prediction(s) generated based on image data from the user facing camera 116 and/or the world facing camera 118 to determine confidence score(s) for the image data prediction(s), where the confidence score(s) are indicative of a degree to which the user identified in the image data by the authentication analyzer 128 matches the image of an authorized user of the user device 102. In some examples, the authentication analyzer 128 analyzes data generated by the ambient light sensor(s) 120 in assigning the confidence score(s) to the image data prediction(s). As discussed above, the ambient light sensor(s) 120 generate data indicative of light conditions in the environment. The ambient light sensor data is used by the authentication analyzer 128 to determine if the image data was generated in a low light environment or a bright light environment. Low light environments can affect the quality of the image data obtained and, in such instances, the authentication analyzer 128 may not be able to accurately identify the user in the image data. If the authentication analyzer 128 determines that the image data is generated in a low light environment based on the ambient light sensor data, the authentication analyzer 128 assigns the image data prediction a lower confidence score than if the prediction was generated using image data captured in brighter environment. Image data generated in a brighter environment provides for clearer capture of user features and, thus, improved image recognition.

In the examples in which the image data is used to supplement authentication performed with audio data captured by the microphone(s) 112, the authentication analyzer 128 determines if the confidence score(s) for the audio data prediction(s) and the confidence score(s) for the image data prediction(s) are sufficient to authenticate the user as an authorized user of the device 102 when both audio data and image data are used. For example, the authentication analyzer 128 can determine if the confidence score(s) for the audio data prediction(s) and the confidence score(s) for the image data prediction(s) satisfy respective confidence thresholds. The confidence threshold(s) can define minimum confidence levels for authenticating a user based on a combination of audio data and image data. If the authentication analyzer 128 determines that the combination audio data and image data satisfy the confidence threshold(s) to authenticate the user using both types of data, the authentication analyzer 128 instructs the user device 102 to move to the working system power state and to grant the user access to data on the device 102.

If the authentication analyzer 128 is not able to authenticate the user as an authorized user of the user device 102 based on one of (a) audio data alone, (b) audio data in combination with detection of the authentication device 124, or (c) audio data in combination with image data, the authentication analyzer 128 instructs the user device 102 to remain in the lower power state and not grant user access to the data on the device 102 until, for instance, the user provides a correct manual identification input such as a password or fingerprint.

Also, if the authentication analyzer 128 does not detect the wake word(s) within the predefined time interval of the detection of the user presence when performing the initial authentication attempt using audio data, the authentication analyzer 128 instructs the user device 102 to remain in the lower power state and not grant user access to the data on the device 102 until a correct manual identification input such as a password or fingerprint is provided. In such examples, because of the absence of the detected wake word(s), the authentication analyzer 128 maintains the device in the connected standby mode until a manual input from the user received that confirms that the user wishes to use the device. Thus, the example authentication analyzer 128 maintains the user device 102 in the connected standby mode and prevents unauthorized access to data on the device 102 until the user is authenticated via automated voice or image recognition or via manual identification input(s).

Although the foregoing examples are discussed in the context of voice recognition as the initial authentication mode, in other examples, image recognition can be used as the initial authentication mode (e.g., based on user setting(s) for the device 102) and voice recognition can be used as a supplemental authentication mode if needed to improve confidence levels for verifying the identity of the user. For instance, if the user presence detection sensor(s) 110 detect the presence of the user within the sensor range and/or if the authentication analyzer 128 detects the trusted authentication device 124 via the communication interface(s) 111, the authentication analyzer 128 can automatically activate the user facing camera 116 and/or the world facing camera 118 (e.g., based on data obtained from the lid position sensor(s) 123 as to the form factor position of the device 102) to obtain image data. The authentication analyzer 128 analyzes the image data to generate image data prediction(s) with respect to the detection of the authorized user in the image data. The authentication analyzer 128 assigns confidence score(s) to the image data prediction(s). If the confidence level for the image data prediction(s) satisfies a confidence threshold for authenticating the user based on image data alone, instructs the user device 102 to move to the working system power state and to grant the user access to data on the device 102.

In examples where the image data is used as the initial authentication mode and the image data prediction(s) do not satisfy the confidence level threshold for authenticating the user based on image data alone (e.g., because the image data was captured in a low light environment), the authentication analyzer 128 can request authentication via one or more supplemental authentication modes. For example, if an authentication device 124 has been detected, the authentication analyzer 128 can determine if the image data predication(s) satisfy a confidence threshold for authenticating the user based on the combination of image data and the presence of the authentication device 124.

In examples in which the authentication analyzer 128 is unable to authenticate the user based on image data alone or image data and an authentication device 124, the authentication analyzer can attempt to authenticate the user based on voice data. The authentication analyzer activates the microphone(s) 112 and requests a voice input from the user. For example, the authentication analyzer 128 can generate a notification to be displayed via the primary display screen 104 and/or the second display screen 105 (e.g., depending on the form factor position of the device 102 as detected by the lid position sensor(s) 123) requesting that the user provide an audio input (e.g., by speaking the wake word(s)). Additionally or alternatively, the notification is provided as an audio output via the speaker(s) 114.

In such examples, the authentication analyzer 128 analyzes the audio data received via the microphone(s) 112 to generate an audio data prediction(s) with respect to the detection of the voice of the authorized user in the audio data. The authentication analyzer 128 assigns confidence score(s) to the audio data prediction(s). If the confidence score(s) for the image data prediction(s) and the confidence score(s) for the audio data prediction(s) satisfy confidence threshold(s) for authenticating the user based on a combination of image data and voice data, the authentication analyzer 128 instructs the user device 102 to move to the working system power state and grant the user access to data on the device 102.

In examples where image data is to be used either as initial authentication mode or as a supplement to voice authentication, the authentication analyzer 128 may refrain from activating the camera(s) 116, 118 if the authentication analyzer 128 determines that the light in the environment is too low to effectively analyze the image data. For example, if the authentication analyzer 128 determines that the user device 102 is located in a dark environment based on data from the ambient light sensor(s) 120, the authentication analyzer 128 can request a voice input from the user via the speaker(s) 114 rather than activating the camera(s) 116, 118. If the authentication attempt via voice recognition is not successful (either alone or with detection of an authentication device 124), the authentication analyzer 128 may request a manual identification input rather than attempting to authenticate the user using image data. In such examples, the authentication analyzer 128 prevents unnecessary power consumption by the user device 102 with respect to activation of the camera(s) 116, 118 because the image data generated by the camera(s) 116, 118 in the dark environment may not be effectively used to identify the user.

Although the foregoing examples have been discussed the authentication process as being initiated by the detection of the user via the user presence detection sensor(s) 110 and/or by detection of a trusted authentication device 124, in other examples, the communication interface(s) 111 receive push notification(s) from other user device(s) 119 when the device 102 is in the connected standby state. The push notification(s) can request peer-to-peer communication between the user device 102 and the other user device(s) 119, such as file transfer(s) between the devices 102, 119, screen sharing, power sharing (e.g., wireless power sharing), audio meshing, etc. In response to such request(s) received from the other user device(s) 119, the authentication analyzer 128 outputs notification(s) indicative of the request(s) from the other user device(s) 119 to be output via the speaker(s) 114 and/or displayed via the primary display screen 104 and/or the secondary display screen 105 (e.g., depending on whether the device 102 is in an open state or a closed state). The authentication analyzer 128 monitors for user input(s) indicating acceptance or denial of the request(s). The user input(s) can include a touch input via the primary display screen 104 or the second display screen 105

(e.g., selecting a request approval button) and/or an audio input detected via the microphone(s) 112 (e.g., a trigger word such as "accept").

If the authentication analyzer 128 detects a user input confirming that the user wishes to accept the request(s) received from the other user device(s) 119, the authentication analyzer 128 attempts to authenticate the user using the multi-modal authentication disclosed above to confirm that the user who accepted the request is an authorized user of the device 102. For instance, the authentication analyzer 128 can authenticate the user via voice recognition based on audio data captured via the microphone(s) 112, image data analysis based on image data captured via the camera(s) 116, 118, and/or combination(s) of voice data and image data, image data and detection of the authentication device 124 (where the authentication device 124 can be the same device that generated the request or a different device), audio data and the detection of the authentication device 124, etc.

If the authentication analyzer 128 successfully authenticates the user who accepted the request from the remote user device(s) 124 as an authorized user of the device 102, the authentication analyzer 128 instructs the user device 102 to take one or more actions based on the push notification(s). In some examples, the user device 102 can perform one or more actions in response to the push notification(s) while in the device 102 is in the connected standby mode. For instance, the authentication analyzer 128 can instruct the secondary display controller 107 of the user device 102 to move from a low power state to a higher power state to enable a preview of an image shared between the devices 102, 119 to be displayed via the secondary display screen 105 (e.g., when the user device 102 is in the closed state). In other examples, the authentication analyzer 128 instructs the primary display controller 103 to move from a low power state to a higher power state to enable screen sharing between the devices 102, 119. Other hardware devices of the user device 102 can remain in a low power state when the user device 102 performs the action(s) in response to the push notification. In other examples, the authentication analyzer 128 instructs the user device 102 to move the working system power state to enable the user to perform other actions in response to the push notifications, such as to save a file that was transferred to the user device 102 via the other user device 119.

Thus, the example authentication analyzer 128 of FIG. 1 optimizes power consumption while the user device 102 is in the connected standby mode. The authentication analyzer 128 maintains the device 102 in the connected standby mode until the user is authenticated. Further, when the device is in the connected standby mode, the authentication analyzer 128 does not activate, for instance, the camera(s) 116, 118 until the presence of the user is detected by the user presence detection sensor(s) 110 and/or other authentication modes, such as such as voice data recognition have been attempted. Thus, the authentication analyzer 128 selectively controls operation of the sensor(s) 112, 116, 118, 120, 123 of the user device 102 to conserve power while securing access to data stored in the device 102. Further, the user device 102 can perform actions such as displaying a screen shared via another user device 119 after the user has been authenticated and while the device 102 is still in the connected standby mode.

Figure 2:
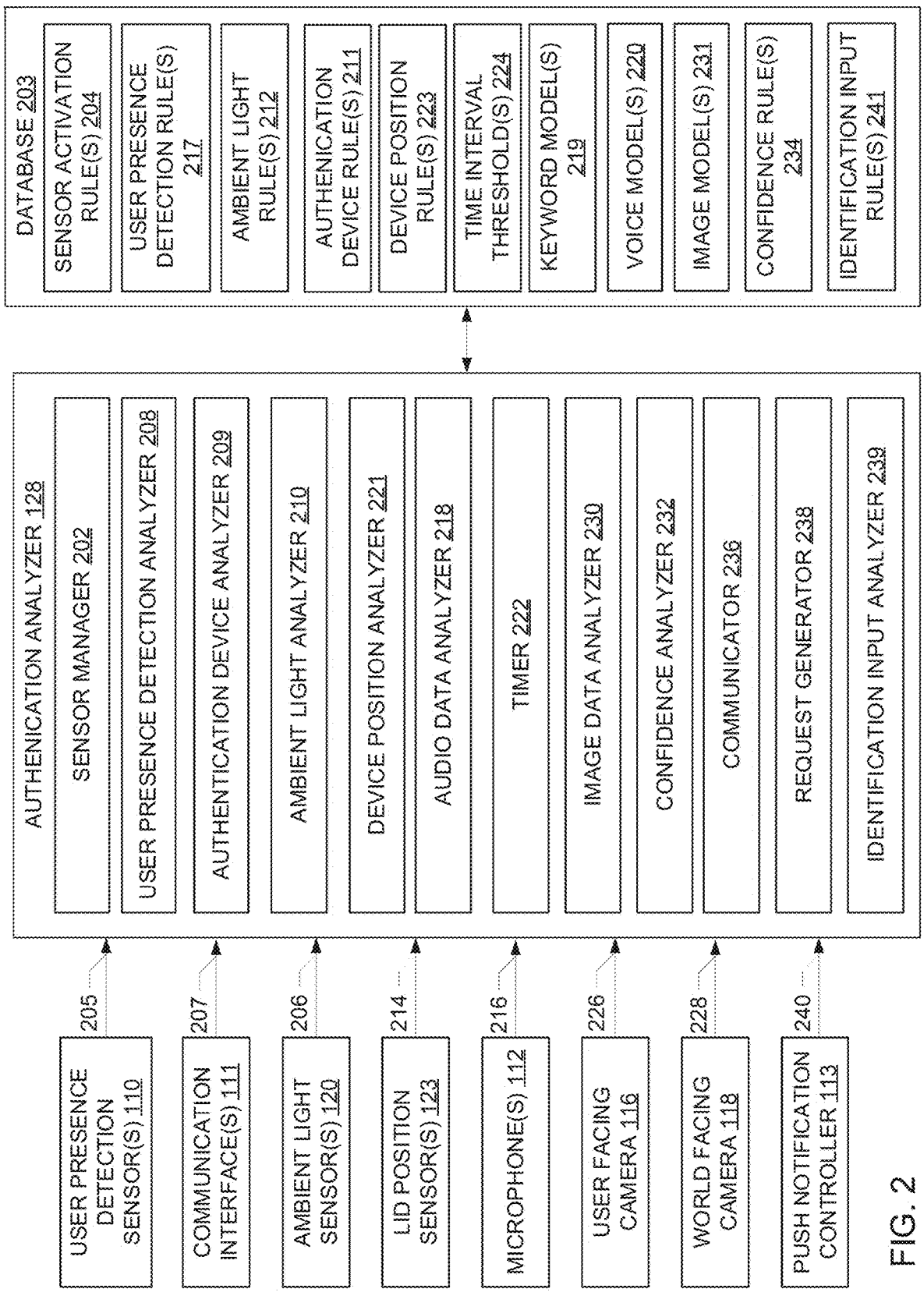
FIG. 2 is block diagram of an example implementation of the authentication analyzer of FIG. 1.

FIG. 2 is a block diagram of an example implementation of the authentication analyzer 128 of FIG. 1. As mentioned above, the authentication analyzer 128 is constructed to authenticate a user as an authorized user of the user device 102 using one or more authentication modes and to generate instructions that cause the user device 102 to move from the connected standby mode to the working system power state and grant the authorized user access to data stored on the user device 102. In the example of FIG. 2, the authentication analyzer 128 is implemented by one or more of the processor 108 of the user device 102, the processor 125 of the other user device 119, the processor 127 of the authentication device 124, and/or cloud-based device(s) 126 (e.g., server(s), processor(s), and/or virtual machine(s) in the cloud 126 of FIG. 1). In some examples, some of the authentication analysis is implemented by the authentication analyzer 128 via a cloud-computing environment and one or more other parts of the analysis is implemented by the processor 108 of the user device 102 being controlled, the processor 127 of the authentication device 124, and/or the processor 125 of the second user device 119 such as a wearable device.

The example authentication analyzer 128 of FIG. 2 includes a sensor manager 202. In this example, the sensor manager 202 provides means for enabling or disabling one or more of the user presence detection sensor(s) 110, the microphone(s) 112, the user facing camera 116, the world facing camera 118, the ambient light sensor(s) 120, and/or the lid position sensor(s) 123. The sensor manager 202 determines the sensor(s) 110, 112, 116, 118, 120, 123 that should be enabled or disabled based on one or more sensor activation rule(s) 204. The sensor activation rule(s) 204 can be defined based on user input(s) and stored in a database 203. In some examples, the authentication analyzer 128 includes the database 203. In other examples, the database 203 is located external to the authentication analyzer 128 in a location accessible to the authentication analyzer 128 as shown in FIG. 2.

The sensor activation rule(s) 204 can indicate, for example, the user presence detection sensor(s) 110 should be active when the device 102 is in the connected standby mode. The sensor activation rule(s) 204 can indicate that the other sensor(s) 112, 116, 118, 120, 123 should be disabled when the device 102 enters the connected standby mode to conserve power. The sensor activation rule(s) 204 define which sensor(s) 112, 116, 118, 120, 123 should be activated when the presence of a subject is detected by the user presence detection sensor(s) 110.

As illustrated in FIG. 2, the example authentication analyzer 128 receives user detection sensor data 205 from the user presence detection sensor(s) 110 of the example user device 102 of FIG. 1. The sensor data can be stored in the database 203.

The example authentication analyzer 128 of FIG. 2 includes a user presence detection analyzer 208. In this example, the user presence detection analyzer 208 provides means for analyzing the sensor data 205 generated by the user presence detection sensor(s) 110. In particular, the user presence detection analyzer 208 analyzes the sensor data 205 to determine if a subject is within the range of the user presence detection sensor(s) 110 and, thus, is near enough to the user device 102 to suggest that authentication of the user should be performed. The user presence detection analyzer 208 analyzes the sensor data 205 based on one or more user presence detection rule(s) 217. The user presence detection rule(s) 217 can be defined based on user input(s) and stored in the database 203.

The user presence detection rule(s) 217 can define, for instance, threshold time-of-flight measurements by the user presence detection sensor(s) 110 that indicate presence of the subject within the range of the user presence detection sensor(s) 110 (e.g., measurements of the amount of time between emission of a wave pulse, reflection off a subject, and return to the sensor). In some examples, the user presence detection rule(s) 217 define threshold distance(s) for determining that a subject is within proximity of the user device 102. In such examples, the user presence detection analyzer 208 determines the distance(s) based on the time-of-flight measurement(s) in the sensor data 205 and the known speed of the light emitted by the sensor(s) 110. In some examples, the user presence detection analyzer 208 identifies changes in the depth or distance values over time and detects whether the user is approaching the user device 102 or moving away from the user device 102 based on the changes. The threshold time-of-flight measurement(s) and/or distance(s) for the user detection sensor data 205 can be based on the range of the sensor(s) 110 in emitting pulses. In some examples, the threshold time-of-flight measurement(s) and/or distance(s) are based on user-defined reference distances for determining that a user is near or approaching the user device 102 as compared to simply being in the environment in which the user device 102 and the user are both present.

In some examples, the user detected by the user presence detection analyzer 208 may be carrying an authentication device 124 (FIG. 1) that is detected by the communication interface(s) 111 (e.g., via wireless or wired communication protocols). In such examples, the communication interface(s) 111 generate device detection data 207 that is received by the example authentication analyzer 128 and can be stored in the database 203. The example authentication analyzer 128 of FIG. 2 includes an authentication device analyzer 209. In this example, the authentication device analyzer 209 provides means for analyzing the device detection data 207 generated by the communication interface(s) 111 indicative of the detection of other device(s). The authentication device analyzer 209 analyzes the device detection data 207 to determine if the detected device is a trusted authentication device 124, or a device that has been previously identified as a device that can be used to authenticate a particular user. The authentication device analyzer 209 determines whether the detected authentication device 124 is an authorized device based on authentication device rule(s) 211. The authentication device rule(s) 211 identify user devices that have been previously recognized as authorized user devices for the purposes of authenticating the user and can be stored in the database 203.

When the user presence detection analyzer 208 determines that the user is present relative to the device 102 and/or the authentication device analyzer 209 detects the trusted authentication device 124, the sensor manager 202 selectively activates certain ones of the sensor(s) 112, 116, 118, 120, 123 to authenticate the user as an authorized user of the user device 102 using image data and/or audio data. The sensor manager 202 selectively activates the sensor(s) 112, 116, 118, 120, 123 based on the sensor activation rule(s) 204.

In some examples, the sensor activation rule(s) 204 define whether audio data or image data should be used as an initial authentication mode in response to detection of the user by the user presence detection analyzer 208 and/or detection of the authentication device 124 by authentication device analyzer 209. For instance, the sensor activation rule(s) 204 can define that audio data should be used as the initial form of data to authenticate the user over image data. In view of such rule(s), the sensor manager 202 activates the microphone(s) 112 to enable the microphone(s) 112 to capture audio data. In these examples, the sensor manager 202 maintains the camera(s) 116, 118 in a deactivated state and may only activate the camera(s) 116, 118 if needed to perform supplemental authentication of the user using image data (e.g., if the result(s) of the audio data analysis do not satisfy the confidence threshold(s) for authentication using audio data).

Alternatively, the sensor activation rule(s) 204 can define that image data should be used to perform the initial authentication over audio data. In such examples, the sensor manager 202 activates the user facing camera 116 and/or the world facing camera 118 in response to the detection of the user and/or the authentication device 124 proximate to the user device 102. In this instance, the sensor manager 202 maintains the microphone(s) 112 in a deactivated state and may only activate the microphone(s) 112 if needed for supplemental authentication of the user via audio data.

In other examples, the sensor manager 202 dynamically determines whether to activate the microphone(s) 112 or the camera(s) 116, 118 in response to detection of the user and/or detection of the authentication device 124 and based on condition(s) in the environment in which the device 102 is located. To determine whether to use audio data or image data to authenticate the user, the sensor manager 202 activates the ambient light sensor(s) 120 of the example user device 102 of FIG. 1 to obtain information about lighting the environment in which the user device 102 is located and, in particular, whether the user device 102 is located in a low light environment or a bright environment.

The example authentication analyzer 128 of FIG. 2 receives ambient light data 206 from the activated ambient light sensor(s) 120. The ambient light data 206 can be stored in the database 203. The example authentication analyzer 128 includes an ambient light analyzer 210. In this example, the ambient light analyzer 210 provides means for analyzing the sensor data 206 generated by the ambient light sensor(s) 120 to determine lighting conditions in the environment in which the user device 102 is located. The ambient light analyzer 210 analyzes the sensor data 206 based on one or more ambient light rule(s) 212. The ambient light rule(s) 212 can be defined based on user input(s) and stored in the database 203. The ambient light rule(s) 212 can define values (e.g., luminance) for the light detected by the ambient light sensor(s) 120 that indicate whether the user device 102 is in a low light environment (e.g., a dark room) or a bright environment (e.g., in a room with the lights on, on an outdoor patio on a sunny day).

The sensor manager 202 of the example authentication analyzer 128 receives the results of the analysis of the ambient light data 206 by the ambient light analyzer 210 when making the dynamic decision whether to attempt to initially authenticate the user using audio data or image data. For instance, the sensor activation rule(s) 204 can indicate that if the user device 102 is in a low light environment, then the microphone(s) 112 should be activated over the camera(s) 116, 118 in an effort to authenticate the user via audio data. In examples in which the user device 102 is located in a low light environment, the use of audio data can result in a higher confidence prediction with respect to authenticating the user than image data collected in the low light environment. By activating the microphone(s) 112 instead of the camera(s) 116, 118 in the low light environment, the sensor manager 202 attempts to conserve power by avoiding the need for supplemental authentication via audio data if the image data is not reliable due to the low light conditions. As disclosed herein, in such examples, the authentication analyzer 128 may rely on audio data and, if unsuccessful in authenticating the user, manual identification inputs rather than unnecessarily causing the device 102 to consume power by activating the camera(s) 116, 118 in low light environments.

Alternatively, if the data from the ambient light analyzer 210 indicates that the user device 102 is in a bright environment, the sensor manager 202 can activate the camera(s) 116, 118 over the microphone(s) 112 to attempt to authenticate the user via image data. The sensor activation rule(s) 204 can indicate that in bright light environments, the camera(s) 116, 118 should be activated over the microphone(s) 112 to avoid requiring the user to speak if possible.

The sensor manager 202 selects which the one or more cameras 116, 118 to activate based on the sensor activation rule(s) 204. In examples in which the sensor manager 202 determines that the camera(s) 116, 118 should be activated to obtain image data (e.g., either for initial authentication or supplemental authentication) and the user device 102 has a clamshell form factor (e.g., such as a laptop), the sensor manager 202 determines which of the camera(s) 116, 118 to activate based on data from the lid position sensor(s) 123. For instance, the sensor manager 202 activates the lid positions sensor(s) 123 of the example user device 102 of FIG. 1 in response to a decision by the sensor manager 202 to activate the camera(s) 116, 118. As a result, the example authentication analyzer 128 receives lid position data 214 from the lid position sensor(s) 123 of the example user device 102 of FIG. 1. The lid position data 214 can be stored in the database 203.

The example authentication analyzer 128 includes a device position analyzer 221. In this example, the device position analyzer 221 provides means for analyzing the lid position data 214 generated by the lid position sensor(s) 123. In particular, the device position analyzer 221 analyzes the lid position data 214 to determine whether the user device 102 is in an open position such that the primary display screen 104 is visible or in a closed position such that the primary display screen 104 faces a keyboard of the device 102. The device position analyzer 221 analyzes the lid position data 214 based on one or more device position rule(s) 223. The device position rule(s) 223 can be defined based on user input(s) and stored in the database 203. The device position rule(s) 223 can define, for instance, sensor position(s) (e.g., magnetic couplings, switch positions) indicating that the device 102 is in the closed position or the open position.

The sensor manager 202 analyzes the data from the device position analyzer 221 to determine whether to determine whether to activate the user-facing camera 116 and/or the world-facing camera 118. For example, the sensor activation rules 204 can indicate that if the user device 102 is in the open position, the user-facing camera 116 should be activated whereas if the user device 102 is in the closed position, the world-facing camera 118 should be activated.

In some examples, the sensor manager 202 disables the user presence detection sensor(s) 110 when the microphone(s) 112 and/or the camera(s) 116, 118 are active in the connected standby mode to conserve power. In other examples, the user presence detection sensor(s) 110 remain active for the duration of time that the device 102 is in the connected standby mode.

In the example of FIG. 2, the authentication analyzer 128 analyzes the data generated by the activated microphone(s) 112 and/or the activated camera(s) 116, 118 in an attempt to authenticate the user as an authorized user of the device 102. For example, when the microphone(s) 112 are active, the example authentication analyzer 128 receives audio data 216 from the microphone(s) 112. The audio data 216 can be stored in the database 203.

The example authentication analyzer 128 includes an audio data analyzer 218. In this example, the audio data analyzer 218 provides means for analyzing the audio data 216 generated by the microphone(s) 112. In particular, the audio data analyzer 218 analyzes the audio data 216 to determine if (a) the wake word(s) are detected in the audio data 216 and (b) if the wake word(s) have been spoken by an authorized user of the user device 102. As disclosed herein (FIG. 3), the audio data analyzer 218 analyzes voice data in the audio data 216 to detect the wake words(s) and verify the user's voice as the voice of an authorized user using keyword model(s) 219 and voice model(s) 220, respectively, that are generated during machine learning.

The example audio data analyzer 218 executes the keyword model(s) 219 for the audio data 216 to predict if the known wake word(s) were spoken by the user based on speech recognition. In some examples, if the audio data analyzer 218 does not detect the wake word(s) in the audio data 216 within a threshold time interval, the sensor manager 202 may instruct the microphone(s) 112 to turn off, as the sensor manager 202 determines that the user does not intend to use the device 102. The example authentication analyzer 128 includes a timer 222. The timer 222 monitors an amount of time that has passed based on time interval threshold(s) 224 stored in the database 203 and defined by user input(s). The time interval thresholds(s) 224 define a time interval for the detection of the keyword(s) in the audio data 216. The timer 222 is started when the sensor manager 202 activates the microphone(s) 112 in response to the detection of the subject by the user presence detection analyzer 208 and/or the detection of an authentication device 124 by the authentication device analyzer 209.

If the audio data analyzer 218 determines that wake word(s) were spoken by the user, the audio data analyzer 218 executes the voice model(s) 220 to determine if the wake word(s) were spoken by an authorized user based on voice recognition. As a result of execution of the voice model(s) 220 generated by the microphone(s) 112, the audio data analyzer 218 generates audio data prediction(s), or prediction(s) that the wake word(s) were spoken by an authorized user of the user device 102.

The audio data analyzer 218 determines confidence score(s) for the audio data prediction(s), or a degree to which the voice identified the audio data 216 by the audio data analyzer 218 matches the voice of the authorized user. For example, the audio data analyzer 218 can determine the confidence score(s) for the audio data prediction(s) by comparing the voice data in the audio data 216 with known voice data or voiceprint(s) for the authorized user, which can be stored in a training database (FIG. 3) or the database 203. The audio data analyzer 218 can compare feature(s) (e.g., frequency, duration, intensity) of the voice data in the audio data 216 to the feature(s) of the voiceprint(s) to determine how closely the voice feature(s) in the audio data 216 match the voiceprint(s). Based on the comparative analysis, the audio data analyzer 218 assigns confidence score(s) to the audio data prediction(s).

In some examples, the audio data analyzer 218 accounts for variables such as noise in the audio data 216 when determining the confidence score(s) for the audio data prediction(s). For instance, if the audio data 216 includes noise above a threshold, the audio data analyzer 218 may lower the confidence score(s) assigned to the audio data prediction(s) because of the potential that noise interfered with ability of the audio data analyzer 218 to accurately analyze the user's voice.

As disclosed herein, in some examples, the sensor manager 202 activates the user-facing camera 116 and/or the world-facing camera 118 to obtain image data that can be used to authenticate the user. When the user-facing camera 116 is active, the example authentication analyzer 128 receives image data 226 from the user-facing camera 116. Similarly, when the world-facing camera 118 is active, the example authentication analyzer 128 receives image data 228 from the world-facing camera 118. The image data 226, 228 generated by the respective cameras 116, 118 can be stored in the database 203.

The example authentication analyzer 128 includes an image data analyzer 230. In this example, the image data analyzer 230 provides means for analyzing the image data 226, 228 generated by the camera(s) 116, 118. In particular, the image data analyzer 230 analyzes the image data 226, 228 to determine if an authorized user of the device 102 is identifiable in the image data 226, 228. As disclosed herein (FIG. 3), the image data analyzer 230 analyzes the image data 226, 228 to identify features of the authorized user in the image data 226, 228 using image model(s) 231 generated during machine learning. As a result of execution of the image model(s) 231 for the image data 226, 228, the image data analyzer 230 generates image data prediction(s), or prediction(s) that the image data 226, 228 includes images(s) of the authorized user.

The image data analyzer 230 determines confidence score(s) for the image data prediction(s). The confidence score(s) represent a degree to which feature(s) of the user identified in the image data 226, 228 match feature(s) of the authorized user as determined by the image data analyzer 230. For example, the image data analyzer 230 can determine the confidence score(s) for the image data prediction(s) by comparing user features (e.g., hair color, eye color, facial features, accessories worn on the user's face such as glasses) identified in the image data 226, 228 with known features of the authorized user, which can be stored in a training database (FIG. 3) or the database 203. The image data analyzer 230 can compare features of the user in the image data 226, 228 to the features of the authorized user to determine how closely the user's features in the image data 226, 228 match the features of the authorized user. Based on the comparative analysis, the image data analyzer 230 assigns confidence score(s) to the image data prediction(s).

In some examples, the image data analyzer 230 accounts for variables such as ambient lighting conditions when determining the confidence score(s) for the image data prediction(s). For example, if data from the ambient light analyzer 210 indicates that the user device 102 is in a low light environment, the image data analyzer 230 may reduce the confidence score(s) assigned to the image data prediction(s) in view of the effects of low light on the quality of the image data 226, 228.

In some examples, if the image data analyzer 230 does not detect a user in the image data 226, 228 within a threshold time interval, the sensor manager 202 may instruct the camera(s) 116, 118 to turn off, as the sensor manager 202 determines that the user does not intend to use the device 102 (e.g., the user walked away from the device 102 after initially being within the range of the user presence detection sensor(s)). The timer 222 of the example authentication analyzer 128 of FIG. 2 monitors an amount of time that has passed based on the time interval threshold(s) 224 stored in the database 203 and defined by user input(s). The time interval thresholds(s) 224 define a time interval for the detection of a user in the image data 226, 228. The timer 222 is started when the sensor manager 202 activates the camera(s) 116, 118 in response to the detection of the subject by the user presence detection analyzer 208 and/or the detection of the authentication device 124 by the authentication device analyzer 209.

The example authentication analyzer 128 of FIG. 2 includes a confidence analyzer 232. In this example, the confidence analyzer 232 provides means for analyzing the confidence score(s) generated by the audio data analyzer 218 and/or the image data analyzer 230 to determine if the user has been successfully identified as an authorized user of the device 102. When audio data is used in as the initial authenticate mode, the confidence analyzer 232 analyzes the confidence score(s) for the audio data prediction(s) to determine if supplemental authentication should be performed using, for instance, image data. Similarly, when image data is used in an initial attempt to authenticate the user, the confidence analyzer 232 analyzes the confidence score(s) for the image data prediction(s) to determine if supplemental authentication should be performed using, for instance, audio data.

The confidence analyzer 232 analyzes the confidence score(s) based on one or more confidence rule(s) 234 stored in the database 203 and defined based on user input(s). The confidence rule(s) 234 define threshold(s) for the confidence score(s) for the audio data prediction(s) to determine whether the user has been authenticated as an authorized user based on the audio data 216. The confidence rule(s) 234 define threshold(s) for the confidence score(s) for the image data prediction(s) to determine whether the user has been authenticated as an authorized user based on the image data 226, 228.

For example, when the microphone(s) 112 are activated by the sensor manager 202 as the initial authentication mode (i.e., audio data analysis is selected over image data analysis for an initial authentication attempt), the confidence analyzer 232 analyzes the confidence score(s) for the audio data prediction(s) against a first confidence threshold defined by the confidence rule(s) 234. The first confidence threshold defines a confidence score value that represents a minimum confidence level for authenticating the user based on audio data alone. For example, the first confidence threshold can indicate that, if the user is to be authenticated based on audio data alone, the audio data prediction should satisfy at least a confidence level of 97%. If the confidence score(s) for the audio data prediction(s) satisfy the first audio data confidence threshold, the confidence analyzer 232 determines that the user has been successfully authenticated as an authorized user based on voice recognition. If multiple audio data prediction(s) are generated, the confidence analyzer 232 can consider, for instance, an average of the confidence score(s).

The example authentication analyzer 128 of FIG. 2 includes a communicator 236. If the confidence analyzer 232 determines that the user has been authenticated based on the audio data 216, the communicator 236 transmits instructions generated by the confidence analyzer 232 to other components of the user device 102 (e.g., the primary display controller 103) to cause hardware devices of the user device to wake up and the user device to exit the low power mode and enter the working system power state. The instructions generated by the confidence analyzer 232 include instructions for the user device 102 to automatically log the user into the device based on successful authentication of the user.

If the confidence analyzer 232 determines that the confidence score(s) for the audio data prediction(s) do not satisfy the first confidence threshold, the confidence analyzer 232 determines if the audio data prediction(s) in combination with another type of authentication mode is sufficient to authenticate the user as an authorized user.

For instance, in some examples, the authentication device analyzer 209 identifies the presence of the authentication device 124 based on data generated by the communication interface(s) 111. In such examples, the confidence analyzer 232 evaluates the audio data prediction(s) in view of the presence of the authentication device 124. In such examples, the confidence analyzer 232 compares the confidence score(s) for the audio data prediction(s) to a second confidence threshold defined by the confidence rule(s) 234. The second confidence threshold defines a confidence score value that represents a minimum confidence level for authenticating the user based on audio data in combination with the detection of the authentication device 124. For instance, the second confidence threshold can indicate that the audio data prediction(s) should satisfy at least a confidence level of 94% if the user is to be authenticated based on audio data and detection of the authentication device 124. In this example, the second confidence threshold defines a lower confidence level than the first audio data confidence threshold for authenticating the user based on audio data alone in view of the supplemental authentication of the user via the detection of the trusted authentication device 124. If the combination of the audio data prediction(s) and the detection of the authentication device 124 satisfies the second audio data confidence threshold, the confidence analyzer 232 determines that the user is an authorized user and instructs the device 102 to move to the working system power state and log in the user to the device 102. The communicator 236 transmits the instructions to the device 102 to perform actions based on the authentication of the user.

In examples in which the authentication device 124 is not detected or the combination of the audio data prediction(s) and the authentication device 124 does not satisfy the second audio data confidence threshold, the confidence analyzer 232 determines whether image data should be used to authenticate the user in addition to the audio data.

If authentication based on audio data is to be supplemented with image data analysis, the sensor manager 202 activates the ambient light sensors 120 to determine if the user device 102 is in an environment in which the quality of the image data obtained will be adequate to identify user features, as disclosed herein. If data from the ambient light analyzer 210 indicates that the user device 102 is in a dark environment, the sensor manager 202 determines that the quality of the image data is not likely to be adequate to authenticate the user. In such examples, to conserve power, the confidence analyzer 232 determines that the user should manually provide authentication data (e.g., a password, fingerprints, etc.) to access the device 102.

The example authentication analyzer 128 of FIG. 2 includes a request generator 238. The request generator 238 can generate visual and/or audio request(s) for additional information from the user. In examples in which manual identification input(s) are to be requested from the user, the request generator 238 can output a visual alert to be displayed via, for instance, the secondary display screen 105 and/or an audio alert to be provided via the speaker(s) 114. In some examples, the communicator 236 instructs the respective display controllers 103, 107 of the primary and/or secondary display screen(s) 104, 105 to wake up to display the notifications.

The example authentication analyzer 128 of FIG. 2 includes an identification input analyzer 239. The identification input analyzer 239 provides means for evaluating user identification input(s) (e.g., a password, a fingerprint) provided by the user to determine if the manual identification input(s) are correct. The identification input analyzer 239 determines whether the identification input(s) are correct input(s) for accessing data on the device 102 based on identification input rule(s) 241 stored in the database 203. The identification input rule(s) 241 define known identification input(s) for authorized user(s) (e.g., previously set password(s), fingerprint image(s), etc.). If the identification input analyzer 239 determines that the input(s) are correct, the communicator 236 instructs the device 102 to move to the working system power state. If the identification input analyzer 239 determines that the input(s) are not correct, the communicator 236 instructs the device to remain in the connected standby mode and not to grant user access to the data stored on the device 102.

In some examples, the data from the ambient light analyzer 210 indicates that the user device 102 is in a bright environment. In such examples, the confidence analyzer 232 determines that image data analysis should be used to supplement the audio data analysis to authenticate the user and to avoid requesting manual identification input(s) from the user (e.g., a password). In response, the sensor manager 202 activates the user facing camera 116 and/or the world facing camera 118 as disclosed herein and based on, for instance, data from the lid position sensor(s) 123 indicating whether the device 102 is in an open position or a closed position. In some examples, the request generator 238 outputs a visual and/or audio request for the user to position himself or herself relative to the camera(s) 116, 118 for image authentication. In other examples, the camera(s) 116, 118 generate image data without an alert being provided to the user. The image data analyzer 230 analyzes the image data using the image model(s) 231 and generates image data prediction(s) with respect to recognition of the user in the image data 226, 228 as an authorized user. The image data analyzer 230 assigns confidence score(s) to the image data prediction(s).

The example confidence analyzer 232 analyzes the confidence(s) score for the audio data prediction(s) and the confidence score(s) for the image data prediction(s) to determine if use of image data to supplement the audio data increases the confidence with which the user is authenticated. To make such a determination, the confidence analyzer 232 determines if confidence score(s) for the audio data prediction(s) and the image data predictions satisfy a third confidence threshold. The third confidence threshold can define, for instance, a minimum confidence threshold for the audio data prediction(s) and a minimum confidence threshold for the image data prediction(s) such that when both the audio data prediction(s) and the image data prediction(s) meet the respective confidence thresholds, the confidence analyzer 232 determines that the user has been successfully authenticated as an authorized user. For instance, when both audio data and image data are used to authenticate the user, the minimum confidence threshold for the audio data prediction(s) can be 85% and the minimum confidence threshold for the image data prediction(s) can be 95%. When the confidence analyzer 232 determines that the audio data prediction(s) and the image data prediction(s) satisfy the respective thresholds, the communicator 236 instructs the device 102 to move to the working system power state and to log in the user to the device 102.

If the confidence analyzer 232 determines that audio data prediction(s) do not satisfy any of the confidence thresholds, the confidence analyzer 232 determines that the user should manually enter identification data (e.g., a password, fingerprints, etc.) to access the device 102. The request generator 238 generates notification(s) to be output via the speaker(s) 114 and/or the display(s) 104, 105 of the user device 102. In some examples, the communicator instructs the respective display controllers of the primary and/or secondary display screen(s) 104, 105 to wake up to display the notification(s). The identification input analyzer 239 analyzes the input(s) to determine if the correct input(s) were provided for unlocking the device 102.

As disclosed above, audio data can be used as an initial authentication mode and image data can be used to supplement the voice authentication. In other examples, the camera(s) 116, 118 are activated by the sensor manager 202 as the initial authentication mode (i.e., image data analysis is selected over audio data analysis for an initial authentication attempt). In such examples, the confidence analyzer 232 analyzes the confidence score(s) for the image data prediction(s) against a fourth confidence threshold defined by the confidence rule(s) 234. The fourth confidence threshold defines a confidence score value that represents a minimum confidence level for authenticating the user based on image data alone. For example, the fourth confidence threshold can indicate that the image data prediction(s) should satisfy at least a confidence level of 95% if the user is to be authenticated based on image data alone. If multiple image data prediction(s) are generated, the confidence analyzer 232 can consider, for instance, an average of the confidence score(s). If the confidence score(s) for the image data prediction(s) satisfy the fourth confidence threshold, the confidence analyzer 232 determines that the user has been successfully authenticated as an authorized user based on image recognition. The communicator 236 transmits instructions generated by the confidence analyzer 232 to cause the user device 102 to enter the working system power state and log in the user.

If the confidence analyzer 232 determines that the confidence score(s) for the image data prediction(s) do not satisfy the fourth confidence threshold, the confidence analyzer 232 determines if the image data prediction in combination with another type of authentication mode is sufficient to authenticate the user as an authorized user.

In some examples, the confidence analyzer 232 considers the image data prediction(s) in combination with the presence of the authentication device 124 as detected by authentication device analyzer 209. The confidence analyzer 232 compares the confidence score(s) for the image data prediction(s) to a fifth confidence threshold defined by the confidence rule(s) 234. The fifth confidence threshold defines a confidence score value that represents a minimum confidence level for authenticating the user based on image data in combination with the detection of the authentication device 124. For instance, the fifth confidence threshold can indicate that the image data prediction(s) should satisfy at least a confidence level of 90% if the user is to be authenticated based on image data and detection of the authentication device 124. If the combination of the image data prediction and the detection of the authentication device 124 satisfies the fifth confidence threshold, the confidence analyzer 232 determines that the user is an authorized user and instructs the device 102 to move to the working system power state and log in the user to the device 102. The communicator 236 transmits the instructions to the device 102 to perform actions based on the authentication of the user.

In examples in which the authentication device 124 is not detected or the combination of the image data prediction(s) and the authentication device 124 does not satisfy the fifth confidence threshold, the confidence analyzer 232 determines that audio data should be used to authenticate the user in addition to the image data.

In such examples, the request generator 238 generates notification(s) to the user requesting that the user provide an audio input. The request generator 238 outputs the request(s) as audio notification(s) via the speaker(s) 114 of the user device 102 and/or as visual notification(s) via the secondary display 105 and/or the primary display screen 104.

The sensor manager 202 activates the microphone(s) 112 to enable the collection of audio data 216 and the analysis of the data by the audio data analyzer 218. The audio data analyzer 218 generates audio data prediction(s) with respect to the recognition of the user's voice in the audio data 216 and assigns confidence score(s) the audio data prediction(s), as disclosed herein.

The example confidence analyzer 232 analyzes the confidence score(s) for the image data prediction(s) and the confidence score(s) for the audio data prediction(s) to determine if the use of audio data to supplement the image data increases the confidence with which the user is authenticated. The confidence analyzer 232 determines if the image data prediction(s) and the audio data prediction(s) satisfy a sixth confidence threshold. The sixth confidence threshold defines the minimum confidence threshold for the image data prediction(s) and the minimum confidence threshold for the audio data prediction(s) such that when both the image data prediction(s) and the audio data prediction(s) meet the respective confidence score thresholds, the confidence analyzer 232 determines that the user has been successfully authenticated as an authorized user. When the confidence analyzer 232 determines that the audio data prediction(s) and the image data prediction(s) satisfy the respective thresholds, the communicator 236 instructs the device 102 to move to the working system power state and to log in the user to the device 102.

If the confidence analyzer 232 determines that image data prediction(s) do not satisfy any of the confidence thresholds, the confidence analyzer 232 determines that the user should manually enter identification data (e.g., a password, fingerprints, etc.) to access the device 102. The request generator 238 generates notification(s) to be output via the speaker(s) 114 and/or the display(s) 104, 105 of the user device 102. The identification input analyzer 239 analyzes the input(s) to determine if the correct input(s) were provided for unlocking the device 102.

As disclosed herein, in some examples, the user device 102 receives request(s) from external user device(s) 119 that detect the user device 102 within a predefined distance range (e.g., a Wi-Fi direct communication range) while the user device 102 is in the connected standby mode. The request(s) from the external user device(s) 119 can include request(s) to share a screen, to transmit a file, to share power or charging capabilities, perform audio meshing, etc. The example authentication analyzer 128 receives notification acceptance data 240 from the push notification controller 113. The notification acceptance data 240 indicates that the user has accepted the request(s) from the remote user device(s) 119. In response to the notification acceptance data 240, the sensor manager selectively activates one or more of the microphone(s) 112 (if not already activated to enable the user to accept the request via an audio input) and/or the camera(s) 116, 118 to capture data that is used to authenticate the user as an authorized user of the device 102. In response to the acceptance of the request, the example authentication analyzer 128 attempt to authenticate the user based on the audio data prediction(s) generated by the audio data analyzer 218 and/or the image data prediction(s) generated by the image data analyzer 230, as disclosed herein. The confidence analyzer 232 analyzes the confidence score(s) for the audio data prediction(s) and/or the image data prediction(s) to determine the confidence score(s) satisfy the confidence threshold(s) defined by the confidence rule(s) 234 for authenticating the user based on image audio data, image data, or a combination thereof (e.g., image data and audio data, audio data and detection of an authentication device 124 which may be the same or different as the request-generating device 119).

If the confidence analyzer 232 determines that the user has been authenticated as an authorized user of the device 102, the communicator 236 informs the push notification controller 113 that the user has been authenticated. The push notification controller 113 proceeds to instruct one or more hardware devices of the user device 102 to take one or more actions in response to the request(s) received from the external user device(s) 119.

While an example manner of implementing the authentication analyzer 128 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor manager 202, the example database 203, the example user presence detection analyzer 208, the example authentication device analyzer 209, the example ambient light analyzer 210, the examiner device position analyzer 216, the example audio data analyzer 218, the example timer 222, the example image data analyzer 230, the example confidence analyzer 232, the example communicator 236, the example request generator 238, the example identification input analyzer 239 and/or, more generally, the example authentication analyzer 128 of FIG. 2 may be implemented by hardware, software, firmware and/or any combination of hardware, software and/or firmware. Thus, for example, any of the example sensor manager 202, the example database 203, the example user presence detection analyzer 208, the example authentication device analyzer 209, the example ambient light analyzer 210, the examiner device position analyzer 216, the example audio data analyzer 218, the example timer 222, the example image data analyzer 230, the example confidence analyzer 232, the example communicator 236, the example request generator 238, the example identification input analyzer 239 and/or, more generally, the example authentication analyzer 128 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor manager 202, the example database 203, the example user presence detection analyzer 208, the example authentication device analyzer 209, the example ambient light analyzer 210, the examiner device position analyzer 216, the example audio data analyzer 218, the example timer 222, the example image data analyzer 230, the example confidence analyzer 232, the example communicator 236, the example request generator 238, and/or the example identification input analyzer 239 is/are hereby expressly defined to include a non-transitory computer readable storage device or storage disk such as a memory, a digital versatile disk (DVD), a compact disk (CD), a Blu-ray disk, etc. including the software and/or firmware. Further still, the example authentication analyzer 128 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
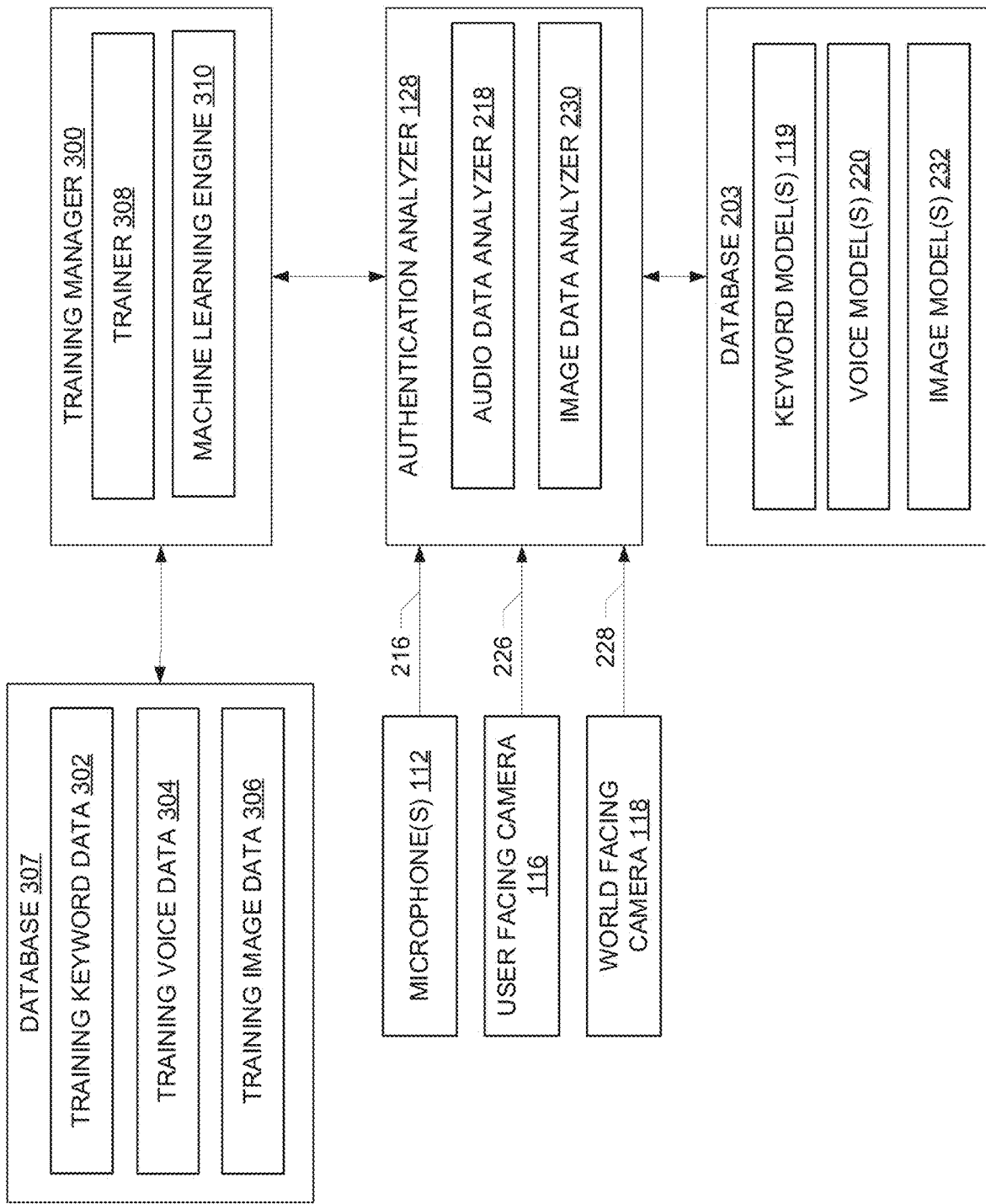
FIG. 3 is a block diagram of an example implementation of a training manager to train the example the authentication analyzer of FIG. 2.

FIG. 3 is a block diagram of an example implementation of a training manager 300 that can be used to train the example authentication analyzer 128 of FIGS. 1 and/or 2 to perform audio data analysis and image data analysis. The example training manager 300 can be implemented by the processor 108 of the user device 102. In some examples, the training manager 300 is implemented by the processor 125 of the user device 119 and/or the processor 127 of the authentication device 124. In other examples, the training manager 300 is implemented by the cloud-based device 126. In other examples, some of the analysis performed by the training manager 300 is implemented by cloud-based device(s) (e.g., the cloud-based device 126) and other parts of the analysis are implemented by processor(s) or one or more user device(s) (e.g., the processor 125 of the user device 119). The processor(s) and/or cloud-based device(s) that are used to implement the training manager 300 can be the same or different as the processor(s) and/or cloud-based device(s) used to implement the authentication analyzer 128.

The example training manager 300 of FIG. 3 trains the audio data analyzer 218 of the example authentication analyzer 128 of FIG. 2 to recognize wake word(s) that indicate that a user wishes to use the user device 102. The training manager 300 trains the audio data analyzer 218 to perform speech recognition using machine learning and training keyword data 302. The training keyword data 302 is stored in a database 307. In some examples, the training manager 300 includes the database 307. In other examples, the database 307 is located external to the training manager 300 in a location accessible to the training manager 300 as shown in FIG. 3. The databases 203, 307 of FIGS. 2 and 3 may be implemented using the same storage device or different storage devices. The training keyword data 302 includes words and/or phrases and associated meanings of the words and/or phrases in the context of controlling the user device 102. For instance, the training keyword data 302 can includes rules associating the word "on" with a request for the user device to move from the low power state to the working system power. In some examples, the training keyword data 302 is based on speech samples obtained from a user of the device 102 or another device at a previous time. In some examples, the training keyword data 302 can include the audio data 216 generated when a user accesses the user device 102 and undergoes authentication by the authentication analyzer 128.

The example training manager 300 of FIG. 3 also trains the audio data analyzer to recognize a voice of one or more authorized users of the user device 102. The training manager trains the audio data analyzer 218 to perform voice recognition using machine learning and training voice data 304 (e.g., voiceprints) collected from the authorized user(s). The training voice data 304 can be stored in the database 307. The training voice data 304 includes voiceprint(s), or model(s) of a voice of an authorized user that represent vocal patterns for the authorized user. The voiceprint(s) can be in the form of sound spectrogram(s) that represent features of the authorized user's voice such as frequency. In some examples, the training voice data 304 is based on speech samples obtained from the authorized user(s) at previous time(s). In some examples, the training voice data 304 can include the audio data 216 generated when an authorized user accesses the user device 102 and undergoes authentication by the authentication analyzer 128.

The example training manager 300 trains the image data analyzer 230 of the example authentication analyzer 128 of FIG. 2 to recognize features (e.g., facial features, hair color) of the one or more authorized users in image data using machine learning and training image data 306 of the authorized user(s). The training image data 306 can be stored in the database 307. The training image data 306 includes images of authorized user(s). For instance, the training image data 306 can include images of an authorized user's face from different angles and/or in different lighting.

The example training manager 300 of FIG. 3 includes a trainer 308 and a machine learning engine 310. The trainer 308 trains the machine learning engine 310 using the training keyword data 302, the training voice data 304, and the training image data 306 using, for example, supervised learning to generate models for analysis of audio data and image data. The machine learning models are used by the authentication analyzer 128 perform authentication of a user attempting to access the user device 102. For example, the trainer 308 uses the training keyword data 302 to generate the keyword model(s) 219 via the machine learning engine 310. The trainer 308 uses the training voice data 304 to generate the voice model(s) 220 via the machine learning engine 310. The voice model(s) 220 define feature(s) of the voice(s) of the authorized user(s). The trainer 308 uses the training image data 306 to generate the image model(s) 231 via the machine learning engine 310. The image model(s) 231 define feature(s) of the user (e.g., facial feature(s)). The keyword model(s) 219, the voice model(s) 220, and the image model(s) 231 are stored in the database 203 of FIGS. 2 and 3.

As disclosed herein, the audio data analyzer 218 uses the keyword model(s) 219 to interpret the words and/or phrases in the audio data 216 captured by the microphone(s) 112 to determine if the user intends to interact with the user device 102. The audio data analyzer 218 uses the voice model(s) 220 to generate the audio data prediction(s), or the prediction(s) as to whether the voice of the user in the audio data 216 is the voice of an authorized user. The image data analyzer 230 uses the image model(s) 231 to generate the image data predictions, or the predictions as to whether the user attempting to access the user device 102 is an authorized user as determined based on feature(s) of the user identified in the image data 226, 228 generated by the user facing camera 116 and/or the world facing camera 118.

While an example manner of implementing the training manager 300 is illustrated in FIG. 3, one or more of the elements, processes and/or devices illustrated in FIG. 3 may be combined, divided, re-arranged, omitted, eliminated and/or implemented in any other way. Further, the example database 307, the example trainer 308, the example machine learning engine 310 and/or, more generally, the example training manager 300 of FIG. 3 may be implemented by hardware, software, firmware and/or any combination of hardware, software and/or firmware. Thus, for example, any of the example database 307, the example trainer 308, the example machine learning engine 310 and/or, more generally, the example training manager 300 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 307, the example trainer 308, and/or the example machine learning engine 310 is/are hereby expressly defined to include a non-transitory computer readable storage device or storage disk such as a memory, a digital versatile disk (DVD), a compact disk (CD), a Blu-ray disk, etc. including the software and/or firmware. Further still, the example training manager 300 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
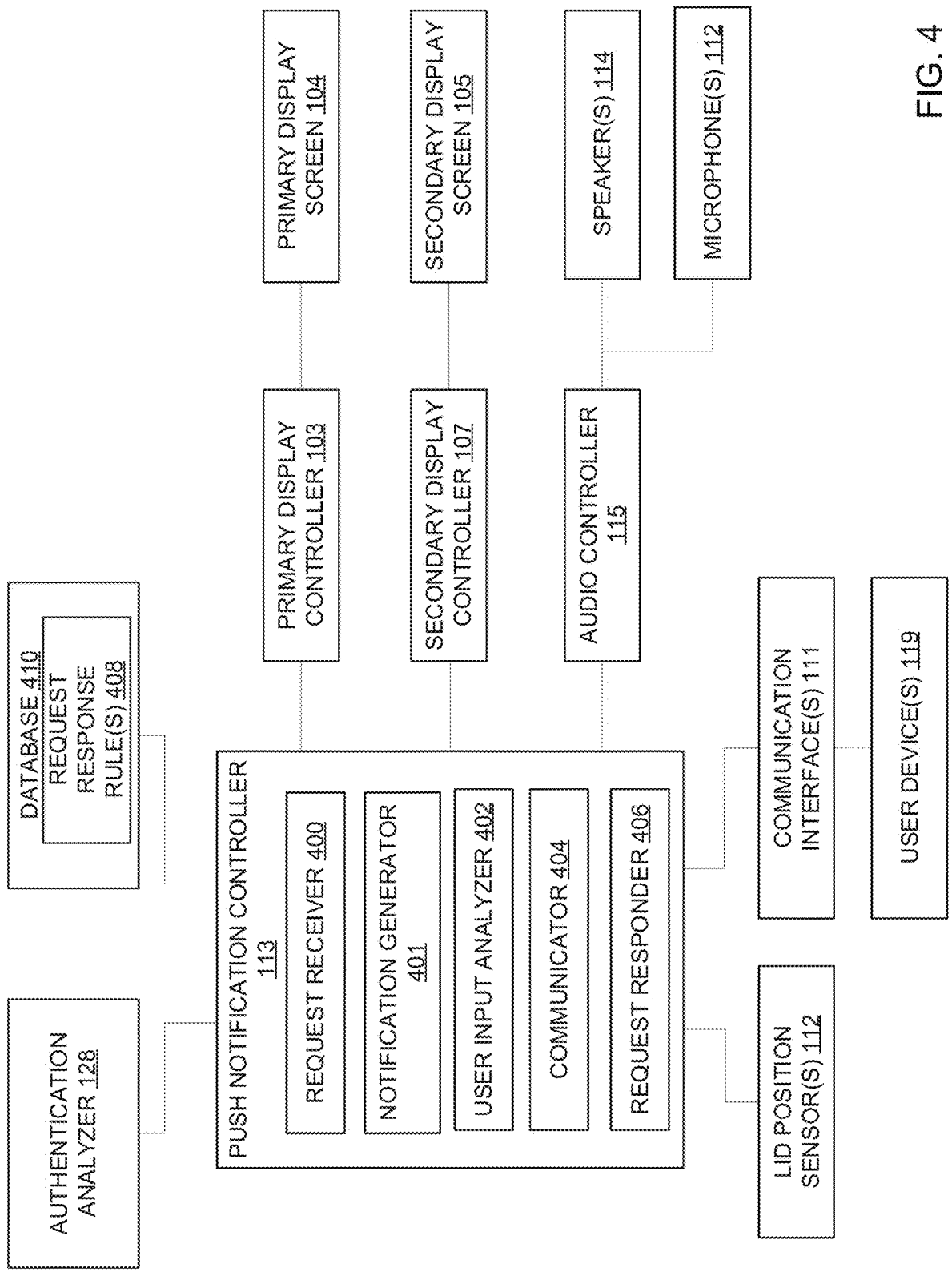
FIG. 4 is a block diagram of an example implementation of a push notification controller of the example user device of FIG. 1.

FIG. 4 is a block diagram of an example implementation of the push notification controller 113 of FIG. 1. As mentioned above, the push notification controller 113 is constructed to analyze and/or control responses to push notifications received from remote user device(s) 119 via the communications interface(s) 111. The example push notification controller 113 can be implemented by the processor 108 of the user device 102. In some examples, the push notification controller 113 is implemented by the processor 125 of the user device 119 and/or the processor 127 of the authentication device 124. In other examples, the push notification controller 113 is implemented by the cloud-based device 126. In other examples, some of the analysis performed by the push notification controller 113 is implemented by cloud-based device(s) (e.g., the cloud-based device 126) and other parts of the analysis are implemented by processor(s) or one or more user device(s) (e.g., the processor 125 of the user device 119). The processor(s) and/or cloud-based device(s) that are used to implement the push notification controller 113 can be the same or different as the processor(s) and/or cloud-based device(s) used to implement the authentication analyzer 128. In the examples of FIGS. 1, 2, and 4, the push notification controller 113 is powered on while the user device 102 is in the connected standby mode to enable the user to view and respond to incoming push notification(s) while the computer is in connected standby mode.

The example push notification controller 113 of FIG. 4 includes a request receiver 400 to detect requests from remote user device(s). The example push notification controller 113 of FIG. 4 includes a notification generator 401. The notification generator 401 provides means for causing audio, visual, and/or haptic signal(s) to be generated to alert a user of an incoming request(s). The notification(s) generated by the notification generator can include different options that a user may select to respond to an incoming notification. For instance, one option may be for a user to dismiss the notification and respond later, a second option may be for a user to provide a quick reply (e.g., a short preset text message), and a third option may be for the user to provide a detailed response (e.g., immediately answer an incoming conference call). In the example of FIG. 4, the notification generator 401 outputs the notification for display via, for example, the secondary display screen 105 of the user device 102.

In some examples, the displays 104, 105 are turned off when the push notification is received. The example push notification controller 113 includes a communicator 404 to instruct the primary display controller 103 and/or the secondary display controller 107 to move from a low power state to a working state such that the primary and/or secondary display screens(s) 104, 105 display the notification(s) generated by the notification generator 401. In some examples, the notification generator 401 analyzes data from the lid position sensor(s) 123 to determine the form factor position of the user device 102 (e.g., open state, closed state). The communicator 404 can selectively instruct the primary display controller 103 and/or the secondary display controller 107 to display the notification(s) based on the form factor position of the device 102.

The example push notification controller 113 of FIG. 4 includes a user input analyzer 402. The user input analyzer 402 analyzes the input(s) provided by the user in response to the notification(s) generated by the notification generator 401. If the user input analyzer 402 determines that the user did not respond to a notification or declined the notification, the communicator 404 refrains instructing the device 102 to take action to initiate a response to the notification(s).

In the example of FIG. 4, if the user input analyzer 402 determines that the user has accepted the push notification, the communicator 404 communicates with the authentication analyzer 128 to verify that the user is an authorized user of the user device 102. The authentication analyzer 128 attempts to authenticate the user using image data and/or audio data as disclosed in connection with FIGS. 1-3. If the authentication analyzer 128 is unable to authenticate the user using image data and/or audio data, the authentication analyzer 128 requests other identification modes from the user (e.g., entry of a password, a fingerprint).

The example push notification controller 113 of FIG. 4 includes a request responder 406. In the example of FIG. 4, when the user is authenticated by the authentication analyzer 128 as an authorized user, the request responder 406 generates instruction(s) that causes the user device 102 to take one or more actions to respond to the push notifications(s). The request responder 406 generates the instruction(s) based on request response rule(s) 408 stored in a database 410 and defined by user input(s). In some examples, the push notification controller 113 includes the database 410. In other examples, the database 410 is external to the push notification controller 113 as shown in FIG. 4. The databases 203, 307, 410 can be the same storage device or different storage devices.

For example, if the authorized user accepts a request from the remote user device 119 to share screens, the request responder 406 instructs the primary display controller 103 to cause the primary display screen 104 to display the shared screen (i.e., the screen visible at the remote user device 119). In some examples, the request responder 406 instructs the secondary display controller 107 to cause the second display screen 105 to display data associated with the notification. For instance, if the user accepts a request for a file transfer, request responder 406 can instruct the secondary display screen 105 to display a notification that the file has been received from the remote device 119. In some examples, the request responder 406 analyzes data from the lid position sensor(s) 123 to determine the form factor position of the user device 102 (e.g., open state, closed state). The request responder 406 can instruct the primary display controller 103 and/or the secondary display controller 107 to display data based on the form factor position of the device 102.

In examples in which the user accepts a request for an incoming phone call and/or to receive an audio file from the remote device 119, the request responder 406 instruct the audio controller 115 to activate the speaker(s) 114 and/or the microphone(s) 112 to enable the user to hear the audio and/or provide audio input(s). The request responder 406 can communicate with other hardware devices of the user device 102 to enable the user device to, for example, accept wireless charging from the remote device.

The request responder 406 can generate instruction(s) that cause the hardware device(s) of the user device 102 to take the one or more actions in response to the request(s) while the device 102 is in the low power, connected standby mode. For example, the user device 102 can display a shared screen received from the remote device 119 while in the connected standby mode. In some examples, the request responder 406 determines that the device 102 should be moved to the working system power state (i.e., fully powered state) if, for instance, the user selects to save a file received from the remote device 119 to the user device 102. In such examples, the request responder 406 communicates with the hardware device(s) of the user device to move the user device 102 to the working system power state. The request responder 406 analyzes the action(s) to be performed by the user device 102 in response to the push request(s) to determine if the device 102 can remain in the connected standby mode or if the device should be moved to the working system power state.

While an example manner of implementing the push notification controller 113 of FIG. 1 is illustrated in FIG. 4, one or more of the elements, processes and/or devices illustrated in FIG. 4 may be combined, divided, re-arranged, omitted, eliminated and/or implemented in any other way. Further, the example request receiver 400, the example notification generator 401, the example user input analyzer 402, the example communicator 404, the example request responder 406, the example database 410 and/or, more generally, the example push notification controller 113 of FIG. 4 may be implemented by hardware, software, firmware and/or any combination of hardware, software and/or firmware. Thus, for example, any of the example request receiver 400, the example notification generator 401, the example user input analyzer 402, the example communicator 404, the example request responder 406, the example database 410 and/or, more generally, the example push notification controller 113 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request receiver 400, the example notification generator 401, the example user input analyzer 402, the example communicator 404, the example request responder 406, and/or the example database 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example push notification controller 113 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
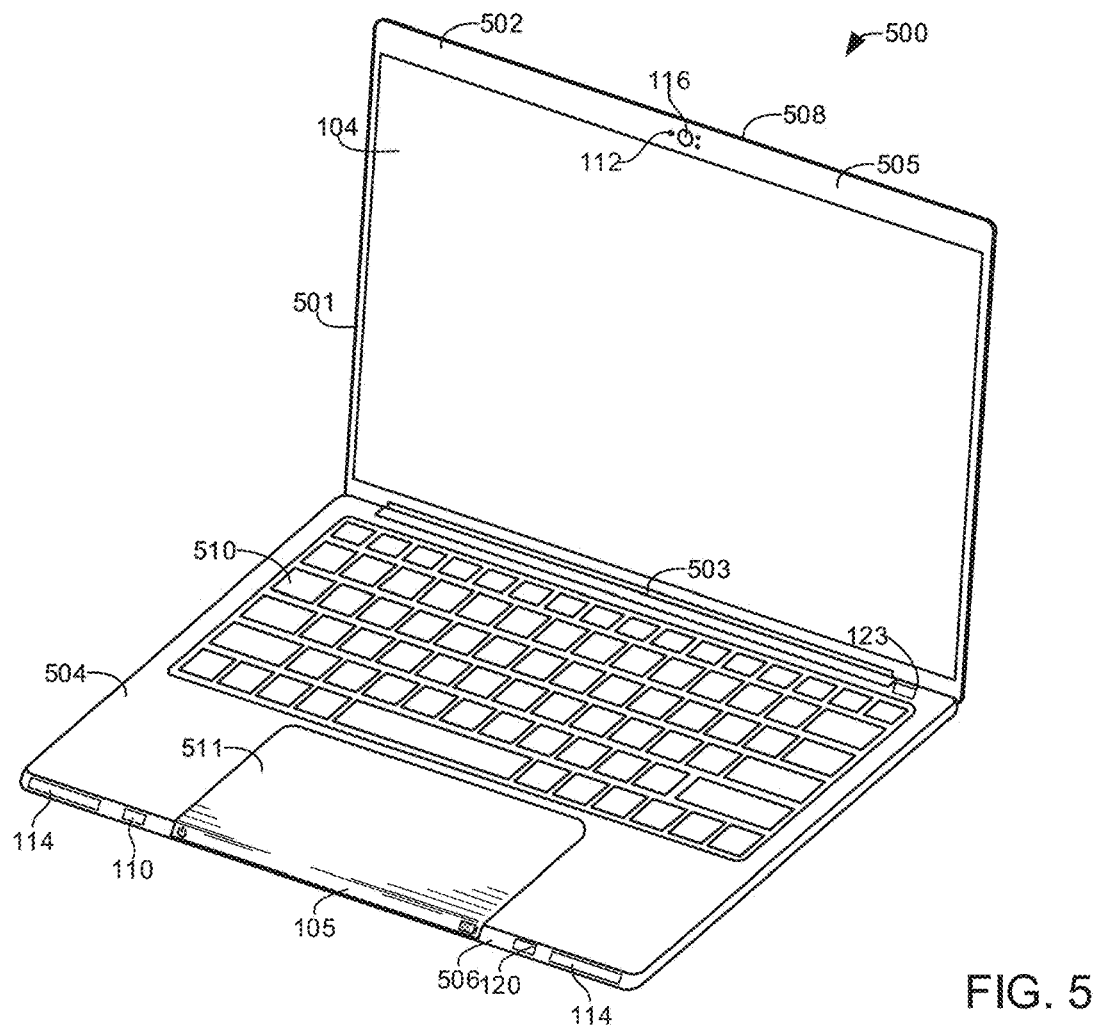
FIG. 5 illustrates an example user device constructed in accordance with teachings of this disclosure and, in particular, shows the user device in an open position.

FIG. 5 illustrates an example user device 500 in which examples disclosed herein may be implemented. In FIG. 5, the example user device 500 is a laptop. However, as disclosed herein, other types of user devices, such as desktops or electronic tablets, can be used to implement the examples disclosed herein.

Figure 6:
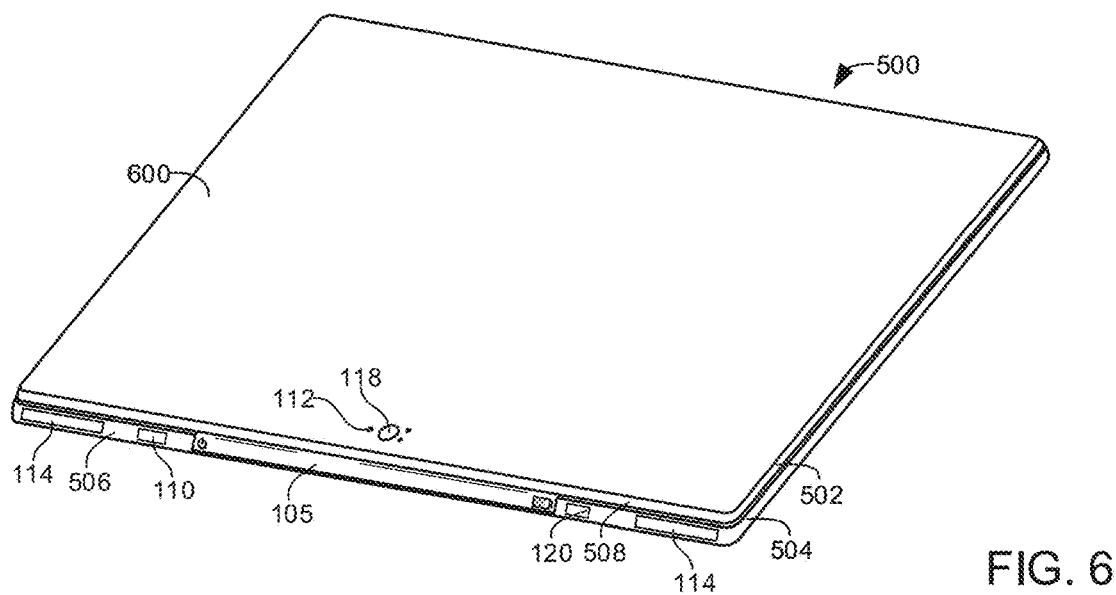
FIG. 6 illustrates the example user device of FIG. 5 in a closed position.

The example user device 500 of FIG. 5 includes a housing 501 including a lid 502 and a base 504. The lid 502 can rotate about a hinge 503 of the device 500 to enable the device 500 to move between the open position of FIG. 5 and a closed position (FIG. 6). The example user device 500 include the lid position sensor(s) 123 to detect the position of the lid 502 relative to the base 504.

As shown in FIG. 5, the primary display screen 104 is carried by the lid 502 and visible via a first side 505 of the lid 502. The example user device 500 includes the secondary display screen 105 carried by the base 504. As shown in FIG. 5, the secondary display screen 105 is disposed at a front edge 506 of the base 504 so as to be visible when the lid 502 is closed (FIG. 6). The secondary display screen 105 can be disposed at other locations on the user device 500, such as at a distal edge 508 of the lid 502. The example user device 500 include user input device(s) (e.g., the user input device(s) 106), such as a keyboard 510 and a touch pad 511 to enable the user to interact with the device 500.

The example user device 500 of FIG. 5 includes the user facing camera 116. As shown in FIG. 5, the user facing camera 116 is carried by the lid 502 proximate to the distal edge 508. In FIG. 5, a first microphone 112 is disposed proximate to the user facing camera 116.

The example user device 500 includes the speaker(s) 114 carried by the base 504. In the example of FIG. 5, the speakers 114 are disposed at the front edge 506 of the base 504 to enable a user to hear audio content when the lid 502 is closed.

The example user device 500 includes the user presence detection sensor(s) 110 disposed at the front edge 506 of the base 504 to detect the presence of subject(s) proximate to the user device 500 when the device 500 is in the open position or closed position. The example user device 500 includes the ambient light sensor(s) 120 disposed at the front edge 506 of the base 540 to detect lighting conditions in an environment in which the user device 500 is located when the device is in the open position or the closed position.

FIG. 6 illustrates the example user device 500 of FIG. 5 in a closed position in which the lid 502 has been rotated about the hinge 503 (FIG. 5) such that distal edge 508 of the lid 502 is substantially adjacent to the front edge 506 of the base 504. As shown in FIG. 6, the secondary display screen 105 is visible when the device 500 is in the closed position. Also, the user presence sensor(s) 110 are able to generate data with respect to the detection of subject(s) when the device is in the closed position as a result of the position of the sensor(s) 110 on the front edge of the base 504. Similarly, the ambient light sensor(s) 120 are able to generate data about the lighting conditions in the environment in which the device 500 is located as a result of the position of the sensor(s) 110 on the front edge of the base 504.

As shown in FIG. 6, the example user device 500 includes the world-facing camera 118 carried by a second side 600 of the lid 502 opposite the side 505 that carries the primary display screen 104 (FIG. 5). Also, the example user device 500 includes a second microphone 112 at the second side 600 of the lid 502 to capture audio data when the device 500 is in the closed position.

Figure 7:
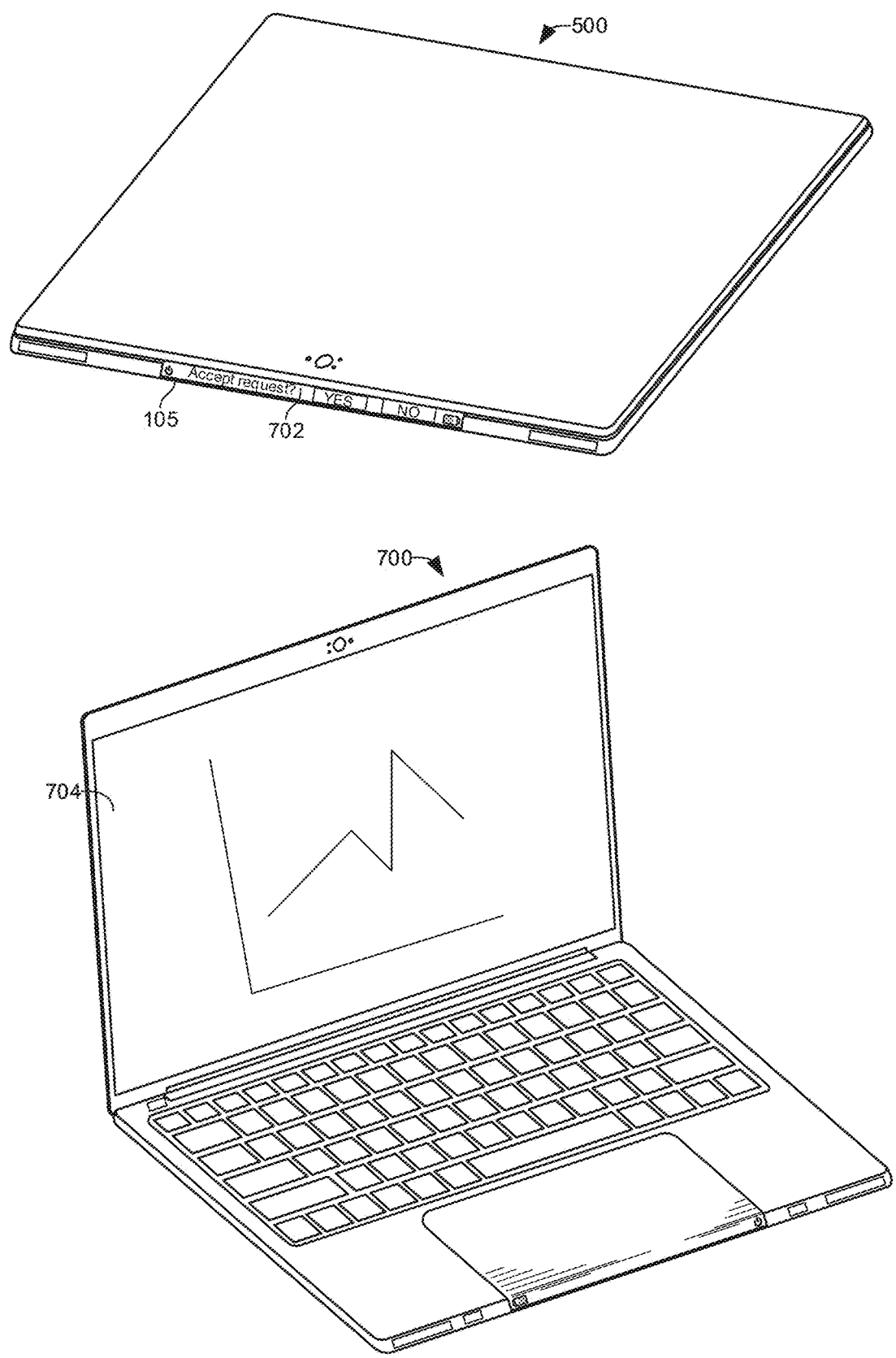
FIGS. 7 and 8 illustrate the example user device of FIGS. 5 and 6 and a second user device for transmitting a request to the example user device.
Figure 8:
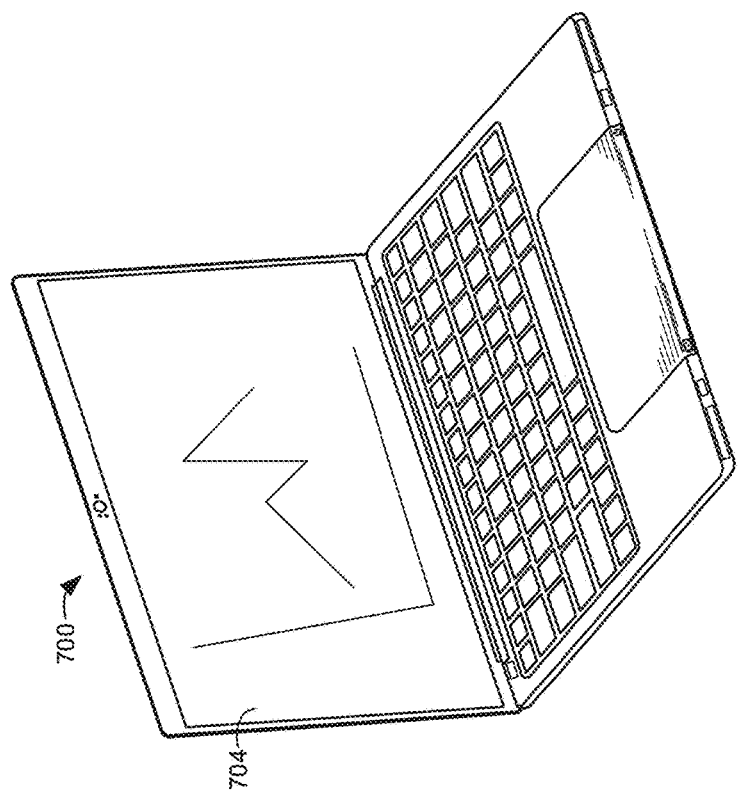
Figure 8:
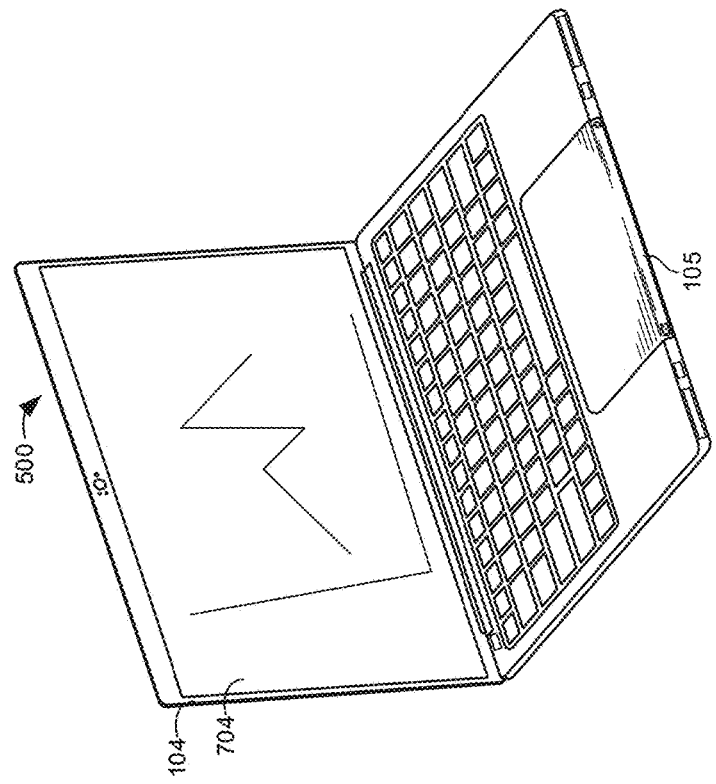

FIGS. 7 and 8 illustrate the example user device 500 of FIGS. 5 and 6 in the connected standby mode, where the device 500 has received a request from a remote user device 700. In the example of FIGS. 7 and 8, the remote user device 700 can communicate with the user device 500 over a wireless communication network such as Bluetooth® or Wi-Fi Direct. As shown in FIG. 7, the user device 500 can receive requests while in the connected standby mode and in the closed position. In particular, in response to the request generated by the remote user device 700, a push notification 702 is displayed on the secondary display screen 105. The push notification 702 can include options for a user to accept or deny the request from the remote user device 700. For instance, the request can include a request to for the remote user device 700 to share a screen 704 with the user device 500 and the push notification 702 can display an "accept" button and a "deny" button.

When the user accepts the request from the remote user device 700 (e.g., either by providing a touch input on the secondary display screen 105 and/or an audio input), the user device 500 takes one or more action(s) in response to the acceptance of the request. As disclosed above, the authentication analyzer 128 of FIGS. 1-4 verifies that the user who accepted the request is an authorized user of the device 102. FIG. 8 shows an example in which the user accepted the request to share screens with the remote user device 700 and has been authenticated as an authorized user of the device 500. In the example of FIG. 8, the user moved the device 500 to the open position. In response to the acceptance of the request and authentication of the user, the authentication anlayzer instructs the primary display controller of the user device 500 (e.g., the primary display controller 103 of FIG. 1) to display the screen data received from the remote user device 700 via the primary display screen 104. Other hardware components of the device 500 can remain in a low power state.

Although the example of FIG. 8 shows data displayed via the primary display screen 104, in other examples, data related to the request from the remote user device 700 can additionally or alternatively be displayed via the secondary display screen 105. Also, although the example of FIGS. 7 and 8 are discussed in connection with a screen share request, the example user device 500 can receive and respond to other requests from the remoted user device 700, such as requests to share audio, power, charging capabilities, etc.

Figure 9:
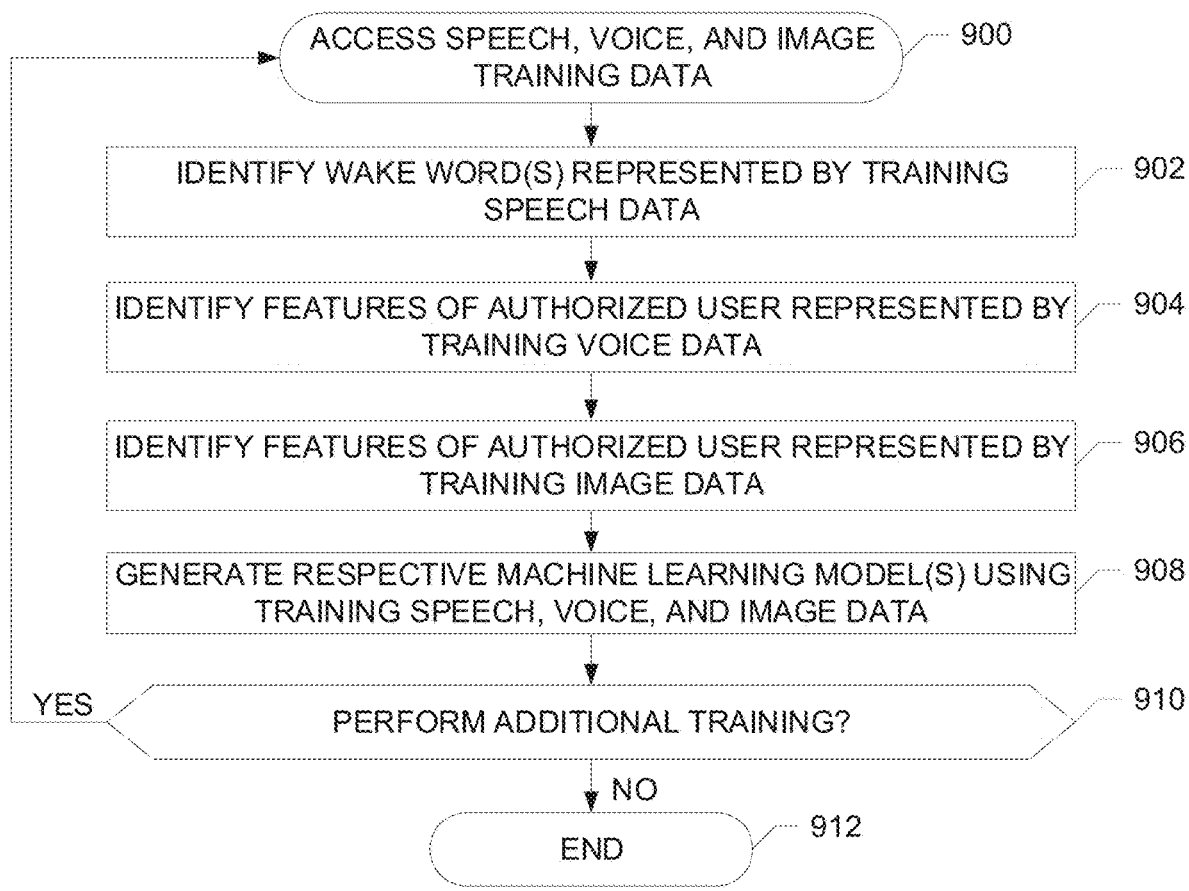
FIG. 9 is a flowchart representative of example machine readable instructions that may be executed to implement the example training manager of FIG. 3.

A flowchart representative of example hardware logic, machine readable instructions, hardware implemented state machines, and/or any combination thereof for implementing the example training manager 300 of FIG. 3 is shown in FIG. 9. The machine readable instructions may be one or more executable programs or portion(s) of an executable program for execution by a computer processor such as the processor 300 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 300, but the entire program and/or parts thereof could alternatively be executed by a device other than the processor 300 and/or embodied in firmware or dedicated hardware. Further, although the example program is described with reference to the flowchart illustrated in FIG. 9, many other methods of implementing the example training manager 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIG. 9 is a flowchart of example machine readable instructions that, when executed, implement the example training manager 300 of FIG. 3. In the example of FIG. 9, the training manager 300 trains the example authentication analyzer 128 of FIGS. 1 and/or 2 using training data, which is generated for one or more authorized users of a user device (e.g., the user device 102, 500 of FIGS. 1, 5). As discussed herein, the training manager 300 generates machine learning models that are used by the authentication analyzer 128 of FIGS. 1 and/or 2 to generate predictions as to whether a user attempting to access the user device 102, 500 is an authorized user of the device 102, 500 based on image data captured by the camera(s) 116, 118 of the user device 102, 500 and/or audio data captured by the microphone(s) 112 of the user device 102, 500.

The example instructions of FIG. 9 can be executed by one or more processors of, for instance, the user device 102, 500, a second user device (e.g., the authentication device 124, the user device 119) and/or a cloud-based device (e.g., the cloud-based device(s) 126). The instructions of FIG. 9 can be executed in substantially real-time as the training data is received by the training manager 300 or at some time after the training data is received by the training manager 300. The training manager 300 can communicate with the authentication analyzer 128 via the communicator 236 and one or more wired or wireless communication protocols.

The example trainer 308 of FIG. 3 accesses training data including training keyword data 302, training voice data 304, and/or training image data 306 (block 900). The training data 302, 304, 306 can be stored in the database 307. In some examples, the training data 302, 304, 306 is generated for user(s) who are not interacting with the user device 102, 500. In some examples, the training sensor data 302, 304, 306 is generated while user(s) are interacting with the user device 102, 500. In some such examples, the training sensor data 302, 304, 306 can be received from the authentication analyzer 128 and/or directly from the sensors 112, 116, 118 of the user device 102, 500.

The example trainer 308 identifies wake word(s) that are used to control the user device 102, 500 represented by the training keyword data 302 (block 902). For example, based on the training keyword data 302, the trainer 308 identifies word(s) and/or phrase(s) that, when spoken by an authorized user, indicates that the user wishes to interact with the device 102, 500. For example, based on the training speech data, the trainer 308 identifies word(s) such as "on" or "wake" as indicative of user intent to interact with the device 102.

The example trainer 308 of FIG. 3 identifies features of the authorized user represented by the training voice data 304 (block 904). For example, based on the training voice data 304, the trainer 308 identifies feature(s) of the voice of the authorized user, such as frequency, intensity, etc.

The example trainer 308 of FIG. 3 identifies features of the authorized user represented by the training image data 306 (block 906). For example, based on the training image data, the trainer 308 identifies feature(s) of an appearance of the authorized user, such as hair color, eye color, etc.

The example trainer 308 of FIG. 3 generates machine learning model(s) 219, 220, 231 via the machine learning engine 310 and based on the respective training data 302, 304, 306 (block 908). For example, the trainer 308 uses the training keyword data 302 to generate the keyword model(s) 219 that are used by the authentication analyzer 128 (e.g., the audio data anlayzer 218) to detect the wake word(s) in the audio data 216 captured by the microphone(s) 112 of the user device 102, 500. The trainer 308 uses the training voice data 304 to generate the voice model(s) 220 that are used by the authentication analyzer 128 (e.g., the audio data analyzer 218) to predict whether the voice of a user in the audio data 216 captured by the microphone(s) 112 matches the voice of the authorized user. The trainer 308 uses the training image data 306 to generate the image model(s) 231 that are used by the authentication analyzer 128 (e.g., the image data analyzer 230) to predict whether the features of the user identified in the image data 226, 228 generated by the camera(s) 116, 118 matches the features of the authorized user.

The example trainer 308 can continue train the authentication analyzer 128 using different datasets and/or datasets having different levels of specificity (block 910). For example, the trainer 308 can generate machine learning image model(s) 231 for use by the authentication analyzer 128 using a first training image dataset 306 including a side profile image of a face of the authorized user and a second training image dataset 306 including a front profile of the face of the authorized user. Thus, the trainer 308 provides the authentication analyzer 128 with machine learning model(s) 219, 220, 231 that the authentication analyzer 128 can use to predict whether the user attempting to interact with the user device 102, 500 is an authorized user of the device. The example instructions end when there is no additional training to be performed (e.g., based on user input(s)) (block 912).

Figure 10A:
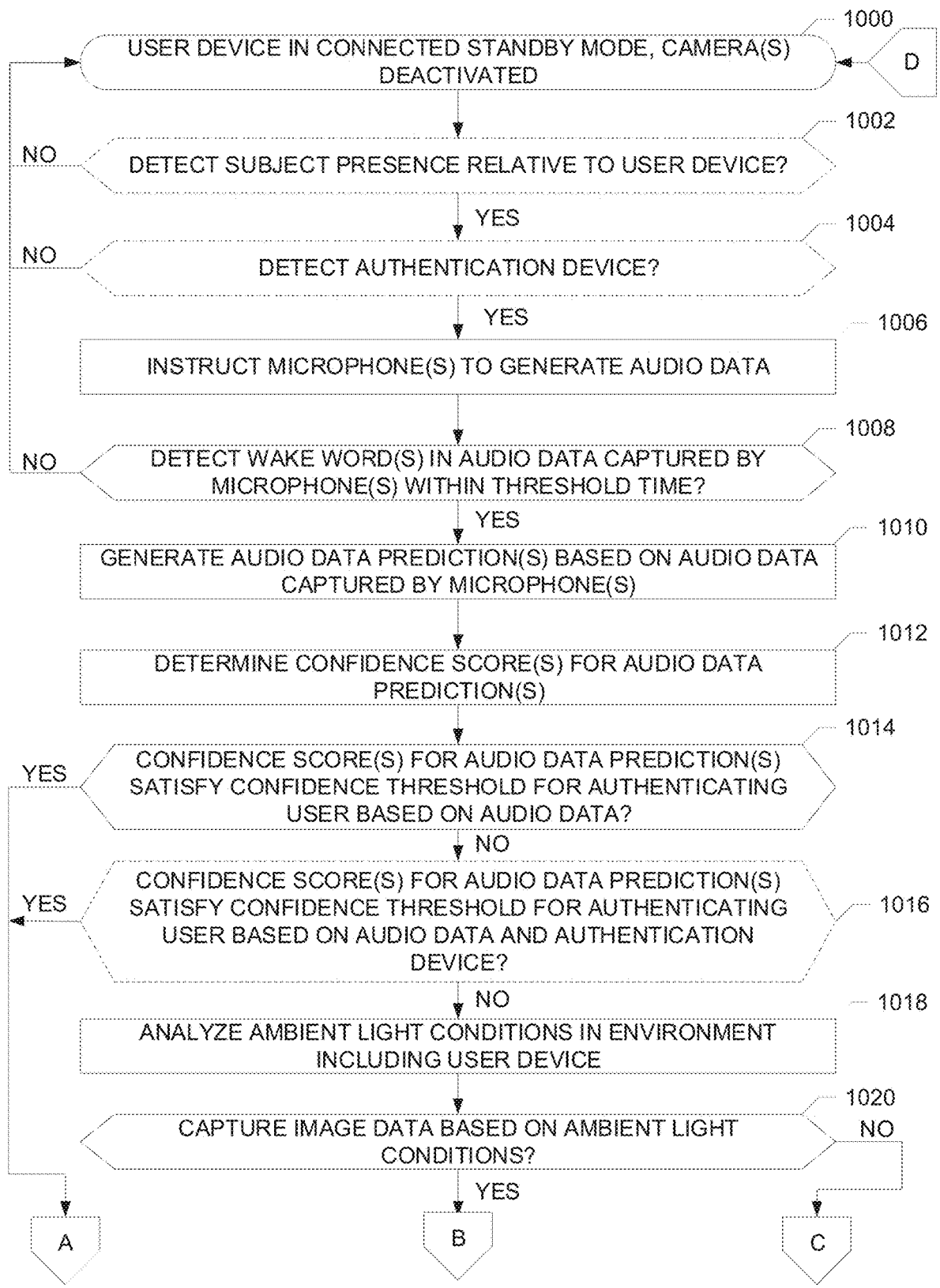
FIGS. 10A and 10B are flowcharts representative of example machine readable instructions that may be executed to implement the example authentication analyzer of FIGS. 1 and/or 2 to authenticate a user of a user device via a first authentication process.
Figure 10B:
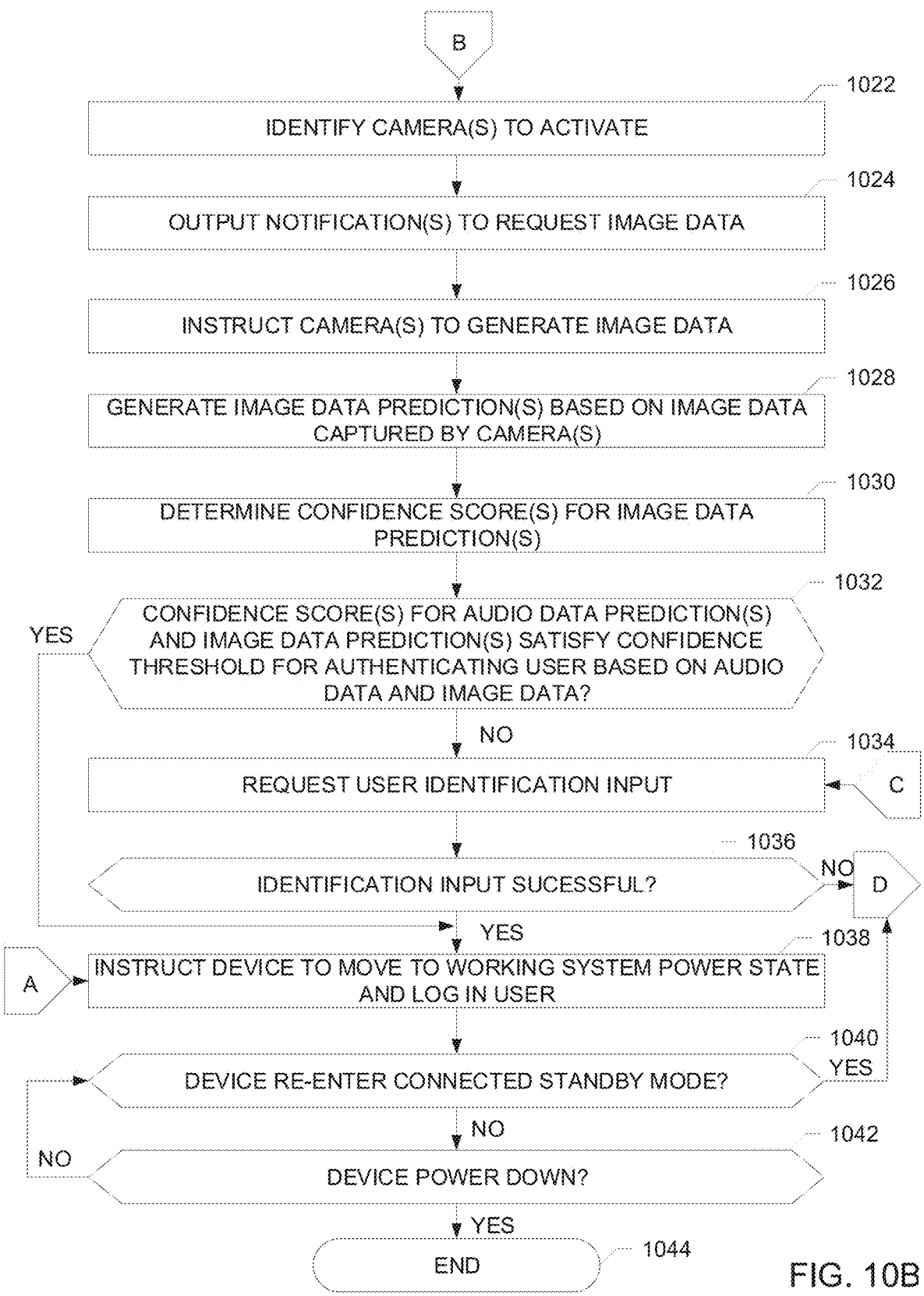
Figure 11A:
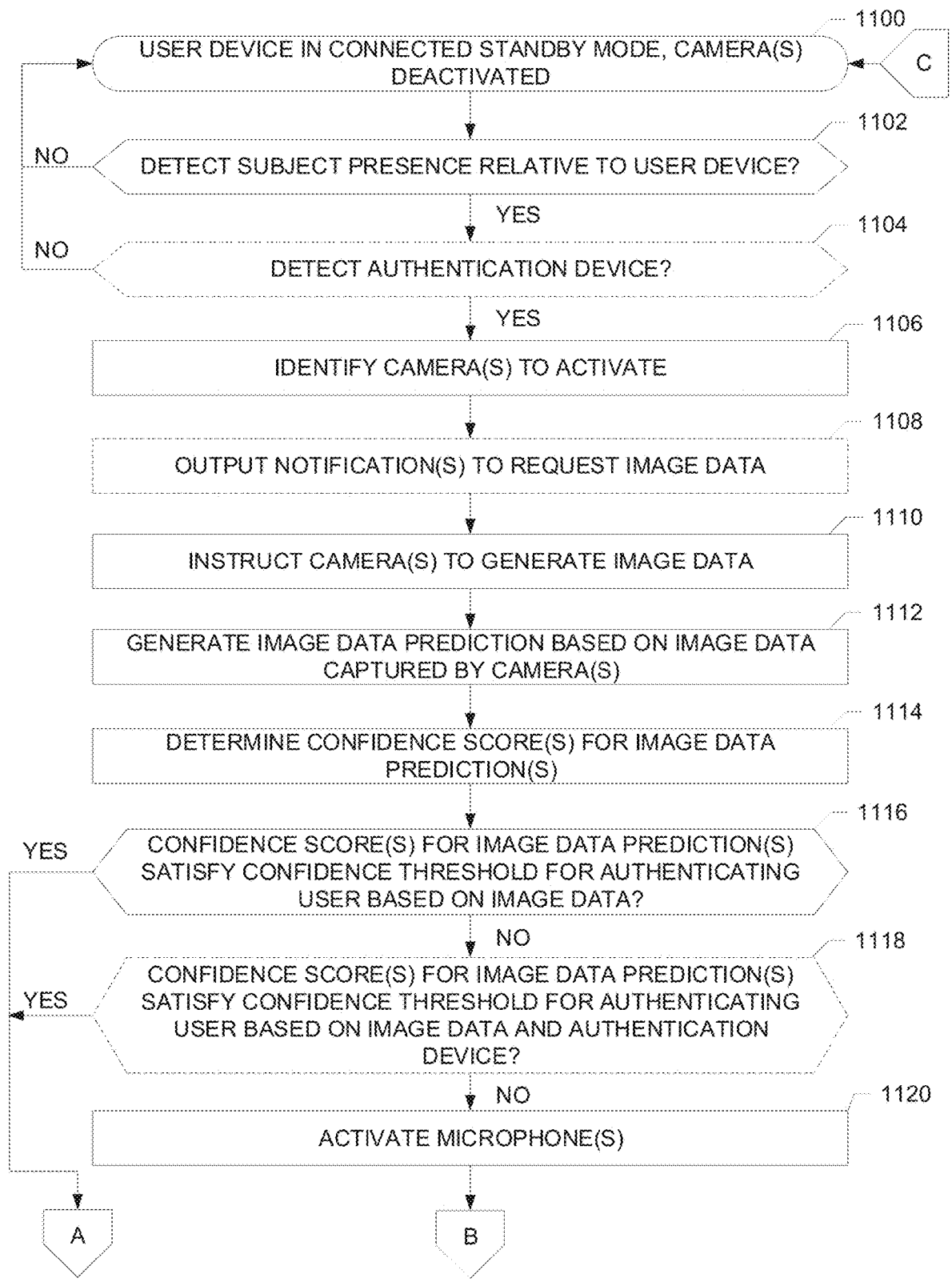
FIGS. 11A and 11B are flowcharts representative of example machine readable instructions that may be executed to implement the example authentication analyzer of FIGS. 1 and/or 2 to authenticate a user of a user device via a second authentication process.
Figure 11B:
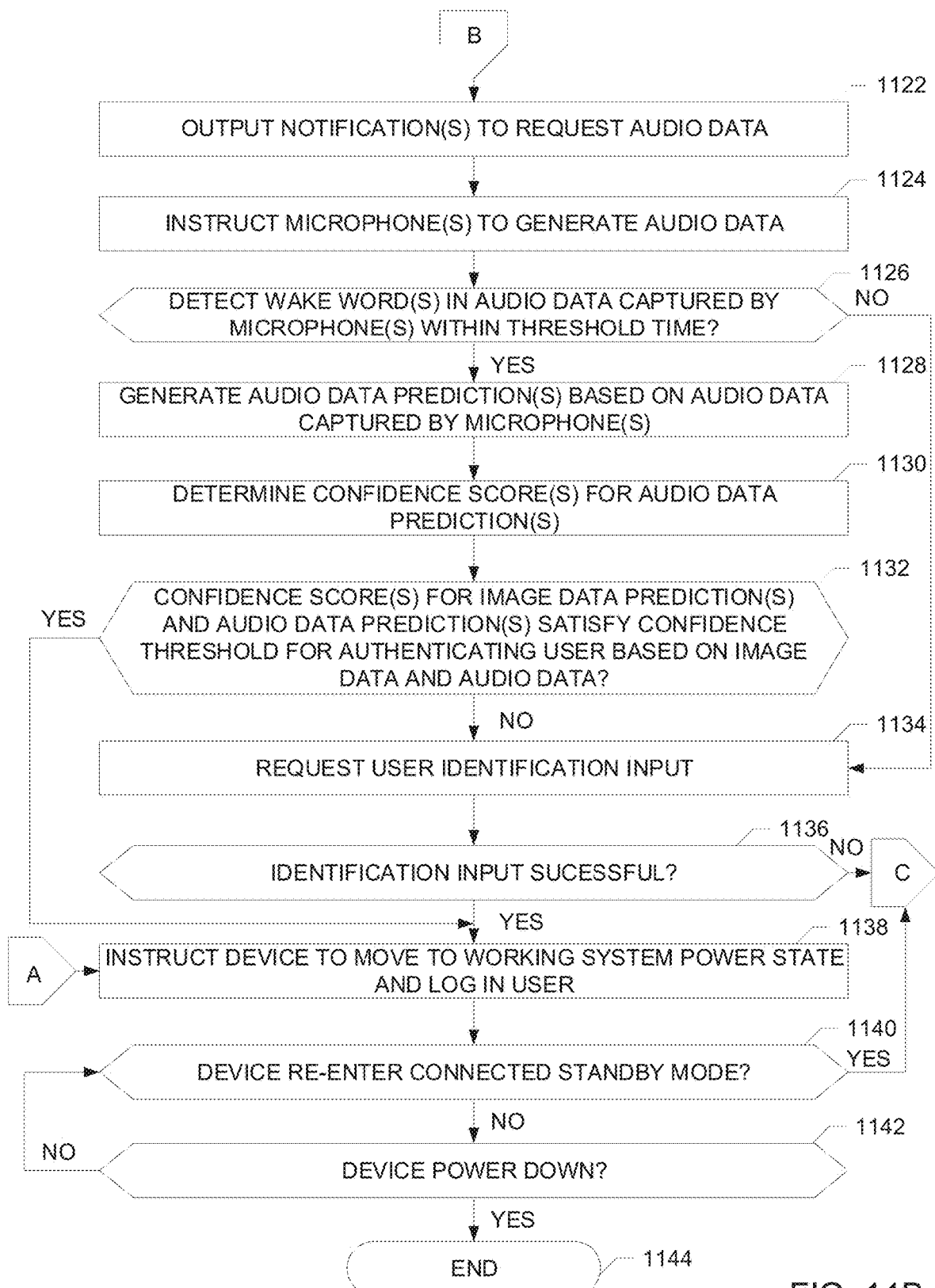

Flowcharts representative of example hardware logic, machine readable instructions, hardware implemented state machines, and/or any combination thereof for implementing the example authentication analyzer 128 of FIGS. 1 and/or 2 is shown in FIGS. 10A and 10B and/or FIGS. 11A and 11B. The machine readable instructions may be one or more executable programs or portion(s) of an executable program for execution by a computer processor such as the processor 128 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 128, but the entire program and/or parts thereof could alternatively be executed by a device other than the processor 128 and/or embodied in firmware or dedicated hardware. Further, although the example program is described with reference to the flowchart illustrated in FIGS. 10A and 10B and/or FIGS. 11A and 11B, many other methods of implementing the example authentication analyzer 128 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIGS. 10A and 10B are flowcharts of example machine readable instructions that, when executed, implement the example authentication analyzer 128 of FIGS. 1 and/or 2 to perform a first authentication process. The example instructions of FIGS. 10A and 10B can be executed by one or more processors of, for instance, the user device 102, 500, a second user device (e.g., the authentication device 124, the user device 119) and/or a cloud-based device (e.g., the cloud-based device(s) 126). The instructions of FIGS. 10A and 10B can be executed in substantially real-time as sensor data received by the authentication analyzer 128 or at some time after the sensor data is received by the authentication analyzer 128.

The example instructions of FIGS. 10A and 10B begin when the user device 102, 500 is in the connected standby mode (block 1000). In such examples, the user device 102, 500 is in a low-powered operational state with the primary display screen 104 turned off and execution of certain applications by the processor 108 suspended, but the user device 102 remains connected to the Internet to periodically update data such as emails.

In some examples, the user presence detection sensor(s) 110 generate sensor data 205 that is analyzed by the user presence detection analyzer 208 of the example authentication analyzer 128 of FIG. 2 to determine if a subject is proximate to the user device 102 (i.e., within a range of the user presence detection sensor(s)) in an environment in which the user is located (block 1002). If the user presence detection analyzer 208 does not detect a user within the range of the user presence detection sensor(s), the authentication analyzer 128 maintains the device in the connected standby mode.

In some examples, the user device 102 requests detection of an authentication device 124 to enable the user to access data stored on the device 102. In such examples, the communication interface(s) 111 of the user device 102, 500 generate device detection data 207 that is analyzed by the authentication device analyzer 209 of FIG. 2 to determine if a device detected via wired or wireless connection(s) is a trusted authentication device 124 based on the authentication device rule(s) 211 stored in the database 203 (block 1004). If an authentication device 124 associated with the user device 102 is not detected, the authentication analyzer 128 maintains the device 102 in the connected standby mode.

In examples of FIGS. 10A and 10B involving detection of user presence, if the user presence detection analyzer 208 detects the user proximate to the user device 102 attempts to authenticate the user to verify that the user is an authorized user of the device 102, 500. Also, in examples involving an authentication device 124, if the authentication device analyzer 209 detects the authentication device 124, the authentication analyzer 128 attempt to authenticate the user to verify that the user in possession of the authentication device is an authorized user of the device 102, 500.

The example instructions of FIGS. 10A and 10B authenticate the user using audio data generated by the microphone(s) 112 of the user device 102, 500 as the initial authentication mode (block 1006). The use of audio data over image data can be based on user settings defined at the user device 102, 500. In some examples, the sensor manager 202 of the authentication analyzer 128 activates the microphone(s) 112 in response to the detection of the user and/or the authentication device 124. In other examples, the microphone(s) 112 remain activated when the user device 102, 500 enters the connected standby mode (such that the microphone(s) are already activated when the user presence is detected or are already activated in cases when user presence detection analysis and/or authentication device detection analysis is not performed).

In the example of FIGS. 10A and 10B, the audio data analyzer 218 of the authentication analyzer 128 determines whether wake word(s) that indicate that the user wishes to interact with the device 102, 500 have been detected within a threshold period of time (block 1008). The audio data analyzer 218 executes the keyword model(s) 219 to determine if the wake word(s) have been detected within the threshold period of time. In examples that do not involve user presence detection, the detection of the wake word(s) can serve as a proxy for detection of user presence relative to the device 102.

If the audio data analyzer 218 of the authentication analyzer 128 does not detect the wake word(s) within the threshold period of time, the communicator 236 of the authentication analyzer 128 instructs the component(s) of the user device 102, 500 (e.g., the microphone(s) 112) to return to the low power state.

If the audio data analyzer 218 detects the wake word(s) within the threshold period of time, the audio data analyzer 218 executes the voice model(s) 220 to generate audio data prediction(s), or prediction(s) as to whether the voice detected in the audio data is the voice of an authorized user of the device 102, 500 based on voice recognition (block 1010). The audio data analyzer 218 determines confidence score(s) for the audio data prediction(s), which represent a degree to which the voice identified in the audio data by the audio data analyzer 218 matches the voice of an authorized user of the user device 102, 500 (block 1012).

In the example of FIGS. 10A and 10B, the confidence analyzer 232 of the authentication analyzer 128 analyzes the confidence score(s) for the audio data prediction(s) to determine if the user has been successfully identified as an authorized user based on the audio data alone or if supplemental authentication should be performed using, for instance, image data (block 1014). The confidence anlayzer 232 determines if the confidence score(s) for the audio data predication(s) satisfies a first confidence threshold for authenticating the user based on audio data alone.

If the confidence analyzer 232 determines that the confidence score(s) for the audio data prediction(s) satisfy the confidence threshold(s) for authenticating the user as an authorized user based on audio data alone, the communicator 236 instructs the device 102, 500 to move to the working system power state, or the fully powered state, and to log in the user to enable the user to access data stored on the device (block 1038).

If the confidence analyzer 232 determines that the confidence score(s) for the audio data prediction(s) do not satisfy the confidence threshold(s) for authenticating the user based on audio data alone, the authentication analyzer 128 attempts to perform supplemental authentication of the user using one or more other authentication mode(s). In the example of FIG. 2, if a trusted authentication device 124 is detected, the confidence analyzer 232 determines whether the confidence score(s) for the audio data prediction(s) satisfy a second confidence threshold for authenticating the user based on a combination of the confidence score(s) for the audio data prediction(s) and the detection of the authentication device 124 (block 1016). In some examples, the second confidence threshold for the audio data prediction(s) may be less than the first confidence threshold for authenticating the user based on audio data alone in view of the presence of the trusted authentication device.

If the confidence analyzer 232 determines that the confidence score(s) for the audio data prediction(s) satisfy the confidence threshold(s) for authenticating the user as an authorized user in connection with the presence of the authentication device 124, the communicator 236 instructs the device 102, 500 to move to the working system power state, or the fully powered state, and to log in the user to enable the user to access data stored on the device (block 1038).

If the confidence analyzer 232 is unable to authenticate the user based on the audio data alone or the audio data and the authentication device 124 (e.g., because the authentication device 124 is not present and/or because of the confidence score(s) of the audio data prediction(s)), the confidence analyzer 232 determines whether image data should be used as a supplemental authentication mode in addition to the audio data. In the example of FIGS. 10A and 10B, the ambient light analyzer 210 analyzes ambient light data generated by the ambient light sensor(s) 120 of the user device 102, 500 (block 1018). The ambient light analyzer 210 determines if the user device 102, 500 is located in a low light (e.g., dark) environment or a bright (e.g., well lit) environment.

Based on the analysis of the ambient lighting conditions by the ambient light analyzer 210, the confidence analyzer 232 determines if image data should be used to supplement the audio data (block 1020). If the ambient light analyzer 210 determines that the user device 102 is located in a low light environment, the confidence analyzer 232 determines that the image data obtained in the low light environment may not be of sufficient quality to authenticate the user. In such examples, the communicator 236 instructs the camera(s) 116, 118 to remain in the low power state. Instead, the request generator 238 generates visual and/or audio request(s) for the user to provide manual identification input(s) such as a password or fingerprint (block 1034).

If the ambient light analyzer 210 determines that the user device 102 is located in a bright environment, the confidence analyzer 232 determines that image data should be used to supplement the authentication of the user based on audio data. In such examples, the sensor manager 202 determines whether to activate the user facing camera 116 and/or the world facing camera 118 (block 1022). In the example of FIGS. 10A and 10B, the sensor manager 202 determines which camera(s) to activated based on a form factor position of the user device 102, 500 as determined by the device position analyzer 221 of the authentication analyzer 128. For example, if the device position analyzer 221 determines that the device 102, 500 is in the closed position with the primary display screen 104 facing a keyboard of the device 102, 500, the sensor manager 202 determines that the world-facing camera 118 should be activated.

In some examples, the request generator 238 outputs a request for the user to position himself or herself in a field of view of the camera(s) 116, 118 (block 1024). The sensor manager 202 instructs the selected camera(s) to generate image data (block 1026).

The example image data analyzer 230 analyzes the image data generated by the camera(s) 116, 118 and generates image data prediction(s), or prediction(s) as to whether the feature(s) of the user identified in the image data are the feature(s) of an authorized user of the device 102, 500 based on image recognition (block 1028). The image data analyzer 230 determines confidence score(s) for the image data prediction(s) with respect to a degree to which feature(s) of the user identified in the image data 226, 228 match feature(s) of the authorized user (block 1030).

The confidence analyzer 232 analyzes the confidence score(s) for the audio data prediction(s) and the confidence score(s) for the image data prediction(s) to determine if a confidence threshold for authenticating the user based on audio data and image data is satisfied (block 1032). If the confidence analyzer 232 determines that the confidence threshold for authenticating the user based on audio data and image data is satisfied, the communicator 236 instructs the device 102, 500 to move to the working system power state, or the fully powered state, and to log in the user to enable the user to access data stored on the device (block 1038).

If the confidence analyzer 232 determines that the confidence threshold for authenticating the user based on audio data and image data is not satisfied, the request generator 238 generates visual and/or audio request(s) for the user to provide identification input(s) such as a password or fingerprint (block 1034).

The identification input analyzer 239 of the authentication analyzer 128 analyzes the identification input(s) received from the user to determine if the identification input(s) are correct based on the identification input rule(s) 241 (block 1036). If the identification input(s) provided by the user are not correct, the authentication analyzer 128 maintains the device 102, 500 in the connected standby mode and does not grant the user access to data stored on the device 102, 500 (block 1000).

When the user has been authenticated via the audio data, via a combination of the audio data with the authentication device 124 and/or with image data, or via the manual identification input(s), the communicator 236 instructs the user device 102, 500 to move to the working system power state and log in the user to enable the user to access data stored on the device 102, 500 (block 1038).

In the example of FIGS. 10A and 10B, if the user device 102, 500 re-enters the connected standby mode after, for instance, a period of inactivity of the user device 102, 500, control returns to block 1000 to monitor for the presence of a user proximate to the device 102, 500 (block 1040). The example instructions of FIGS. 10A and 10B end when the user device 102, 500 is powered off (blocks 1042, 1044).

FIGS. 11A and 11B are flowcharts of example machine readable instructions that, when executed, implement the example authentication analyzer 128 of FIGS. 1 and/or 2 using a second authentication process. The example instructions of FIGS. 11A and 11B can be executed by one or more processors of, for instance, the user device 102, 500, a second user device (e.g., the authentication device 124, the user device 119) and/or a cloud-based device (e.g., the cloud-based device(s) 126). The instructions of FIGS. 11A and 11B can be executed in substantially real-time as sensor data received by the authentication analyzer 128 or at some time after the sensor data is received by the authentication analyzer 128.

The example instructions of FIGS. 11A and 11B begin when the user device 102, 500 is in the connected standby power mode (block 1100). The user presence detection sensor(s) 110 generate sensor data 205 that is analyzed by the user presence detection analyzer 208 of the example authentication analyzer 128 of FIG. 2 to determine if a subject is proximate to the user device 102 (i.e., within a range of the user presence detection sensor(s)) in an environment in which the user is located (block 1102). If the user presence detection analyzer 208 does not detect a user within the range of the user presence detection sensor(s), the authentication analyzer 128 maintains the device in the connected standby mode.

In some examples, the user device 102 requires detection of an authentication device 124 to enable the user to access data stored on the device 102. In such examples, the communication interface(s) 111 of the user device 102, 500 generate device detection data 207 that is analyzed by the authentication device analyzer 209 of FIG. 2 to determine if a device detected via wired or wireless connection(s) is a trusted authentication device 124 based on the authentication device rule(s) 211 stored in the database 203 (block 1104). If an authentication device 124 associated with the user device 102 is not detected, the authentication analyzer 128 maintains the device 102 in the connected standby mode.

In the example of FIGS. 11A and 11B, if the user presence detection analyzer 208 detects the user proximate to the user device 102 attempts to authenticate the user to verify that the user is an authorized user of the device 102, 500. Also, in examples involving an authentication device 124, if the authentication device analyzer 209 detects the authentication device 124, the authentication analyzer 128 attempt to authenticate the user to verify that the user in possession of the authentication device is an authorized user of the device 102, 500.

The example instructions of FIGS. 11A and 11B authenticate the user using image data generated by the camera(s) 116, 118 of the user device 102, 500 as the initial authentication mode. The use of image data over audio data can be based on user settings defined at the user device 102, 500.

The sensor manager 202 determines whether to activate the user facing camera 116 and/or the world facing camera 118 (block 1106). In the example of FIGS. 11A and 11B, the sensor manager 202 determines which camera(s) 116, 118 to activate based on a form factor position of the user device 102, 500 as determined by the device position analyzer 221 of the authentication analyzer 128. For example, if the device position analyzer 221 determines that the device 102, 500 is in the closed position with the primary display screen 104 facing a keyboard of the device 102, 500, the sensor manager 202 determines that the world-facing camera 118 should be activated.

In some examples, the request generator 238 outputs request(s) for the user to position himself or herself in a field of view of the camera(s) 116, 118 (block 1108). The sensor manager 202 instructs the selected camera(s) 116, 118 to generate image data (block 1110).

The example image data analyzer 230 analyzes the image data generated by the camera(s) 116, 118 and generates image data prediction(s), or prediction(s) as to whether the feature(s) of the user identified in the image data are the feature(s) of an authorized user of the device 102, 500 based on image recognition (block 1112). The image data analyzer 230 determines confidence score(s) for the image data prediction(s) with respect to a degree to which feature(s) of the user identified in the image data 226, 228 match feature(s) of the authorized user (block 1114).

In the example of FIGS. 11A and 11B, the confidence analyzer 232 of the authentication analyzer 128 analyzes the confidence score(s) for the image data prediction(s) to determine if the user has been successfully identified as an authorized user based on the image data alone or if supplemental authentication should be performed using, for instance, audio data (block 1116). The confidence anlayzer 232 determines if the confidence score(s) for the image data predication(s) satisfies a first confidence threshold for authenticating the user based on image data alone.

If the confidence analyzer 232 determines that the confidence score(s) for the image data prediction(s) satisfy the confidence threshold(s) for authenticating the user as an authorized user based on image data alone, the communicator 236 instructs the device 102, 500 to move to the working system power state and to log in the user to enable the user to access data stored on the device (block 1138).

If the confidence analyzer 232 determines that the confidence score(s) for the image data prediction(s) do not satisfy the confidence threshold(s) for authenticating the user based on image data alone, the authentication analyzer 128 attempts to perform supplemental authentication of the user using one or more other authentication mode(s). In the example of FIG. 2, if a trusted authentication device 124 is detected, the confidence analyzer 232 determines whether the confidence score(s) for the image data prediction(s) satisfy a second confidence threshold for authenticating the user based on a combination of the confidence score(s) for the image data prediction(s) and the detection of the authentication device 124 (block 1118). In some examples, the second confidence threshold for the image data prediction(s) may be less than the first confidence threshold for authenticating the user based on image data alone in view of the presence of the trusted authentication device.

If the confidence analyzer 232 is unable to authenticate the user based on the audio data alone or the audio data and the authentication device 124 (e.g., because the authentication device 124 is not present and/or because of the confidence score(s) of the audio data prediction(s)), the authentication analyzer 128 attempts to authenticate the user based on audio data (block 1120). In some examples, the sensor manager 202 of the authentication analyzer 128 activates the microphone(s) 112 in response to the determination that audio data should be used to supplement the authentication via image data. In other examples, the microphone(s) 112 remain activated when the user device 102, 500 enters the connected standby mode.

The request generator 238 outputs visual and/or audio request(s) for the user to provide an audio input (i.e., the wake word(s)) (block 1122). The sensor manager 202 instructs the microphones(s) 112 to generate audio data (block 1124). The audio data analyzer 218 executes the keyword model(s) 219 to identify the wake word(s) for controlling the device 102, 500 (block 1126). If the audio data analyzer does not detect the wake word(s) within the threshold period of time, the request generator 238 generates visual and/or audio request(s) for the user to provide identification input(s) such as a password or fingerprint (block 1134).

If the audio data analyzer 218 detects the wake word(s) within the threshold period of time, the audio data analyzer 218 executes the voice model(s) 220 to generate audio data prediction(s), or prediction(s) as to whether the voice detected in the audio data is the voice of an authorized user of the device 102, 500 based on voice recognition (block 1128). The audio data analyzer 218 determines confidence score(s) for the audio data prediction(s) (block 1130).

The confidence analyzer 232 analyzes the confidence score(s) for the image data prediction(s) and the confidence score(s) for the audio data prediction(s) to determine if a confidence threshold for authenticating the user based on image data and audio data is satisfied (block 1132). If the confidence analyzer 232 determines that the confidence threshold for authenticating the user based on image data and audio data is satisfied, the communicator 236 instructs the device 102, 500 to move to the working system power state and to log in the user to enable the user to access data stored on the device (block 1138).

If the confidence analyzer 232 determines that the confidence threshold for authenticating the user based on image data and audio data is not satisfied, the request generator 238 generates visual and/or audio request(s) for the user to provide identification input(s) such as a password or fingerprint (block 1134).

The identification input analyzer 239 of the authentication analyzer 128 analyzes the identification input(s) received from the user to determine if the identification input(s) are correct based on the identification input rule(s) 241 (block 1136). If the identification input(s) provided by the user are not correct, the authentication analyzer 128 maintains the device 102, 500 in the connected standby mode and does not grant the user access to data stored on the device 102, 500 (block 1100).

When the user has been authenticated via the image data, a combination of the image data with the authentication device and/or audio data, or via the manual identification input(s), the communicator 236 instructs the user device 102, 500 to move to the working system power state and log in the user to enable the user to access data stored on the device 102, 500 (block 1138).

In the example of FIGS. 11A and 11B, if the user device 102, 500 re-enters the connected standby mode after, for instance, a period of inactivity of the user device 102, 500, control returns to block 1000 to monitor for the presence of a user proximate to the device 102, 500 (block 1140). The example instructions of FIGS. 11A and 11B end when the user device 102, 500 is powered off (blocks 1142, 1144).

Figure 12:
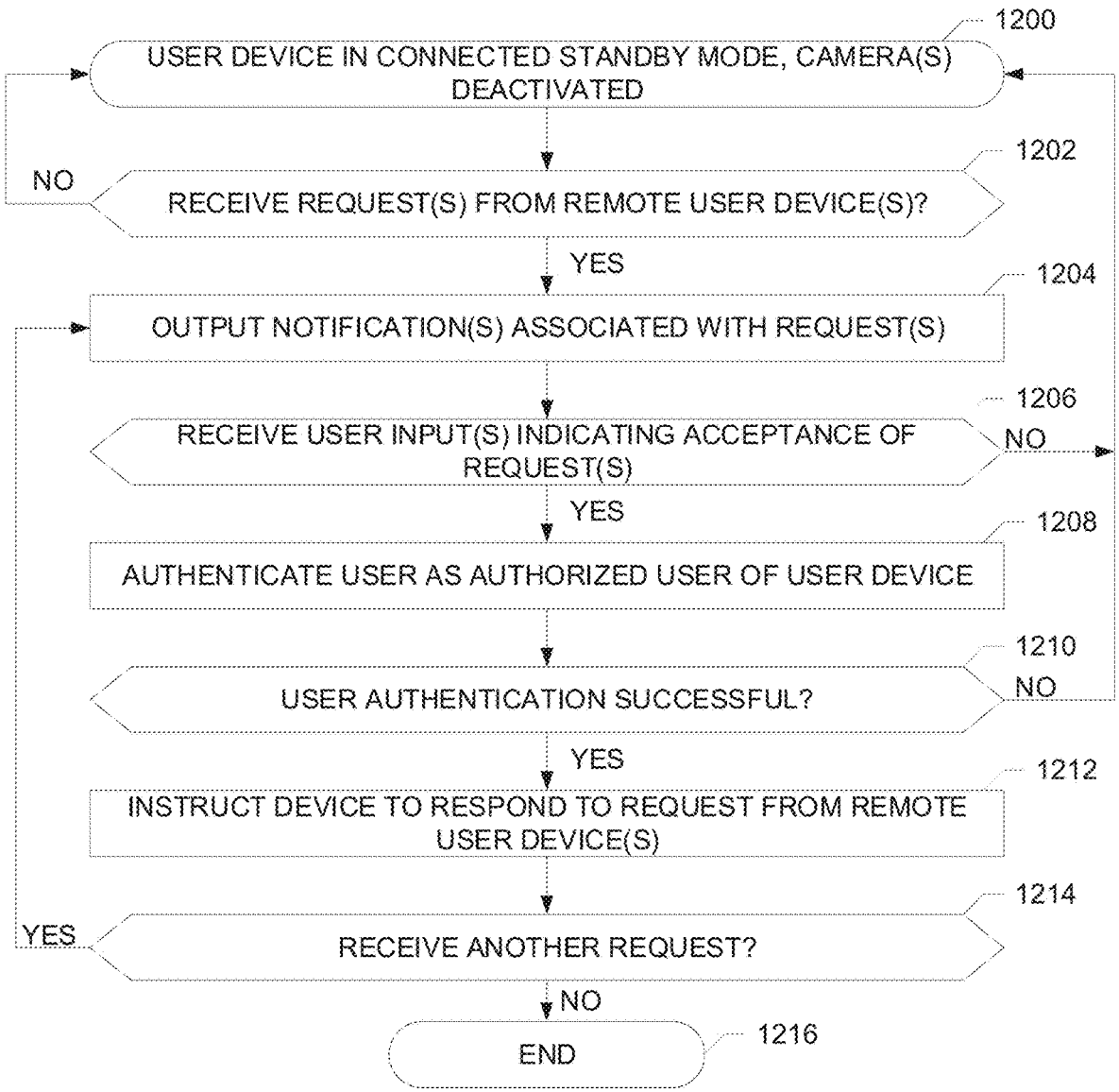
FIG. 12 is a flowchart representative of example machine readable instructions that may be executed to implement the example push notification controller of FIGS. 1 and/or 4 to enable a user device to respond to a request from a remote device.

A flowchart representative of example hardware logic, machine readable instructions, hardware implemented state machines, and/or any combination thereof for implementing the example push notification controller 113 of FIGS. 1 and/or 4 is shown in FIG. 12. The machine readable instructions may be one or more executable programs or portion(s) of an executable program for execution by a computer processor such as the processor 113 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 113, but the entire program and/or parts thereof could alternatively be executed by a device other than the processor 113 and/or embodied in firmware or dedicated hardware. Further, although the example program is described with reference to the flowchart illustrated in FIG. 12, many other methods of implementing the example push notification controller 113 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIG. 12 is flowchart of example machine readable instructions that, when executed, implement the example push notification controller 113 of FIGS. 1 and/or 2. The example instructions of FIG. 12 can be executed by one or more processors of, for instance, the user device 102, 500, a second user device (e.g., the authentication device 124, the user device 119) and/or a cloud-based device (e.g., the cloud-based device(s) 126). The instructions of FIG. 12 can be executed in substantially real-time as requests from other user device(s) are received by the push notification controller 113 or at some time after the request(s) are received by the push notification controller 113.

The example instructions of FIG. 12 begin when the user device 102, 500 is in the connected standby power mode (block 1200). The request receiver 400 of the example push notification controller 113 detects request(s) from remote user device(s) 119, such as requests to share screen(s) or transfer file(s) between the user device 102, 500 and the remote user device(s) 119 (block 1202). In response to the request(s), the notification generator 401 of the generates visual, audio, and/or haptic notification(s) to alert a user as to the incoming request(s) (block 1204).

The user input analyzer 402 of the push notification controller 113 of FIG. 4 determines if input(s) have been received from a user indicating that the request(s) from the remote device(s) have been accepted by the user (block 1206). If the user input analyzer 402 does not detect the user input(s) indicating acceptance of the request(s), the communicator 404 of the push notification controller 113 instructs the device 102, 500 to not take any action in response to the request(s).

If the user input analyzer 402 determines that the user has accepted the request(s) from the remote user device(s) 119, the authentication analyzer 128 of FIGS. 1-4 determines if the user who accepted the request(s) is an authorized user of the device 102, 500 (block 1208). The authentication analyzer 128 can authenticate the user using audio data, image data, and/or manual identification input(s) substantially as described at blocks 1004-1036 of FIGS. 10A and 10B and/or blocks 1004-1136 of FIGS. 10A and 10B.

In the example of FIG. 12, if the user authentication process is not successful because, for example, the authentication analyzer 128 was unable to authenticate the user as an authorized user based on audio data, image data, and/or the manual identification input(s), the communicator 404 instructs the device 102, 500 to not take any action in response to the request(s) (block 1210).

If the authentication analyzer 128 was able to successfully identify the user who accepted the request(s) as an authorized user of the device 102, 500, the request responder 406 generates instruction(s) that causes the user device 102, 500 to take one or more actions to respond to the request(s) (block 1212). The request responder 406 generates the instruction(s) based on request response rule(s) 408. The request responder 406 can instruct the primary display controller 103 to display content received from the remote user device(s) 119 via the primary display screen 104. The request responder 406 can instruct the audio controller 115 to output audio content via the speaker(s) 114 in response to the acceptance of an Internet-based phone call. In some examples, the request responder 406 instructs the device 102, 500 to move to the working system power state based on the actions to be performed in response to the request(s) (e.g., downloading a file). In other examples, the request responder 406 instructs the device 102, 500 to remain in the connected standby state to perform the request.

The example instructions of FIG. 12 end when no further requests are received from remote user device(s) (blocks 1214, 1216).

The machine readable instructions described herein in connection with FIGS. 9, 10A, 10B, 11A, 11B and/or FIG. 12 may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9, 10, 11, and/or 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 13:
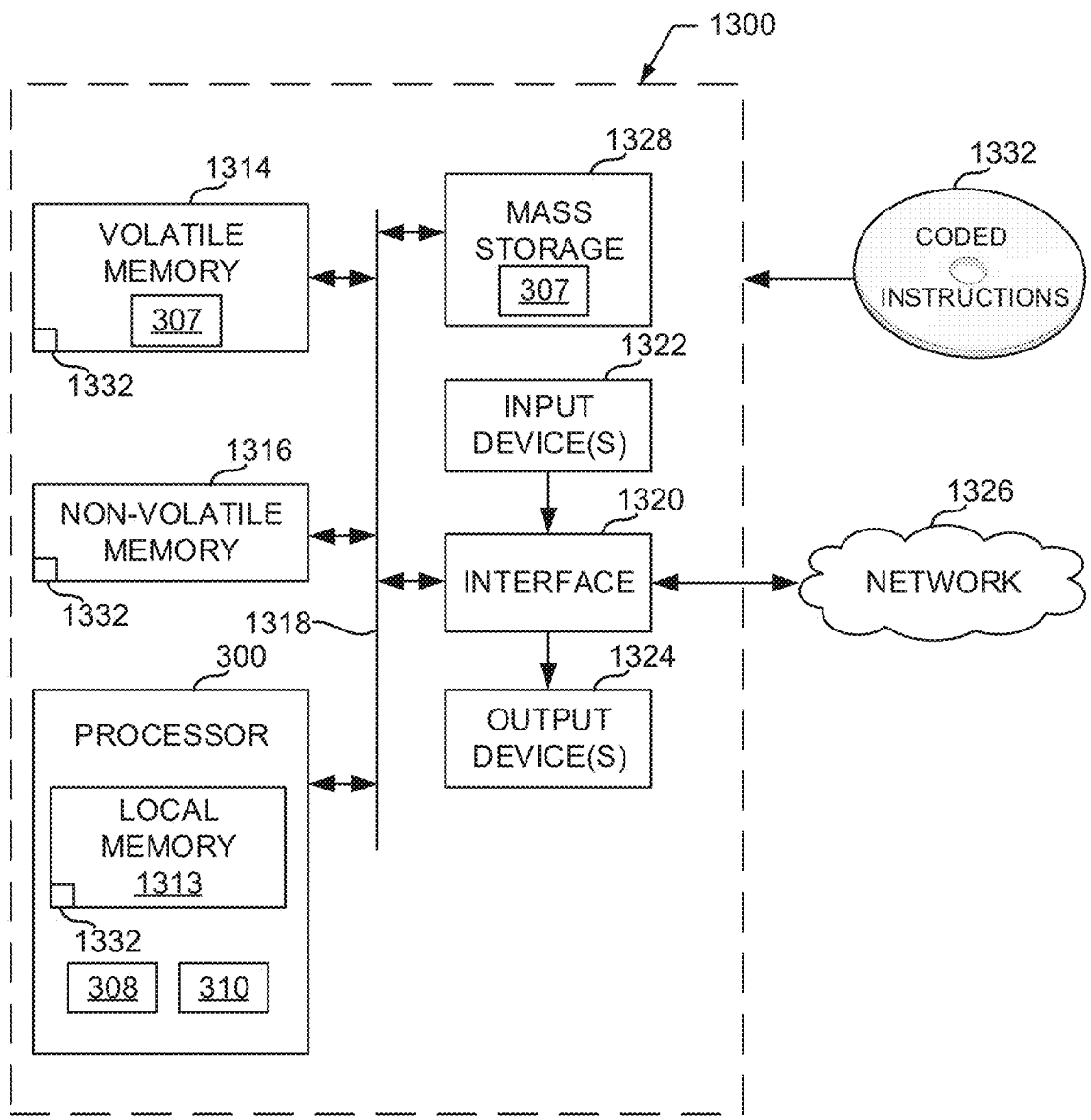
FIG. 13 is a block diagram of an example processor platform structured to execute the instructions of FIG. 9 to implement the example training manager of FIG. 3.

FIG. 13 is a block diagram of an example processor platform 1300 structured to execute the instructions of FIG. 9 to implement the example training manager 300 of FIG. 3. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1300 of the illustrated example includes a processor 300. The processor 300 of the illustrated example is hardware. For example, the processor 300 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example trainer 308 and the example machine learning engine 310.

The processor 300 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 9 may be stored in the mass storage device 1328, in the volatile memory 1314, in the non-volatile memory 1316, and/or on a removable non-transitory computer readable storage medium such as a CD or DVD.

Figure 14:
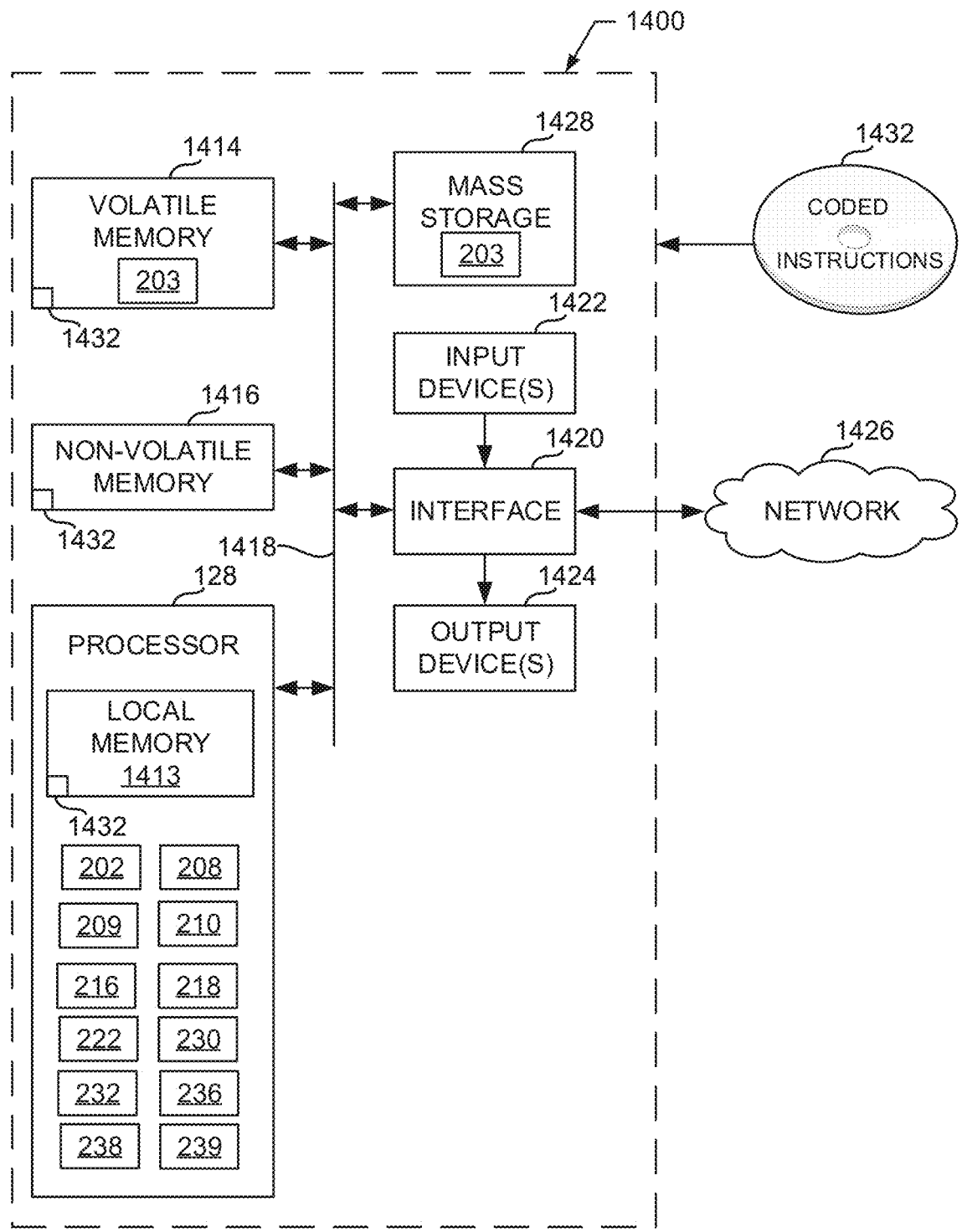
FIG. 14 is a block diagram of an example processor platform structured to execute the instructions of FIGS. 10A and 10B and/or FIGS. 11A and 11B to implement the example authentication analyzer of FIGS. 1 and/or 2.

FIG. 14 is a block diagram of an example processor platform 1400 structured to execute the instructions of FIGS. 10A and 10B and/or FIGS. 11A and 11B to implement the example authentication analyzer 128 of FIGS. 1 and/or 2. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1400 of the illustrated example includes a processor 128. The processor 128 of the illustrated example is hardware. For example, the processor 128 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor manager 202, the example database 203, the example user presence detection analyzer 208, the example authentication device analyzer 209, the example ambient light analyzer 210, the examiner device position analyzer 216, the example audio data analyzer 218, the example timer 222, the example image data analyzer 230, the example confidence analyzer 232, the example communicator 236, the example request generator 238, and the example identification input analyzer 239.

The processor 128 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIG. 14 may be stored in the mass storage device 1428, in the volatile memory 1414, in the non-volatile memory 1416, and/or on a removable non-transitory computer readable storage medium such as a CD or DVD.

Figure 15:
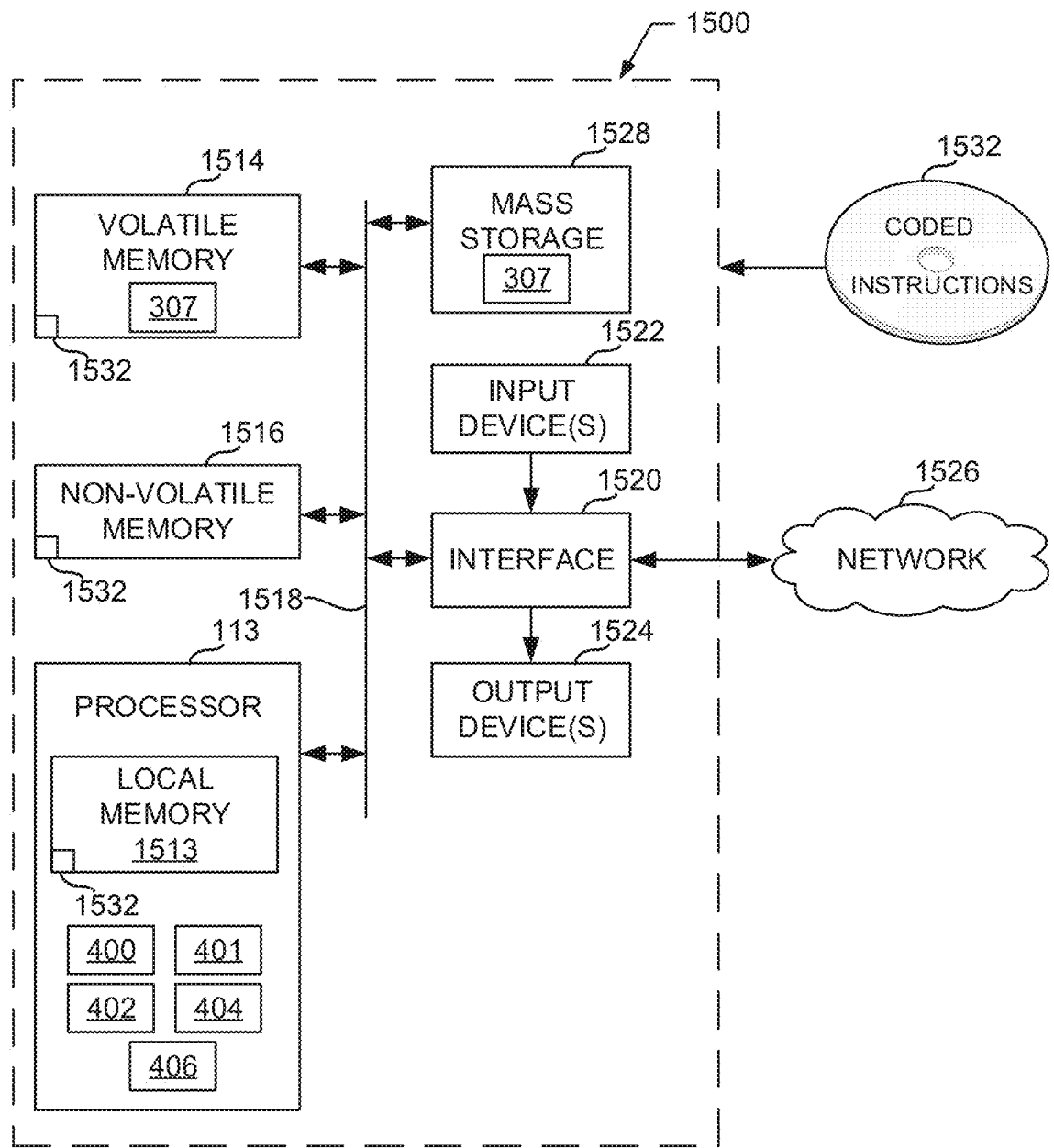
FIG. 15 is block diagram of an example processor platform structured to execute the instructions of FIG. 12 to implement the example push notification controller of FIGS. 1 and/or 4.

FIG. 15 is a block diagram of an example processor platform 1500 structured to execute the instructions of FIG. 12 to implement the example push notification controller 113 of FIGS. 1 and/or 4. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1500 of the illustrated example includes a processor 113. The processor 113 of the illustrated example is hardware. For example, the processor 113 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example request receiver 400, the example notification generator 401, the example user input analyzer 402, the example communicator 404, and the example request responder 405.

The processor 113 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIG. 15 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed that provide for multi-modal authentication of a user attempting to interact with an electronic user device (e.g., a laptop, a tablet). Examples disclosed herein perform an initial authentication of the user using one of audio data and voice recognition analysis or using image data and image recognition analysis to determine whether the user is an authorized user of the device. Based on a confidence analysis with respect to the authentication of the user as an authorized user of the device using the initial authentication mode, example disclosed herein determine whether supplemental authentication mode(s) (e.g., the other of the audio data or the image data not used as the initial authentication mode) to increase a confidence with which the determination of the user as an authorized user of the device is reached. Examples disclosed herein perform authentication of the user while the device is in a low power, connected standby mode and selectively activate component(s) of the device, such as camera(s), as needed to perform the authentication of the user. Examples disclosed herein transition the device to the fully powered state when the user is confirmed as an authorized user, thereby conserving power consumption until authentication is successful.

Some examples disclosed herein provide for communication between the user device and remote device(s) while the user is in the connected standby mode. When a push notification is received from a remote device and accepted by a user, examples disclosed herein authenticate the user as an authorized user and, in some examples, respond to the notification while the device remains in the connected standby mode. Thus, examples disclosed herein provide for optimized power consumption of the device when in the device is in the low power state.

Example methods, apparatus, systems, and articles of manufacture to implement multi-modal user device authentication are disclosed herein. Further examples and combinations thereof include the following:

Example 1 includes an electronic device including a first sensor; a microphone; a first camera; a user presence detection analyzer to analyze first sensor data generated by the first sensor to detect a presence of a subject proximate to the electronic device; an audio data analyzer to analyze audio data generated by the microphone to detect a voice of an authorized user of the electronic device in the audio data; an image data analyzer to analyze image data generated by the first camera to detect a feature of the authorized user in the image data; and a confidence analyzer to authenticate the subject as the authorized user in response to the user presence detection analyzer detecting the presence of the subject and one or more of (a) the audio data analyzer detecting the voice of the authorized user or (b) the image data analyzer detecting the feature of the authorized user; and a processor to cause the electronic device to move from a first power state to a second power state in response to the confidence analyzer authenticating the subject as the authorized user, the electronic device to consume a greater amount of power in the second power state than the first power state.

Example 2 includes the electronic device as defined in example 1, further including an ambient light sensor and an ambient light analyzer to analyze third sensor data generated by the ambient light sensor to determine a lighting condition of an environment including the electronic device. The confidence analyzer is to authenticate the subject based on the audio data analyzer detecting the voice of the authorized user and the image data analyzer detecting the feature of the authorized user in response to the lighting condition.

Example 3 includes the electronic device as defined in example 2, further including a request generator to output a voice request for the subject in response to the lighting condition.

Example 4 includes the electronic device as defined in example 1, further including a sensor manager to activate the first camera in response to the user presence detection analyzer detecting the presence of the subject.

Example 5 includes the electronic device as defined in example 1, further including a second camera, the first camera carried by a base of the electronic device and the second camera carried by a lid of the electronic device; a device position analyzer to detect a position of the lid; and a sensor manager to activate the first camera in response to the detection of the position of the lid.

Example 6 includes the electronic device as defined in example 1, further including a push notification controller to receive a request from a second electronic device, the confidence analyzer to authenticate the subject in response to a user input indicating acceptance of the request.

Example 7 includes the electronic device as defined in example 1, wherein the audio data analyzer is to detect a wake word in the audio data.

Example 8 includes the electronic device as defined in examples 1 or 7, wherein the audio data analyzer is to generate a prediction in response to the detection of the voice in the audio data and assign a confidence score to the prediction, the confidence analyzer to compare the confidence score to a threshold to authenticate the subject.

Example 9 includes the electronic device as defined in example 1, further including an authentication device analyzer to detect a presence of an authentication device, the processor to authenticate the subject as the authorized user in response to the user presence detection analyzer detecting the presence of the subject, the detection of the presence of the authentication device, and one of (a) the audio data analyzer detecting the voice of the authorized user or (b) the image data analyzer detecting the feature of the authorized user.

Example 10 includes the electronic device as defined in examples 1 or 4, wherein the feature includes a facial feature of the subject.

Example 11 includes a non-transitory computer readable medium including instructions that, when executed, cause a computing device to at least detect a presence of a user proximate to the computing device based on first sensor data generated by a first sensor of the computing device; instruct a camera to generate image data in response to detection of the user; generate a first prediction of a match between the user and an authorized user of the computing device based on the image data; generate audio data via a microphone in response to detection of an audio input; generate a second prediction of a match between a voice of the user and a voice of the authorized user based on the audio data; and authenticate the user as the authorized user based on the first prediction and the second prediction.

Example 12 includes the non-transitory computer readable medium as defined in example 11, wherein the instructions, when executed, further cause the computing device to assign a first confidence score to the first prediction; and perform a first comparison of the first confidence score to a threshold for authentication the user based on the image data.

Example 13 includes the non-transitory computer readable medium as defined in example 12, wherein the instructions, when executed, further cause the computing device to assign a second confidence score to the second prediction; perform a second comparison of the second confidence score to a threshold for authentication the user based on the audio data; and authenticate the user as the authorized user based on the first comparison and the second comparison.

Example 14 includes the non-transitory computer readable medium as defined in example 11, wherein the instructions, when executed, further cause the computing device to output a notification in response to receipt of a request from a second computing device; instruct the camera to generate image data in response to detection of a user input indicating acceptance of the request; and instruct the computing device to perform an action in response to the authentication of the user as the authorized user.

Example 15 includes the non-transitory computer readable medium as defined in example 14, wherein the action includes causing a display controller to move from a first power state to a second power state to display content on a display screen of the computing device.

Example 16 includes the non-transitory computer readable medium as defined in examples 11 or 12, wherein the camera includes a first camera and a second camera and the instructions, when executed, further cause the computing device to detect a position of a lid of the computing device based on second sensor data generated by a second sensor of the computing device; and instruct one of the first camera or the second camera to generate the image data in response to the detection of the position of the lid.

Example 17 includes the non-transitory computer readable medium as defined in example 11, wherein the instructions, when executed, further cause the computing device to detect an ambient lighting condition in an environment including the computing device; and instruct the camera to generate the image data in response to the detection of the ambient lighting condition.

Example 18 includes the non-transitory computer readable medium as defined in example 11, wherein the instructions, when executed, further cause the computing device to output a notification to request the audio input, the notification to be displayed via a display screen of the computing device.

Example 19 includes a computing device comprising a camera to generate image data; a microphone to generate audio data in response to detection of an audio input; and at least one processor to control a power state of the computing device based on image data generated by the camera and audio data generated by the microphone.

Example 20 includes the computing device as defined in example 19, wherein the power state includes a connected standby state and a working power state.

Example 21 includes the computing device as defined in example 20, further including a display controller, the at least one processor to instruct the display controller to cause content to be displayed via a display screen of the computing device based on the image data and the audio data.

Example 22 includes the computing device as defined in example 21, wherein the at least one processor is to maintain the computing device in the connected standby state when the content is displayed via the display screen.

Example 23 includes the computing device as defined in example 19, wherein the at least one processor is to detect a feature of an authorized user of the computing device in the image data.

Example 24 includes the computing device as defined in example 23, wherein the at least one processor is to detect a voice of the authorized user in the audio data.

Example 25 includes the computing device as defined in examples 19 or 23, wherein the camera is to generate the image data in response to at least one of (a) detection of a presence of a user proximate to the computing device or (b) receipt of a request from a second computing device.

Example 26 includes a method including detecting, by executing an instruction with at least one processor, a presence of a user proximate to a computing device based on first sensor data generated by a first sensor of the computing device; instructing, by executing an instruction with the at least one processor, a camera to generate image data in response to detection of the user; generating, by executing an instruction with the at least one processor, a first prediction of a match between the user and an authorized user of the computing device based on the image data; generating, by executing an instruction with the at least one processor, audio data via a microphone in response to detection of an audio input; generating, by executing an instruction with the at least one processor, a second prediction of a match between a voice of the user and a voice of the authorized user based on the audio data; and authenticating, by executing an instruction with the least one processor, the user as the authorized user based on the first prediction and the second prediction.

Example 27 includes the method as defined in example 26, further including assigning a first confidence score to the first prediction and performing a first comparison of the first confidence score to a threshold for authentication the user based on the image data.

Example 28 includes the method as defined in example 27, further including assigning a second confidence score to the second prediction; performing a second comparison of the second confidence score to a threshold for authentication the user based on the audio data; and authenticating the user as the authorized user based on the first comparison and the second comparison.

Example 29 includes the method as defined in example 26, further including outputting a notification in response to receipt of a request from a second computing device instructing a camera to generate image data in response to detection of a user input indicating acceptance of the request; and instructing the computing device to perform an action in response to the authentication of the user as the authorized user.

Example 30 includes the method as defined in example 29, wherein the action includes causing a display controller to move from a first power state to a second power state to display content on a display screen of the computing device.

Example 31 includes the method as defined in example 26, wherein the camera includes a first camera and a second camera and further including detecting a position of a lid of computing device based on second sensor data generated by a second sensor of the computing device and instructing one of the first camera or the second camera to generate the image data in response to the detection of the position of the lid.

Example 32 includes the method as defined in example 26, further including detecting an ambient lighting condition in an environment including the computing device and instructing the camera to generate the image data in response to the detection of the ambient lighting condition.

Example 33 includes the method as defined in example 26, further including causing the computing device to output a notification to request the audio input, the notification to be displayed via a display screen of the computing device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An electronic device comprising:
   a first sensor;
   a microphone;
   a first camera;
   an ambient light sensor;
   computer-readable instructions; and
   processor circuitry to execute the computer-readable instructions to:
      analyze first sensor data generated by the first sensor to detect a presence of a subject proximate to the electronic device;
      analyze audio data generated by the microphone to detect a voice of an authorized user of the electronic device in the audio data;
      authenticate the subject as the authorized user if (a) the presence of the subject is detected and (b) the voice of the authorized user is detected with a confidence level that satisfies a first confidence threshold for audio data authentication;
      analyze image data generated by the first camera to detect a feature of the authorized user in the image data if the voice of the authorized user fails to satisfy the first confidence threshold;
      analyze third sensor data generated by the ambient light sensor to determine a lighting condition of an environment including the electronic device;
      determine that a confidence level associated with the detection of the feature in the image data satisfies a second confidence threshold for image data authentication based on the lighting condition;
      authenticate the subject as the authorized user if (a) the presence of the subject is detected, (b) the voice of the authorized user is detected with the confidence level that satisfies a third confidence threshold for audio data authentication, the third confidence threshold different than the first confidence threshold, and (c) the feature of the authorized user is detected in the image data with the confidence level that satisfies the second confidence threshold for image data authentication based on the lighting condition;
      cause the electronic device to move from a first power state to a second power state in response to authentication of the subject as the authorized user, the electronic device to consume a greater amount of power in the second power state than the first power state; and maintain the first power state in response to the confidence level failing to satisfy the first confidence threshold and failing to satisfy the second confidence threshold.

2. The electronic device as defined in claim 1, wherein the processor circuitry is to activate the first camera in response to the detection of the presence of the subject.

3. The electronic device as defined in claim 1, further including push notification controller circuitry to receive a request from a second electronic device, the processor circuitry to authenticate the subject in response to a user input indicating acceptance of the request.

4. The electronic device as defined in claim 1, wherein the processor circuitry is to:

detect a presence of an authentication device; and authenticate the subject as the authorized user in response to the detection of the presence of the authentication device.

5. The electronic device as defined in claim 1, wherein the feature includes a facial feature of the subject.

6. A non-transitory computer readable medium comprising instructions that cause a compute device to at least:

detect a presence of a user proximate to the compute device based on first sensor data generated by a first sensor of the compute device;

instruct a camera to generate image data in response to detection of the user;

detect an ambient lighting condition in an environment including the compute device;

generate a first prediction of a match between the user and an authorized user of the compute device based on the image data;

assign a first confidence score to the first prediction based on the ambient lighting condition;

authenticate the user as the authorized user based on the detection of the presence of the user and based on satisfaction of a first confidence threshold for image data authentication by the first confidence score;

cause a microphone to be activated to generate audio data in response to detection of an audio input if the first confidence score for the first prediction does not satisfy the first confidence threshold;

generate a second prediction of a match between a voice of the user and a voice of the authorized user based on the audio data;

assign a second confidence score to the second prediction;

authenticate the user as the authorized user based on the detection of the presence of the user and if (a) the second confidence score for the second prediction satisfies a confidence threshold for audio data authentication and (b) the first confidence score for the first prediction satisfies a second confidence threshold for image data authentication, the second confidence threshold different than the first confidence threshold; and refrain from authenticating the user as the authorized user in response to (a) the first confidence score for the first prediction failing the satisfy the first confidence threshold, (b) the first confidence score for the first prediction failing to satisfy the second confidence threshold, or (c) the second confidence score for the second prediction failing to satisfy the confidence threshold for the audio data authentication.

7. The non-transitory computer readable medium as defined in claim 6, wherein the instructions cause the compute device to:

detect receipt of a request from a second compute device;

detect a user input indicating acceptance of the request;

instruct the camera to generate the image data in response to the user input; and instruct the compute device to perform an action in response to the authentication of the user as the authorized user.

8. The non-transitory computer readable medium as defined in claim 7, wherein the action includes causing display controller circuitry to move from a first power state to a second power state to display content on a display screen of the compute device.

9. The non-transitory computer readable medium as defined in claim 6, wherein the instructions cause the compute device to instruct the camera to generate the image data in response to the detection of the ambient lighting condition.

10. A compute device comprising:

a camera to generate image data;

a microphone to generate audio data in response to detection of an audio input;

an ambient light sensor to generate sensor data indicative of a lighting condition of an environment including the compute device;

memory;

machine-readable instructions; and processor circuitry to execute the machine-readable instructions to:

assign a first confidence score to the image data based on the lighting condition;

assign a second confidence score to the audio data;

perform a first comparison of the first confidence score to a first confidence threshold and a second comparison of the second confidence score to a second confidence threshold;

adjust a power state of the compute device in response to the first confidence score satisfying the first confidence threshold or the second confidence score satisfying the second confidence threshold;

in response to the first confidence score not satisfying the first confidence threshold and the second confidence score not satisfying the second confidence threshold, adjust the power state of the compute device in response to (a) the first confidence score satisfying a third confidence threshold, the third confidence threshold different than the first confidence threshold and (b) the second confidence score satisfying a fourth confidence threshold, the fourth confidence threshold different than the second confidence threshold; and maintain the power state of the compute device in response to one or more of the first confidence score not satisfying the first confidence threshold or the third confidence threshold or the second confidence score not satisfying the second confidence threshold or the fourth confidence threshold.

11. The compute device as defined in claim 10, wherein the power state is a connected standby state and the adjusted power state is a working power state.

12. The compute device as defined in claim 11, further including display controller circuitry, the processor circuitry to instruct the display controller circuitry to cause content to be displayed via a display screen of the compute device.

13. The compute device as defined in claim 12, wherein the processor circuitry is to cause the display controller circuitry to cause the content to be displayed via the display screen when the compute device is the connected standby state.

14. The compute device as defined in claim 10, wherein the processor circuitry is to detect a feature of an authorized user of the compute device in the image data.

15. The compute device as defined in claim 14, wherein the processor circuitry is to detect a voice of the authorized user in the audio data.

16. The compute device as defined in claim 10, wherein the processor circuitry is to cause the camera to generate the image data in response to at least one of (a) detection of a presence of a user proximate to the compute device or (b) receipt of a request from a second compute device.

17. An electronic device comprising:
a first sensor;
a microphone;
a first camera;
an ambient light sensor;
memory;
machine readable instructions; and
processor circuitry to execute the machine readable instructions to:
  detect a presence of a subject proximate to the electronic device based on an output by the first sensor;
  detect a voice of an authorized user of the electronic device in audio data, the audio data generated by the microphone;
  authenticate the subject as the authorized user in response to (a) the detection of the presence of the subject and (b) detection of the voice of the authorized user with a confidence level satisfying a first confidence threshold for audio data authentication;
  detect a feature of the authorized user in image data generated by the first camera if the confidence level does not satisfy the first confidence threshold;
  determine a lighting condition of an environment including the electronic device based on an output by the ambient light sensor;
  determine that a confidence level associated with the detection of the feature in the image data satisfies a second confidence threshold for image data authentication based on the lighting condition;
  authenticate the subject as the authorized user in response to (a) the detection of the presence of the subject, (b) detection of the voice of the authorized user with the confidence level satisfying a third confidence threshold for audio data authentication, the third confidence threshold different than the first confidence threshold, and (c) detection of the feature of the authorized user in the image data with the confidence level satisfying the second confidence threshold for image data authentication based on the lighting condition;
  cause the electronic device to move from a first power state to a second power state in response to the authentication of the subject as the authorized user, the electronic device to consume a greater amount of power in the second power state than the first power state; and
  make no change in the first power state in response to the confidence level failing to satisfy the first confidence threshold and failing to satisfy the second confidence threshold.

18. The electronic device as defined in claim 17, wherein the processor circuitry is to activate the first camera in response to the detection of the presence of the subject.

19. The electronic device as defined in claim 17, wherein the processor circuitry is to:
detect a request from a second electronic device; and
authenticate the subject in response to a user input indicating acceptance of the request.

20. The electronic device as defined in claim 17, wherein the processor circuitry is to:
detect a presence of an authentication device; and
authenticate the subject as the authorized user in response to the detection of the presence of the authentication device.

21. The electronic device as defined in claim 17, wherein the feature includes a facial feature of the subject.

* * * * *

UNITED STATES PATENT AND TRADEMARK OFFICE
CERTIFICATE OF CORRECTION

| | | |
|---|---|---|
| PATENT NO. | : 11,809,535 B2 | Page 1 of 1 |
| APPLICATION NO. | : 16/725467 | |
| DATED | : November 7, 2023 | |
| INVENTOR(S) | : Magi et al. | |

It is certified that error appears in the above-identified patent and that said Letters Patent is hereby corrected as shown below:

In the Drawings

Figure 10B, Reference Numeral 1036, delete "SUCESSFUL" and Insert --SUCCESSFUL--.

Signed and Sealed this
Second Day of January, 2024

Katherine Kelly Vidal
*Director of the United States Patent and Trademark Office*